US009188205B2

(12) United States Patent
Lee et al.

(10) Patent No.: US 9,188,205 B2
(45) Date of Patent: *Nov. 17, 2015

(54) MOON GEAR ASSEMBLY

(76) Inventors: Gary D. Lee, Spanish Fork, UT (US);
William M. Decker, Salt Lake City, UT (US); Brian M. Olsen, Los Alamos, NM (US); Eric E. Aston, Alpine, UT (US); Brian T. Barnum, Springville, UT (US); Steven R. Aposhian, Farmington, UT (US); Andrew J. Orme, Provo, UT (US); Isaac R. Jones, Provo, UT (US); Peter J. Jones, Riverton, UT (US); Regis A. David, Provo, UT (US)

( * ) Notice: Subject to any disclaimer, the term of this patent is extended or adjusted under 35 U.S.C. 154(b) by 628 days.

This patent is subject to a terminal disclaimer.

(21) Appl. No.: 13/182,374

(22) Filed: Jul. 13, 2011

(65) Prior Publication Data

US 2011/0306457 A1    Dec. 15, 2011

Related U.S. Application Data

(63) Continuation-in-part of application No. 12/876,862, filed on Sep. 7, 2010, now abandoned.

(60) Provisional application No. 61/276,121, filed on Sep. 8, 2009, provisional application No. 61/240,646, filed (Continued)

(51) Int. Cl.
  *F16H 37/04* (2006.01)
  *F16H 1/30* (2006.01)
  (Continued)

(52) U.S. Cl.
  CPC .............. *F16H 9/24* (2013.01); *F16H 37/0846* (2013.01); *F16H 55/56* (2013.01); *F16H 2037/088* (2013.01); *Y10T 74/1956* (2015.01)

(58) Field of Classification Search
  CPC .............. F16H 9/10; F16H 9/12; F16H 9/24; F16H 55/56; F16H 37/04; F16H 1/30; F16H 35/06; Y10T 74/1956
  USPC .................................. 475/210, 211, 212, 213
  See application file for complete search history.

(56) References Cited

U.S. PATENT DOCUMENTS 762,062 A    6/1904 Judd
958,061 A    5/1910 Adams
(Continued)

FOREIGN PATENT DOCUMENTS

DE    4111195 A1    10/1991
DE    4317478     *  3/1994
(Continued)

OTHER PUBLICATIONS

Office Action dated Apr. 9, 2010 from U.S. Appl. No. 11/759,206, filed Jun. 6, 2007.
(Continued)

*Primary Examiner* — Edwin A Young
*Assistant Examiner* — Colby M Hansen
(74) *Attorney, Agent, or Firm* — Workman Nydegger

(57) ABSTRACT

A moon gear assembly is provided that includes a moon arm assembly having a driving moon gear. A pivot pin is connected to the moon arm assembly, and an adjustment arm is connected to the moon arm assembly. The moon arm assembly may also include a body that defines a chamber, a worm gear disposed in the chamber and arranged to interact with the driving moon gear, and a motor disposed in the chamber and couple to the worm gear.

17 Claims, 50 Drawing Sheets

Related U.S. Application Data on Sep. 8, 2009, provisional application No. 61/281,460, filed on Nov. 18, 2009, provisional application No. 61/294,388, filed on Jan. 12, 2010, provisional application No. 61/307,380, filed on Feb. 23, 2010, provisional application No. 61/323,795, filed on Apr. 13, 2010, provisional application No. 61/378,875, filed on Aug. 31, 2010.

(51) Int. Cl.
| F16H 35/06 | (2006.01) |
| F16H 9/24 | (2006.01) |
| F16H 37/08 | (2006.01) |
| F16H 55/56 | (2006.01) |

(56) References Cited

U.S. PATENT DOCUMENTS

| 1,383,159 | A |   | 6/1921  | Slater |   |
|---|---|---|---|---|---|
| 1,817,819 | A |   | 8/1931  | Healey |   |
| 1,981,582 | A |   | 11/1934 | Colucci |   |
| 2,376,429 | A |   | 5/1945  | Harry |   |
| 2,602,340 | A | * | 7/1952  | Harry | 474/53 |
| 2,926,538 | A |   | 3/1960  | Schafer |   |
| 2,936,641 | A |   | 5/1960  | Voelkl |   |
| 3,051,022 | A |   | 8/1962  | Way, Jr. |   |
| 3,058,365 | A |   | 10/1962 | Gerchow |   |
| 3,082,632 | A |   | 3/1963  | Vulliez |   |
| 3,688,595 | A |   | 9/1972  | Bauer |   |
| 3,702,571 | A |   | 11/1972 | Sainz |   |
| 4,005,618 | A |   | 2/1977  | Cohen |   |
| 4,367,067 | A |   | 1/1983  | Chao |   |
| 4,373,926 | A |   | 2/1983  | Fullerton |   |
| 4,457,186 | A |   | 7/1984  | Brozovich et al. |   |
| 4,618,331 | A | * | 10/1986 | Deal | 474/49 |
| 4,660,427 | A |   | 4/1987  | Fenton |   |
| 4,836,046 | A |   | 6/1989  | Chappel |   |
| 4,843,899 | A |   | 7/1989  | Braunschweiler |   |
| 4,864,889 | A |   | 9/1989  | Sakakibara et al. |   |
| 4,962,590 | A |   | 10/1990 | Ambrose |   |
| 5,013,288 | A |   | 5/1991  | Parsons |   |
| 5,295,915 | A |   | 3/1994  | Friedmann |   |
| 5,352,162 | A |   | 10/1994 | Coronel |   |
| 5,360,380 | A |   | 11/1994 | Nottle |   |
| 5,425,689 | A |   | 6/1995  | Genise |   |
| 5,516,132 | A |   | 5/1996  | Simkins |   |
| 5,674,144 | A |   | 10/1997 | Wiley |   |
| 5,885,178 | A |   | 3/1999  | Luh |   |
| 6,024,664 | A |   | 2/2000  | Shaffner |   |
| 6,044,718 | A |   | 4/2000  | Lester |   |
| 6,044,719 | A |   | 4/2000  | Reed, Jr. et al. |   |
| 6,050,912 | A |   | 4/2000  | Kobayashi |   |
| 6,338,692 | B1 |   | 1/2002  | Magyari |   |
| 6,595,084 | B2 |   | 7/2003  | Park |   |
| 6,938,589 | B2 |   | 9/2005  | Park |   |
| 6,964,630 | B1 |   | 11/2005 | Magyari |   |
| 7,892,129 | B2 |   | 2/2011  | Lee |   |
| 7,892,132 | B2 |   | 2/2011  | Choi |   |
| 2006/0019781 | A1 |   | 1/2006  | Roby |   |
| 2006/0128514 | A1 |   | 6/2006  | Glockler |   |
| 2006/0160657 | A1 |   | 7/2006  | Magyari |   |
| 2008/0236332 | A1 |   | 10/2008 | Hoose et al. |   |
| 2011/0306457 | A1 |   | 12/2011 | Lee et al. |   |
| 2012/0238384 | A1 |   | 9/2012  | Lee et al. |   |

FOREIGN PATENT DOCUMENTS

| DE | 4317478 A1 | 3/1994 |
|---|---|---|
| EP | 0379847 A1 | 8/1990 |
| GB | 561067 | 5/1944 |
| IT | C1303048 | 7/1996 |
| JP | 0989055 A | 3/1997 |
| JP | 3704812 B2 | 12/1997 |
| JP | 3614061 B2 | 6/2001 |
| JP | 2002039289 A | 2/2002 |
| JP | 2002104276 A | 4/2002 |
| JP | 2002523711 A | 7/2002 |
| JP | 2002257204 A | 9/2002 |
| JP | 2005251500 A | 9/2005 |
| JP | 2007092846 A | 4/2007 |
| KR | 100899635 B1 | 5/2009 |
| KR | 101099568 B1 | 12/2011 |
| WO | 9524989 A1 | 9/1995 |
| WO | 0144693 A1 | 6/2001 |

OTHER PUBLICATIONS

Office Action dated Sep. 22, 2010 from U.S. Appl. No. 11/759,206, filed Jun. 6, 2007.
Office Action dated Feb. 25, 2011 from U.S. Appl. No. 11/759,206, filed Jun. 6, 2007.
Notice of Allowance dated Oct. 4, 2011 from U.S. Appl. No. 11/759,206, filed Jun. 6, 2007.
Notice of Allowance dated Nov. 15, 2011 from U.S. Appl. No. 11/759,206, filed Jun. 6, 2007.
Notice of Allowance dated Jan. 4, 2012 from U.S. Appl. No. 11/759,206, filed Jun. 6, 2007.
Office Action dated Jan. 15, 2010 from U.S. Appl. No. 11/759,207, filed Jun. 6, 2007.
Office Action dated May 26, 2010 from U.S. Appl. No. 11/759,207, filed Jun. 6, 2007.
Notice of Allowance dated Dec. 9, 2010 from U.S. Appl. No. 11/759,207, filed Jun. 6, 2007.
International Search Report dated Sep. 9, 2008 from International Patent Application No. PCT/US07/070595 filed Jun. 7, 2007.
International Preliminary Report on Patentability dated Dec. 10, 2008 from International Patent Application No. PCT/US07/070595 filed Jun. 7, 2007.
European Search Report dated Jul. 27, 2009 from European Patent Application No. EP07873838 filed Oct. 16, 2009.
Office Action dated Aug. 25, 2011 from Chinese Patent Application No. 200780025143.6 filed Dec. 31, 2008.
Office Action dated Feb. 8, 2011 from Korean Patent application No. KR10-2009-7000333 filed Jan. 8, 2009.
Notice of Allowance dated Oct. 26, 2011 from Korean Patent application No. KR10-2009-7000333 filed Jan. 8, 2009.
Office Action dated May 31, 2011 from Japanese Patent Application No. JP2009-514529 filed Dec. 8, 2008.
Office Action dated Jun. 11, 2013 from Japanese Patent Application No. JP2011-262213 filed Nov. 30, 2011.
International Search report dated Apr. 22, 2010 from International Patent Application No. PCT/US09/057012 filed Sep. 15, 2009.
International Preliminary Report on Patentability dated Mar. 15, 2011 from International Patent Application No. PCT/US09/057012 filed Sep. 15, 2009.
Office Action dated Feb. 20, 2013 from U.S. Appl. No. 12/876,862, filed Sep. 7, 2010.
Office Action dated Jul. 26, 2013 from U.S. Appl. No. 12/876,862, filed Sep. 7, 2010.
Office Action dated May 9, 2014 from U.S. Appl. No. 12/876,862, filed Sep. 7, 2010.
International Search report dated Jul. 1, 2011 from International Patent Application No. PCT/US10/048126 filed Sep. 8, 2010.
International Preliminary Report on Patentability dated Mar. 13, 2012 from International Patent Application No. PCT/US10/048126 filed Sep. 8, 2010.
European Search Report dated May 13, 2013 from European Patent Application No. 10816016.9 filed Jul. 20, 2012.
International Search Report/Written Opinion dated Jun. 4, 2013 from International Patent Application No. PCT/US2013/032461 filed Mar. 15, 2013.
John Deere (2006) DF150 Series Powershift Transmission. [World Wide Webpage] available: //www.johndeere.com/en_US/rg/productsequipment/productcatalog/tms/powershift/dfseries/df150/features/index.html (Sep. 1, 2006).
G. Danieli, Analytical Description of Meshing of Constant Pressure Angle Teeth Profiles on a Variable radius Gear and its Applications, Journal of Mechanical Design, Mar. 2000, vol. 122, pp. 123-129, copyright by ASME.
Office Action dated from Nov. 7, 2014 U.S. Appl. No. 13/427,354, filed Mar. 22, 2012.

* cited by examiner

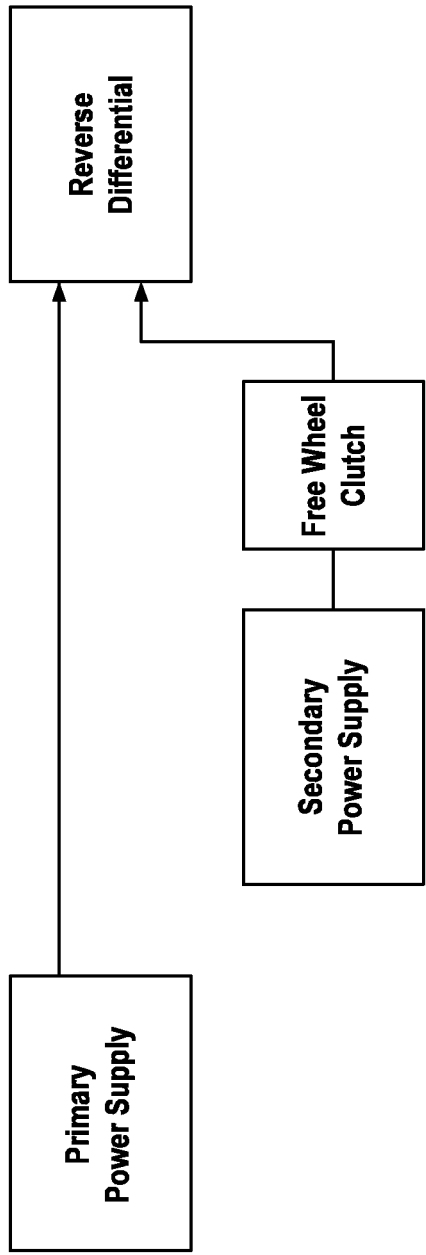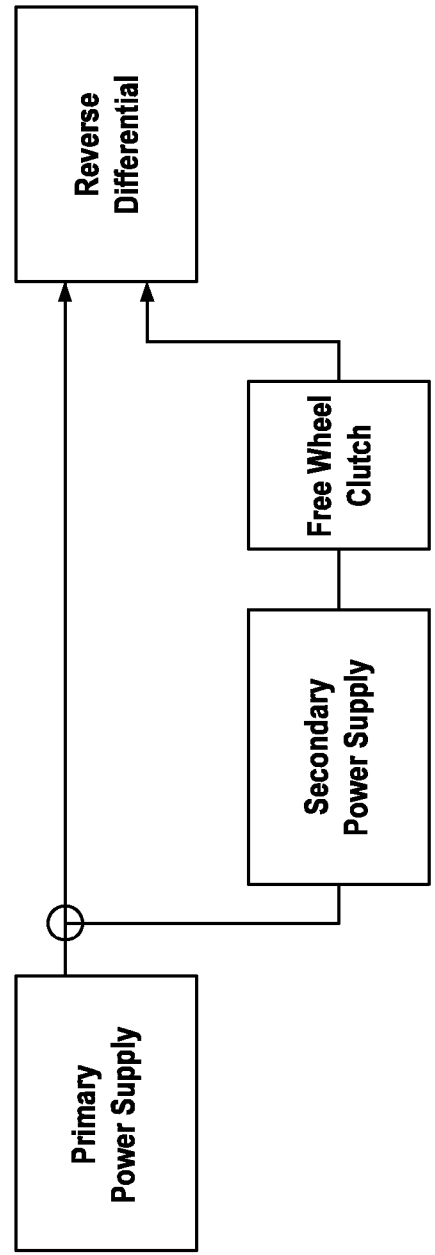

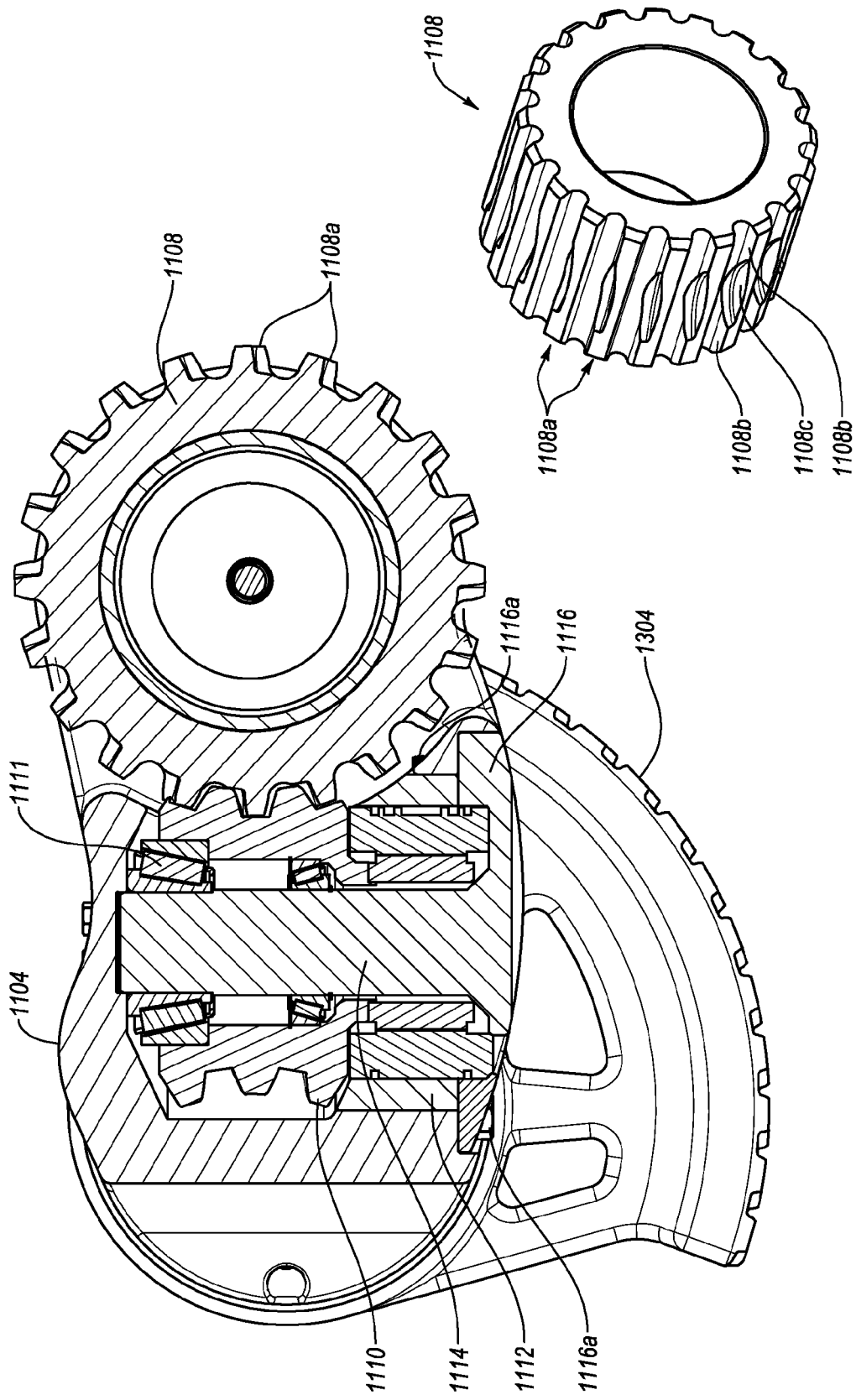

MOON GEAR ASSEMBLY

CROSS-REFERENCE TO RELATED APPLICATIONS

The present application is a continuation-in-part (CIP) of U.S. patent application Ser. No. 12/876,862, filed on Sep. 7, 2010 and entitled "INFINITELY VARIABLE TRANSMISSION," which claims priority to, and the benefit of, U.S. Provisional Application Ser. No. 61/276,121, filed on Sep. 8, 2009 and entitled "INFINITELY VARIABLE TRANSMISSION," to U.S. Provisional Application Ser. No. 61/240,646, filed on Sep. 8, 2009 and entitled "REVERSE DIFFERENTIAL WITH ENGAGED NEUTRAL," to U.S. Provisional Application Ser. No. 61/281,460, filed on Nov. 18, 2009 and entitled "INFINITELY VARIABLE TRANSMISSION," to U.S. Provisional Application Ser. No. 61/294,388, filed Jan. 12, 2010 and entitled "INFINITELY VARIABLE TRANSMISSION," to U.S. Provisional Application Ser. No. 61/307,380, filed on Feb. 23, 2010, and entitled "CHAIN FOR INFINTELY VARIABLE TRANSMISSION," to U.S. Provisional Application Ser. No. 61/323,795, filed on Apr. 13, 2010, and entitled "INFINITELY VARIABLE TRANSMISSION," and to U.S. Provisional Application Ser. No. 61/378,875, filed on Aug. 31, 2010 and entitled "INFINITELY VARIABLE TRANSMISSION WITH SPROCKET CORRECTION MECHANISM." The foregoing applications are each expressly incorporated herein by this reference, in their respective entireties.

BACKGROUND OF THE INVENTION

1. Field of the Invention

The present application relates to the field of transmission systems. More particularly, embodiments within the scope of the application and claims relate to methods, systems, subsystems, assemblies, and components for providing constant engagement during power transmission, and during changes of gear ratios in very small, and possibly infinitely small, increments.

2. Related Technology

From nearly the beginning of mechanical engines, the purpose and design of an engine has been focused, to at least some degree, on allowing a small engine to move a large load. As engines evolved and technology became more sophisticated, engines were developed having transmissions with multiple ratios to allow the engine to start moving the load with a low ratio and to incrementally step up to higher ratios as the load began moving. In this manner, a transmission can make more effective use of the engine's torque and keep the engine operating near an appropriate speed. Moreover, an engine can operate within a narrow range of speeds while providing a wider range of output speeds.

To effect an incremental change in gear ratio, a manual transmission uses various separate driven gears of different sizes in connection with one or more drive gears. As a gear ratio change is made, a drive gear disengages from the driven gear and re-engages with a different gear. For example, a clutch may disengage a drive gear from a driven gear and then re-engage the same or a different drive gear with a second driven gear having a different radius. As the newly engaged gears have different radii—or levers—the gear ratio is changed. To effect this gear ratio change, however, the drive gear must be temporarily disconnected from all driven gears, such that the power source is also temporarily disconnected from the load while the gear ratio change is made.

Automatic transmissions also make incremental changes in gear ratio by disconnecting the engine from the load. To do so, automatic transmissions typically use one or more planetary gear sets which are used in connection with a series of clutches and bands that are driven by hydraulic system. To change between gear ratios, valves within the hydraulic system are used to control hydraulic pressure which activates various clutches and bands so as to connect and disconnect the carriers and various gears of the automatic transmission from the engine. Based on the specific clutches and bands that engage and disengage, the transmission achieves a predetermined gear ratio change.

When the power source is disconnected or disengaged from the load, the engine coasts until the power source is reconnected to the load. As the engine coasts, however, a moving load begins to lose momentum. For instance, a semi-tractor trailer or other moving vehicle may be moving uphill when a gear change is required. By pushing in the clutch or otherwise disconnecting the power source from the load, the engine RPMs are decreased, turbos may be dumped, and torque can be lost. As a result, the driver often must shift two or three gears down because re-engaging the power source will not occur fast enough to maintain the engine RPMs at a drop of only one or two gears down. This results in an inefficient use of the engine horsepower and fuel.

Similarly, where a tractor is pulling a load such as a plow, disconnecting the engine from the load reduces the momentum of the tractor and the plow. While the tractor may be able to coast, the plow is less likely to coast. For example, when the plow loses momentum it may catch on the ground being plowed and thereby drag against and stop the tractor from coasting. The plow may catch and stop with a sudden movement that can damage the tractor and potentially injure the operator. Therefore, to avoid damage and injury, the tractor operator may drive the tractor and plow in a low gear to avoid the need to shift gears although a higher gear would allow the tractor to more quickly plow the field, consume fuel more efficiently, and make use of the momentum to obtain a draft of the plow.

In addition, many other applications have previously been unable to take advantage of the benefits of a variable speed transmission because disconnection of the power source from the load makes the application unsafe or impractical. For example, an elevator could benefit from gear ratio changes to change the speed of its ascent or descent. However, disconnecting the power source during ascent or descent would cause the elevator carriage to coast and could make the variable speed transmission unsafe for the elevator passengers.

A conveyor system such as those used in manufacturing or mining operations could also benefit from variable speeds. For example, as the system starts up, the conveyor belt could be started at a slow speed and the speed then increased for full operation. Many conveyor belts are, however, loaded with material and/or are miles long, thereby creating a large load that must be moved. If a gear ratio change is made by even temporarily disconnecting the power source, the material and conveyor belt lose momentum and can prevent an efficient gear ratio change. As a consequence, materials often have to be removed from the belt just to get the conveyor moving and/or the conveyor system must be operated at a constant speed.

While variable speed transmissions provide numerous benefits, the problems of the disconnection of the power source from the load has caused engine and transmission designers to search for methods and systems that minimize the time the power source is disconnected and a drive gear is disengaged. To at least some degree, automatic transmissions have improved this time by automating the shifting between gears and changing gear ratios, but the change has not been fundamental, although such automatic transmissions have at least reduced the time between disconnecting and reconnecting the power supply. However, even automatic transmissions disconnect the engine from the drive gears, thereby causing a loss in torque for a time and failing to make an efficient use of the horsepower. Moreover, by operating with only a small group of discrete gear ratios—each having only one or a very few speeds at which the engine operates at optimum efficiency—the engine operates mostly in an inefficient range. Consequently, the engine must be capable of providing more horsepower, and must thus be larger, than would otherwise be required if an engine was more frequently running at an efficient speed. The inefficient use of these engines, in turn, burns more fuel than would an engine run at more efficient speeds.

In low torque applications, the problems associated with disconnecting the power source from the load have been reduced, to some extent, by continuously variable transmissions (CVT). A CVT typically uses two pulleys which are connected by a belt. The pulleys can include two oppositely oriented cones that face each other and which can be pulled together or pushed further apart by hydraulic pressure, centrifugal force, or spring tension. As one pulley is moved to position the belt over a larger radius portion, the other pulley is moved to position the belt over a smaller radius to keep the belt tight. As the position of the belt changes to engage portions of pulleys with differing widths, various gear ratios can be created. A similar concept that may also be considered a CVT also makes use of similar, complementary pulleys and cones. Instead of a belt, however, the CVT uses a rolling member that is sandwiched between the cones.

Regardless of whether a belt or a rolling member is used, however, the CVT system generally relies on friction to facilitate adjustment of gear ratios and provide power output. Friction introduces heat into the system, however, and as a result the wrapping member and rolling members heat up and are susceptible to wear damage, thereby requiring that the user repair or replace the parts. To reduce the frequency of repair, the frictional wrapping or rolling members can be toughened, such as through the use of a thicker belt or impregnation of the belt with metals or other tougher materials. However, as the belt strength is increased, the part costs increase. Moreover, sufficiently tough materials can cause the cones or pulleys within the transmission to wear and fail.

Moreover, because these systems are friction-based, they are typically only suitable for low torque applications, as high torque applications could cause excessive heating within the transmission, thereby causing even greater wear and failure of the transmission components. As a result, CVT transmissions are not considered scalable for a wide variety of low and high torque applications. In fact, the application of torque to a CVT in a high torque or high horsepower system may cause near immediate failure as the rolling member or wrapping member can melt or otherwise deteriorate due to the friction-induced heat.

Because the CVT systems have been seen as unacceptable alternatives in high-torque applications, additional efforts have been made within high-torque applications in an attempt provide little to no time gap between disconnection and reconnection of the power source and load. For example, John Deere produces tractors with a PowerShift transmission that uses a complex design to automatically do the clutching and disconnect a clutch and reconnect the clutch at the same time such that there is no real time gap and little to no torque loss.

The transmission is, however, much larger than a standard transmission, and can house a large number of hydraulic lines inside the transmission. As a result, maintenance of the lines may be difficult, and the size of the engine further increases the size of the equipment and the weight or load that must be carried. Moreover, because of the complexity and size of the transmission, it can be cost prohibitive for certain applications, and it is not scalable for low torque or smaller applications.

Accordingly, a need exists for an improved transmission which is scalable and which can move between multiple gear ratios without disconnecting the power source from the load.

BRIEF SUMMARY OF EXAMPLE
EMBODIMENTS OF THE INVENTION

Exemplary embodiments of the present disclosure are directed to a transmission capable of operating over a large, possibly infinite, number of gear ratios.

In at least some aspects, a transmission includes an axially movable sheave, radially movable gears, and a chain engaged with the axially movable sheave and the radially movable gears.

In at least one aspect that can be combined with any other aspects herein, the radial movement of the radially movable gears is in an amount corresponding to axial movement of the axially movable sheave.

In at least one aspect that can be combined with any other aspects herein, the axially movable sheave is rotatable about an axis.

In at least one aspect that can be combined with any other aspects herein, the radially movable gears collectively orbit about a common axis.

In at least one aspect that can be combined with any other aspects herein, the radially movable gears are rotatable about respective internal axes;

In at least one aspect that can be combined with any other aspects herein, the chain orbits around an axis.

In at least one aspect that can be combined with any other aspects herein, a radius of the chain relative to an axis corresponds to a radial position of the radially movable gears.

In at least one aspect that can be combined with any other aspects herein, a radius of the chain relative to an axis corresponds to a position of a pair of angled surfaces of the sheave, the pair of angled surfaces being offset by a distance corresponding to a width of the chain.

In at least one aspect that can be combined with any other aspects herein, the radially movable gears are movable are movable in very small, and possibly infinitely small, increments within a range of radial positions.

In at least one aspect that can be combined with any other aspects herein, the sheave includes two halves, one or both of which are axially movable.

In at least one aspect that can be combined with any other aspects herein, the radially movable gears are at least partially disposed within the sheave.

In at least one aspect that can be combined with other aspects herein, a chain is rotatable around a sheave, and can engage each of the radially movable gears during a portion of the rotation of the chain.

In at least one aspect that can be combined with any other aspects herein, the chain is adapted to enter into and out of engagement with each of the radially movable gears.

In at least one aspect that can be combined with any other aspects herein, a sheave has a beveled internal surface and a chain has a plurality of links with an external surface inclined at an angle generally corresponding to the beveled internal surface of the sheave.

In at least one aspect that can be combined with any other aspects herein, a transmission includes a synchronization system configured to control at least radial movement of the radially movable gears.

In at least one aspect that can be combined with any other aspects herein, the synchronization system is configured to move the radially movable gears generally synchronously with axial movement of the sheave and radial movement of the chain.

In at least one aspect that can be combined with any other aspects herein, a correction system is coupled to the radially movable gears and can be used to selectively rotate the radially movable gears about their internal axes.

In at least one aspect that can be combined with any other aspects herein, radially movable gears are movable between at least one integer position and multiple non-integer positions.

In at least one aspect that can be combined with any other aspects herein, a correction system can cause selective rotation of radially movable gears only at non-integer positions.

In at least one aspect that can be combined with any other aspects herein, a correction system can rotate a radially movable gear independent of other of the radially movable gears.

In at least one aspect that can be combined with any other aspects herein, a correction system can rotate radially movable gears while disengaged with the chain.

In at least one aspect that can be combined with any other aspects herein, the transmission includes a locking system.

In at least one aspect that can be combined with any other aspects herein, a locking system can lock a radially movable gear over a period during which the radially movable gear is engaged with the chain.

In at least one aspect that can be combined with any other aspects herein, the locking system can lock the radially movable gear against rotation around its internal axis.

In at least one aspect that can be combined with any other aspects herein, a sheave is coupled to, and is rotatable around, a drive shaft.

In at least one aspect that can be combined with any other aspects herein, a transmission includes a transmission input that is configured to receive a rotational input.

In at least one aspect that can be combined with any other aspects herein, a chain is engaged with an output member, and the output member is linked to a transmission output.

In at least one aspect that can be combined with any other aspects herein, one or more actuators are coupled to an input assembly of a transmission.

In at least one aspect that can be combined with any other aspects herein, an actuator is configured to correct, synchronize, or lock radially movable gears, or moves a sheave in an axial direction.

In at least one aspect that can be combined with any other aspects herein, an actuator is a hydraulic actuator, an electrical actuator, a mechanical actuator, a controller, or a gear train.

In at least one aspect that can be combined with any other aspects herein, an actuator is configured to maintain constant tooth engagement between teeth of the radially movable gears and a chain during changes in gear ratio.

In at least one aspect that can be combined with any other aspects herein, gear ratio changes may occur from one or more of an integer position to a non-integer position, a non-integer position to an integer position, or a non-integer position to another non-integer position.

In at least one aspect that can be combined with any other aspects herein, at a non-integer position, a circumference of an effective circle around the sheave at a point of contact with the chain is not equally divisible by one or both of a pitch of the chain or a pitch of the radially movable gears.

In at least one aspect that can be combined with any other aspects herein, a radially movable gear is movable out of engagement with the chain while in-line with the chain and, but for a correction system, would be out-of-line with the chain at re-engagement with the chain.

In at least one aspect that can be combined with any other aspects herein, a transmission includes at least three radially movable gears.

In at least one aspect that can be combined with any other aspects herein, a transmission includes a differential adapted to receive two inputs and provide a single output.

In at least one aspect that can be combined with any other aspects herein, two inputs to a differential include a first input that is at least partially affected by a gear ratio involving an output system, and a second input that is independent of the output system.

In at least one aspect that can be combined with any other aspects herein, a correction system includes at least one of a set of hydraulic turbines, an off-center ring gear, a wheel-and-ball assembly having two pocket wheels and a set of balls between the two pocket wheels, a follower gear coupled to a chain and mechanically linked to a moon gear shaft for each radially movable gear, or a worm gear coupled at least indirectly to an actuator, rotation of the worm gear configured to rotate a respective radially movable gear about its own axis.

In at least one aspect that can be combined with any other aspects herein, a wheel-and-ball assembly includes a spring loaded mechanism coupled to at least one pocket wheel.

In at least one aspect that can be combined with any other aspects herein, a pitch of a pocket wheel corresponds to a pitch of one or both of a radially movable gear or a chain.

In at least one aspect that can be combined with any other aspects herein, a synchronization mechanism includes a linearly defined radial path, an arcuate radial path, a radial movement slot in a sheave, a worm gear coupled to an actuator and the worm gear rotating to move a radially movable gear in a radial direction, an outer ring gear with multiple inner gears, each inner gear linking to an arm coupled to a radially movable gear such that rotation of the inner gear rotates the arm and the radially movable gear, or a shifting arm coupled to a cam, where the shifting arm and cam are linked to radially movable gears and the shifting arm is rotatable independent of a drive shaft about which a sheave rotates.

In at least one aspect that can be combined with any other aspects herein, a shifting arm is configured to cause radial movement of radially movable gears by causing a relative difference in rotational speed between a drive shaft and a cam.

In at least one aspect that can be combined with any other aspects herein, a locking system includes a worm gear, cam ring, set of clutch disks compressed by a spring, a wedge and yoke, or any combination thereof.

In at least one aspect that can be combined with any other aspects herein, a transmission includes a tensioning system.

In at least one aspect that can be combined with any other aspects herein, the tensioning system includes some combination of a second axially movable sheave, a movable tensioning gear positioned between an input assembly and an output assembly, or a pivot and actuator coupled to an output or input member, wherein the actuator is arranged to cause the input or output member to orbit at least partially around the pivot.

In at least one aspect that can be combined with any other aspects herein, a chain is configured to engage an axially movable sheave of an input system and transfer power through a fixed-size output system.

In at least one aspect that can be combined with any other aspects herein, a chain is configured to engage a fixed-size input member and transfer power through an axially movable sheave of an output system.

In at least one aspect that can be combined with any other aspects herein, a chain link includes a fluid retention system.

In at least one aspect that can be combined with any other aspects herein, a chain link includes an angled roller.

In at least one aspect that can be combined with any other aspects herein, each link of a chain is identical.

These and other aspects of example embodiments of the present disclosure will become more fully apparent from the following description and appended claims.

BRIEF DESCRIPTION OF THE DRAWINGS

To further clarify the aspects of embodiments of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 7A and 7B schematically illustrate exemplary embodiments of a transmission having primary and secondary power supplies to a reverse differential;

FIG. 19A illustrates a partial frontal view of the differential system of the transmission of FIG. 17A;

FIG. 37 is a section view of an example of a moon gear assembly;

FIG. 38 is a perspective view of an example of a driving moon gear;

DETAILED DESCRIPTION OF SOME EXAMPLE EMBODIMENTS

This description relates to transmission systems. More particularly, the description herein relates to transmission systems that can convey power from a source to a load using gear ratios that are changeable in very small, perhaps infinitely small, increments. More particularly still, the description relates to transmission systems usable with any of a variety of technologies, and which can in at least some embodiments operate with an engaged neutral and move in very small, perhaps infinitely small, increments either forward or reverse out of the engaged neutral.

Reference will now be made to the drawings to describe various aspects of example embodiments of the present disclosure. It is to be understood that the drawings are diagrammatic and schematic representations of such example embodiments, and are not limiting of the present disclosure. Moreover, while various drawings are provided at a scale that is considered functional for some embodiments, the drawings are not necessarily drawn to scale for all contemplated embodiments. The drawings thus represent an exemplary scale, but no inference should drawn from the drawings as to any required scale.

In the following description, numerous specific details are set forth in order to provide a thorough understanding of the present disclosure. It will be obvious, however, to one skilled in the art that the present disclosure may be practiced without these specific details. In other instances, well-known aspects of transmission systems, including bearings, journals, manufacturing processes, and the like have not been described in particular detail in order to avoid unnecessarily obscuring aspects of the disclosed embodiments.

Infintely Variable Transmission

Figure 1:
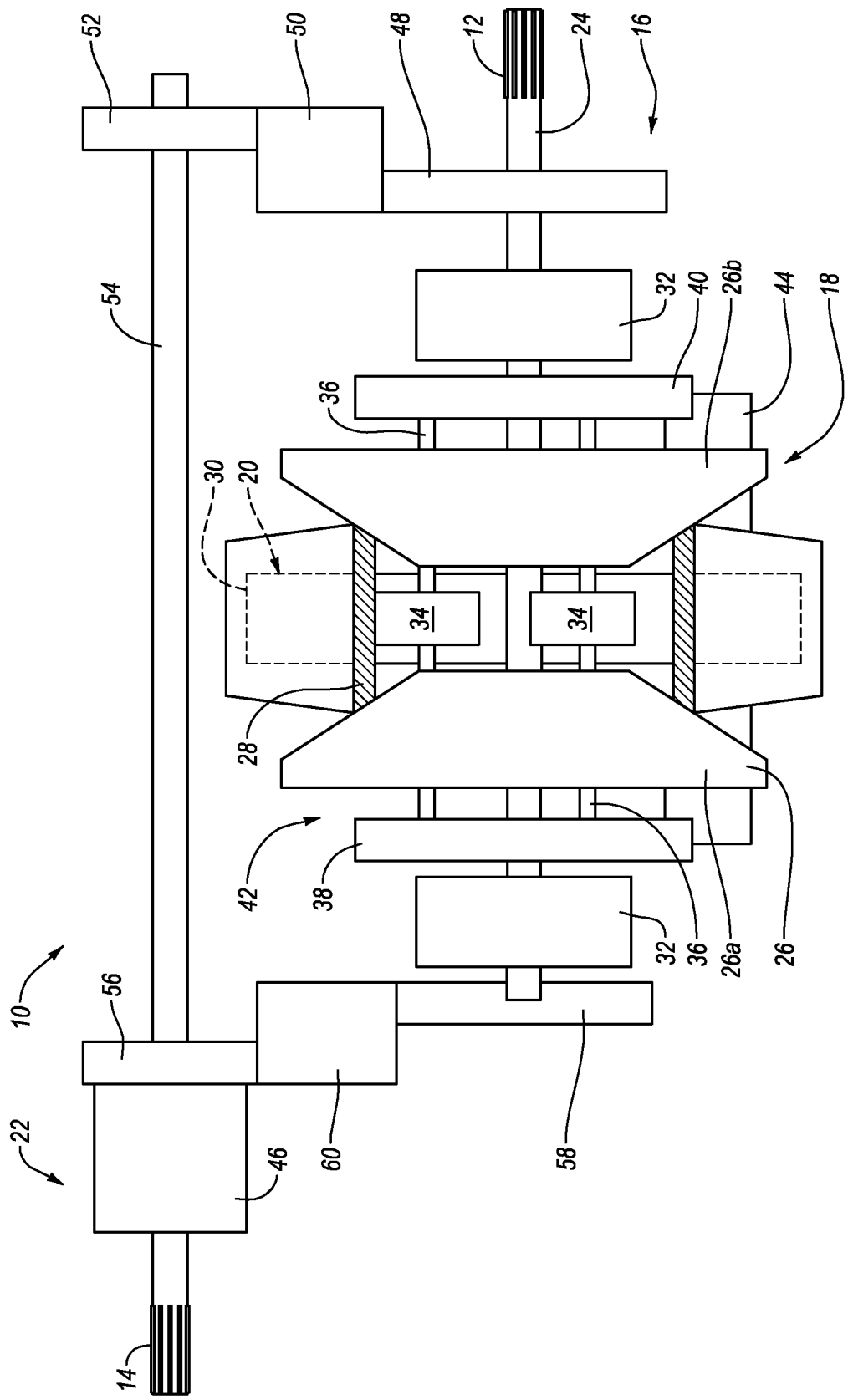
FIG. 1 illustrates a schematic representation of a transmission according to one example embodiment of the present disclosure.

FIG. 1 illustrates an example infinitely variable transmission 10 according to various aspects of the present disclosure. Briefly, transmission 10 illustrated in FIG. 1 is configured in a manner that allows very small, and possibly infinitely small, variations in gear ratio without disconnection between a power source and an associated load. More particularly, power is input to the transmission 10 at a transmission input 12 and power is output from the transmission 10 at a transmission output 14. The power input at the transmission input 12 and the power output at the transmission output 14 may be in the form of a rotational power, and other components of the transmission 10 can be used to determine the gear ratio between the transmission input 12 and the transmission output 14. The gear ratio in the transmission 10 can change in very small increments. For instance, as discussed hereafter, power transfer members may slide between radial and/or axial positions, such that any position along a movement path can be used to produce a gear ratio. In some embodiments, the movement can be in infinitely small increments. In other embodiments, the movement may be in very small increments. A very small increment can include, for instance, where gear ratio changes are made between gear ratios that involve non-integer locations as described hereafter.

As described in greater detail herein, the components between the transmission input 12 and the transmission output 14 optionally remain engaged and maintain a physical connection between the power source that is coupled to the transmission input 12, and the load that is coupled to the transmission output 14. In some embodiments, the transmission 10 may even maintain engagement between the power source and the load while the power source is operating and supplying a power input to the transmission input 12, while the transmission output 14 has a zero velocity output. Such an aspect is sometimes referred to herein as an engaged neutral.

In another aspect of the transmission 10, the gear ratio of the transmission can be increased and/or decreased in very small, and possibly infinitely small, increments. The maximum and minimum gear ratios provided by the transmission 10 are a configurable aspect of the transmission 10, and can be varied to suit any number of different applications. For instance, the transmission 10 may include various components as discussed hereafter. By adjusting the features of such components, including the number, size, type, shape, profile, or other feature, or any combination of the foregoing, of such components, the transmission 10 can be adapted to operate in a number of different environments and applications. For instance, the transmission 10 can be adapted to operate with land vehicles (e.g., conventional automobiles, electric automobiles, hybrid automobiles, motorcycles, scooters, etc.), marine vehicles (e.g., ships, barges, boats, etc.), power generating devices (e.g., wind and water based power generating devices), transport systems (e.g., conveyor belts, elevators, escalators, etc.), and in virtually any other industry or application. Indeed, according to one aspect of some embodiments of the present disclosure, the transmission 10 further has the capability of operating at a constant velocity to manage torque spikes, or is otherwise configured in a way that makes the transmission 10 particularly suited to use in high-torque applications (e.g., construction equipment, semi-tractor trailers, trains, etc.). Accordingly, at least some embodiments of the transmission 10 may effectively operate as a universal transmission suited for virtually any application where a gear ratio and/or output speed change is desired.

Gear ratio changes are made in the transmission 10 using a drive system 16. The drive system includes an input system 18 and an output system 20, and either or both of the input and output systems 18, 20 may be used to produce gear ratio changes. In practice, the input system 18 of the illustrated embodiment is coupled to the transmission input 12 and receives power therefrom. Power from the transmission input 12 passes through the input system 18. The output system 20 is coupled to the input system 18. Consequently, the power input to the input system 18 is conveyed to the output system 20, and from the output system 20 to the transmission output 14. Optionally, the output system 20 includes, or is coupled to, a differential system 22 that may also cooperate with the output system 20 to convey power to the transmission output 14. In some embodiments, such as that disclosed in FIG. 1, the differential system 22 receives two inputs. For instance, the differential system 22 may receive a first power input from the transmission input 12 (e.g., a power input which bypasses the output system 20) and a second power input from the output system 20. The two inputs can be combined to produce an output that is provided to the transmission output 14.

The drive system 16 may facilitate implementation of gear ratio changes within the transmission 10. According to one embodiment, gear ratio changes are produced in very small, and possibly infinitely small increments. For instance, as described in greater detail herein, the drive system 16 may use engaging members that can slide between different positions. In sliding between different positions, the transmission 10 can have gear ratios that change according to any location along the movement path of the engaging members, thereby producing a large, potentially infinite, number of gear ratios between maximum and minimum positions on the movement path. Further, the drive system 16 can maintain a connection between the power source and the load even during a gear ratio change, such that corresponding driving and driven members may collectively remain under load while a gear ratio change is made.

To illustrate an exemplary manner in which gear ratio changes can be made, a more particular discussion of the input system 18 will be provided. It should be appreciated that while such discussion regarding gear ratio changes is provided in relation to the input system 18, the discussion could additionally or alternatively be made with respect to the output system 20. In particular, the output system 20 could operate according to the same principles described hereafter in relation to the input system 18, and may do so either in combination with the input system 18, or instead of the input system 18.

In FIG. 1, the input system 18 includes a drive shaft 24 coupled to the transmission input 12. The drive shaft 24 may be in-line with the transmission input 12 although it need not be so aligned. For instance, the drive shaft 24 may be offset from the transmission input 12 and coupled thereto by using a belt, chain, gear, or other transfer mechanism, or a combination of the foregoing.

In FIG. 1, the transmission input 12 may be configured to receive and convey a rotational power input. The drive shaft 24 may also be adapted to rotate as the transmission input 12 rotates. The drive shaft 24 may be integral with the transmission input 12, or otherwise connected, such that the rotational speed of the drive shaft 24 is the same as the rotational speed of the transmission input 12, although the rotational speed of the drive shaft 24 may be greater or lesser than the rotational speed of the transmission input 12 where, for example, the drive shaft 24 is coupled to the transmission input 12 using a transfer mechanism that gears the drive shaft 24 up or down relative to the transmission input 12. The drive shaft 24 may be adapted to rotate in any suitable manner. For instance, in one embodiment, the transmission 10 is contained at least partially within a housing (not shown) and the drive shaft 24 rotates relative to the housing and the drive shaft is supported by one or more bearings (not shown).

As also illustrated in FIG. 1, some embodiments according to the present disclosure may include a sheave 26 coupled to the drive shaft 24. The sheave 26 of FIG. 1 includes two sheave halves 26a, 26b, and each of the sheave halves 26a, 26b is centered on the drive shaft 24 and configured to rotate around a longitudinal axis of the drive shaft 24. The sheave halves 26a, 26b may also be coaxial and rotate around the same drive shaft 24, rather than separate shafts. The sheave 26 may be rotated by the drive shaft 24. For instance, using a spline or other suitable connection, the sheave 26 may be coupled to the drive shaft 24 such that the drive shaft 24 an sheave 26 maintain the same rotational speed, although this is merely exemplary. Regardless of the manner of connection between drive shaft 24 and the sheave 26, rotation of the drive shaft 24 can also cause the sheave halves 26a, 26b to rotate at a same or different rotational speed. In this manner, power is transferred through input system 18 from the drive shaft 24 to the sheave 26.

The sheave 26 can operate as one driving mechanism for conveying power from the input system 18 to the output system 20. For example, in the illustrated embodiment, a wrapping member 28 is positioned in a groove within the sheave 26, and between the sheave halves 26a, 26b. For simplicity, the wrapping member 28 may be referred to herein as a chain. However, the wrapping member 28 can also be a belt, cable, or other member, and can be made of any number of different materials. For instance, the wrapping member may be made from metals, alloys, composites, polymers, metal reinforced polymers, rubber, or other materials, or combinations of the foregoing.

The wrapping member 28 of the illustrated embodiment is at least partially wrapped around the sheave 26. The wrapping member 28 may frictionally engage the sheave halves 26a, 26b, although such frictional engagement may be minimal as described herein. For instance, in some embodiments, the wrapping member 28 and sheave 26 may have metal-to-metal contact, and such contact may possibly also include a lubricant between the wrapping member 28 and the sheave 26, such that friction between the sheave 26 and the wrapping member 28 is almost negligible. As discussed herein, the sheave 26 may also be movable to define variable radial positions of the wrapping member 28. While the sheave 26 may, in some embodiments, be used for transferring power to the wrapping member, in other embodiments, the sheave 26 may be used for positioning of the wrapping member 28 and other components may primarily be used for power transfer and to reduce or prevent slippage between the wrapping member 28 and the sheave 26.

As the sheave halves 26a, 26b rotate, the wrapping member 28 may also be rotated, and power from the sheave 26 can be transferred to the wrapping member 28. Further, the wrapping member 28 may be connected to the output system 20 so as to convey power from the input system 18 to the output system 20. In particular, in the illustrated embodiment, the output system 20 includes a driven member 30. The wrapping member 28 may engage the driven member by wrapping around at least a portion of the driven member 30. The driven member 30 may be, for instance, a gear, sheave, pulley, or other member, or a combination of the foregoing, and can be rotated by the wrapping member 28. The wrapping member 28 may cause the driven member 30 to rotate, which can also result in a corresponding rotation of an output shaft (not shown). Such an output shaft can be directly or indirectly attached to the transmission output 14.

The rotation of the output shaft (not shown) that is coupled to the driven member 30, and the rotation of the transmission output 14, can be related to the input at the transmission input 12 by a gear ratio. According to one aspect of the present disclosure, the gear ratio that relates the output of the driven member 30 to the input at the transmission input 12 is at least partially controlled by the wrapping member 28 being movable between different radial positions on the sheave 26. For example, in the illustrated embodiment, the wrapping member 28 is positioned approximately midway along a beveled internal surface in the sheave 26. This is merely exemplary, however, and the position of the wrapping member 26 can be varied as necessary to suit any particular application or to obtain a desired gear ratio. Indeed, in the illustrated embodiment, one or both of the sheave halves 26a, 26b are configured to be selectively moved axially inward (i.e., toward each other along the longitudinal axis of the drive shaft 24) and axially outward (i.e., away from each other along the longitudinal axis of the drive shaft 24). Thus, as the sheave halves 26a, 26b move axially inward, the beveled internal surfaces of the sheave halves 26, 26b also move axially inward.

The wrapping member 28 may have a fixed width. Due to axially inward movement, the width of the groove at the location of engagement with the wrapping member 28 decreases. In response to such reduction in size of the groove, the wrapping member 28 may move radially outward, and further from the longitudinal axis of the drive shaft 24, to a location on the beveled internal surfaces which corresponds to the width of the wrapping member 28. In contrast, as the sheave halves 26a, 26b move axially outward, the groove defined by the beveled internal surfaces of the sheave 26 may increase in width at a location of engagement with the wrapping member 28, such that the wrapping member 28 may move radially inward, and towards the drive shaft 24. As the wrapping member 28 moves in this manner, the gear ratio within transmission 10 is changed. In some embodiments, the wrapping member 28 may maintain a same axial position relative to the drive shaft 24 while the sheave halves 26a, 26b move. In other embodiments, the axial position of the wrapping member 28 may change. For instance, if only a single sheave half 26a, 26b moves, or if the sheave halves 26a, 26b move different amounts, the groove within the sheave 26 may move axially relative to the drive shaft 24.

To facilitate the movement of the wrapping member 28 within the sheave 26, the sheave halves 26a, 26b each have a beveled interior surface. As described in greater detail hereafter, the wrapping member 28 can be positioned against such beveled interior surfaces, and the wrapping member 28 may also have an angled outer surfaces generally corresponding to the angle on the beveled sheave halves 26a, 26b. In embodiments in which the wrapping member 28 is a chain, the chain may include links that have one or more angled exterior surfaces corresponding generally to the beveled interior surfaces of the sheave 26. Each sheave half 26a, 26b may have a beveled internal surface although in other embodiments only one of the sheave halves 26a, 26b may have a beveled surface.

As will be appreciated by one skilled in the art in view of the disclosure herein, the ability to move the sheave halves 26a, 26b axially provides a capability to change a radial position of the wrapping member 28, and further provides a range of gear ratios for the transmission 10. In some embodiments, the driven member 30 of the output system 20 may include a sheave, sprocket, or pulley that has a fixed size. In other embodiments, the driven member 30 includes a sheave that is at least partially axially movable. Indeed, by having selectively movable sheaves on the input and output systems 18, 20, an even greater range of ratios can potentially be provided.

The range of gear ratios provided by the input and/or output systems 18, 20 can also be modified based on other parameters in the transmission 10. For example, the angle of the beveled interior surfaces of the sheave halves 26a, 26b can be varied. In particular, when one or both of the sheave halves 26a, 26b move axially, the wrapping member 28 can be moved radially outward or inward in a plane perpendicular to the longitudinal axis of the drive shaft 24. The distance the wrapping member 28 moves in the radial direction will, however, be different in embodiments that have different bevel angles on the sheave halves 26a, 26b. For instance, for a specific distance the sheave halves 26a, 26b move in an axial direction, a steeper bevel angle on the sheave halves 26a, 26b can cause the wrapping member 28 to move a greater distance than would an embodiment that has the sheave halves 26a, 26b with a more shallow bevel angle. The width of the wrapping member 28 can also be varied as a wider wrapping member 28 can potentially remain positioned between beveled surfaces of the sheave 26 over a greater range of axial movement by the sheave halves 26a, 26b, and may thus also allow for a greater range of gear ratios within the transmission 10.

The movement of the sheave halves 26a, 26b can be effected in any suitable manner. For instance, in FIG. 1, a synchronization system 38 may be used to move the sheave 26. In the illustrated embodiment, two sheave actuators 32 are provided, with each one being configured to control a respective one of the sheave halves 26a, 26b. The sheave actuators 32 may be any suitable device that can be used to facilitate inward and outward movement of the sheave halves 26a, 26b. For instance, in one example, the sheave actuators 32 include hydraulic or pneumatic pistons that are journaled around the drive shaft 24. When a gear ratio change is desired, the sheave actuators 32 can be activated to exert a force on a portion of a sheave half 26a, 26b and thereby move sheave halves 26a, 26b closer together. By reducing the force exerted on the sheave halves 26a, 26b, the sheave actuators 32 can retract and allow the sheave halves 26a, 26b to separate.

The sheave actuators 32 of FIG. 1 also represent sheave actuators other than hydraulic or pneumatic actuators. For example, in another embodiment, a mechanical actuator may include a worm gear that advances a compression plate. Such a worm gear may be actuated by an electronic, hydraulic, pneumatic, mechanical, or electro-mechanical device, and can advance the compression plate to cause a sheave half 26a, 26b to move axially inward, or can be used to back-off the compression plate to cause or allow one or both of the sheave halves 26a, 26b to move axially outward relative to each other. In still other embodiments, the sheave actuator 32 may include an electrical motor such as a stepper or servo motor. Further, while the illustrated embodiment illustrates two sheave actuators 32—one for each of the sheave halves 26a, 26b—this arrangement is merely exemplary. In some embodiments, one of the sheave halves 26a, 26b may be fixed at an axial position relative to the drive shaft 24. In such an embodiment, a single actuator can potentially be used to move a movable one of the sheave halves 26a, 26b relative to the fixed sheave half.

In FIG. 1, the diameter of the portion of the sheave 26 at which the wrapping member 28 is engaged is less than a diameter of the driven member 30 about which the wrapping member 28 is engaged. Accordingly, the wrapping member 28 may extend in a direction generally perpendicular to the drive axis between the sheave 26 and the driven member 30, and angle upward from the sheave 26 and towards the driven member 30. In particular, the radius of rotation of the wrapping member 28 increases as the wrapping member 28 gets closer to the driven member 30, and decreases as the wrapping member 28 approaches the sheave 26. However, this is merely exemplary. For instance, the size of the driven member 30 may be reduced such that a radius of rotation of the wrapping member 28 decreases or stays the same as the wrapping member 28 approaches the driven member 30. Moreover, in embodiments in which the sheave halves 26a, 26b are movable, the sheave 26 may move the wrapping member 26 to a position that is radially larger or smaller than the radius of rotation of the wrapping member 28 about the driven member 30.

It should be appreciated in view of the disclosure herein that the wrapping member 28 of FIG. 1 can wrap around at least a portion of the exterior surface of the sheave 26. For instance, the wrapping member 28 may extend between the driven member 30, engage the sheave 26 at a first point, wrap around the sheave 26 and disengage at a second point on the sheave 26, and extend towards the driven member 30. In one embodiment, the portion of the sheave 26 between points of engagement and disengagement range between about one-hundred thirty-five and two-hundred forty degrees of the exterior of the wrapping member 28, although such range is exemplary only. Further, the amount of wrapping may also be varied as the sheave 26 moves. For instance, as the sheave 26 moves axially inward (e.g., by reducing a width of the sheave 26 as sheave halves 26a, 26b move axially inward) and the wrapping member 28 moves radially outward, the wrapping member 28 may wrap around an increasingly larger portion of the sheave 26.

In some embodiments, a tensioning system 44 may be included. The tensioning system 44 may include one or more gears, rollers, rails, or other members that engage the wrapping member 28 between the sheave 26 and the driven member 30. Such a tensioning system 44 may provide a mechanism to maintain a desired tension and/or a substantially constant tension in the wrapping member 28. In some embodiments, the tensioning system 44 may also change an angle at which the wrapping member 28 enters or exits engagement with the sheave 26. Thus, the tensioning system 44 can also change the amount of engagement between the wrapping member and the sheave 26 and/or on the driven member 30.

In FIG. 1, the wrapping member 28 is illustrated as being cross-sectioned so as to illustrate the interior of the sheave 26. In the illustrated embodiment, the wrapping member 28 is shown as engaging the sheave 26, or being in near engagement with the sheave 26. In the illustrated embodiment, the wrapping member also engages a set of driving moons 34. The driving moons 34 may be radially movable members that are spaced around the longitudinal axis about which the sheave 26 and the drive shaft 24 rotate. The number of driving moons 34 may vary. For instance, in one embodiment, there are three driving moons 34, each of which is angularly offset at one-hundred twenty degrees from the other driving moons 34. In other embodiments, more or fewer driving moons 34 may be present, and the driving moons 34 may be spaced at equal or unequal intervals around the longitudinal axis of the drive shaft 24. In embodiments in which the wrapping member 28 is a chain, the driving moons 34 may be sprockets or other gears that have teeth configured to mate with the chain and mesh therewith. For instance, the links of such a chain may have a specific pitch corresponding to a pitch of the sprockets, such that as the sprockets engage the chain, the sprocket teeth enter pockets of the chain and the sprockets transfer power to the chain.

The driving moons 34 may also be configured in this embodiment to have multiple rotational motions. For instance, in FIG. 1, each driving moon 34 is coupled, about its center, to a driving moon shaft 36. The driving moon shafts 36 may rotate, and the driving moons 34 can be fixed to the driving moon shafts 36. As a result, as the driving moon shafts 36 rotate, the driving moons 34 rotate about a longitudinal axis passing through the driving moon shaft 36 and the center of the driving moon 34. The illustrated driving moon shafts 36 on which the driving moons 34 operate extend through the sheave halves 26a, 26b; however, this is merely exemplary as in other embodiments a shaft on which the driving moons 34 rotate may be located between the sheave halves 26a, 26b and need not extend through one or both of the sheave halves 26a, 26b.

Furthermore, the driving moon shafts 36 can be coupled to the drive shaft 24. According to at least one embodiment, the driving moon shafts 36 are rotationally coupled to the drive shaft 24. In this embodiment, the driving moon shafts 36 are coupled to the synchronizer system 38 and a correction component 40. The synchronizer system 38 and correction component 40 are optionally rotationally coupled to the drive shaft 24 and configured to rotate with the drive shaft 24. By fixing the driving moon shafts 36 to the synchronizer system 38 and the correction component 40, as the drive shaft 24 rotates, the driving moon shafts 36 and the driving moons 34 are can be caused to orbit around the drive shaft 24 at a speed corresponding to the speed of the drive shaft 24. As the axis of rotation is external to the driving moons 34, the driving moons 34 effectively orbit about the drive shaft 24 while also being enabled to rotate about their respective internal axes. The directions of the internal rotation and external orbital motion may be the same, or they may be in opposing directions. Embodiments of the synchronizer system 38 and the correction component 40 are described in greater detail hereafter. In this embodiment, such system and component are merely exemplary and may be directly or indirectly coupled to the driving moon shafts 36. In some embodiments, for instance, the driving moon shafts 36 may attach to plates or disks. Such plates or disks could also optionally cause the driving moons to be rotationally coupled to the drive shaft 24. Such plates or disks, or other components could provide other features such as radially moving the driving moons 34 and/or causing selective rotation of the driving moons 34.

As the driving moons 34 orbit around the drive shaft 24, the driving moons 34 can each enter into and out of engagement with the wrapping member 28. More particularly, the drive shaft 24 can rotate. By virtue of the driving moons 34 being linked to the drive shaft in this embodiment, the driving moons 34 can rotate about the drive shaft 24 at the same or a different rotational speed. While undergoing such orbital motion, the driving moons 34 will alternately engage the wrapping member 28.

For instance, in an exemplary embodiment, the driving moons 34 may be angularly spaced at approximately one-hundred twenty degree intervals. When one driving moon 34 orbits to a position that approximately coincides with a portion where the wrapping member 28 first engages the sheave 26, the driving moon 34 may engage the wrapping member 28. Such a driving moon 34 can then remain engaged with the wrapping member 28 through a portion of the orbital path of the driving moon 34, as that orbital path may have a size corresponding to the curved path of the wrapping member 28 around the sheave 26. The engaged driving moon 34 may then disengage from the wrapping member 28 at approximately a location where the wrapping member 28 disengages from the sheave 26. It should be appreciated that the angular interval over which driving moons 34 remain engaged with the wrapping member 28 can vary based on the specific design of transmission 10. For example, in one embodiment, each of driving moons 34 may remain engaged for an angular interval of approximately one-hundred eighty degrees, however other intervals are contemplated (e.g., intervals varying from about one-twenty degrees to about two-hundred forty degrees). Additionally, the wrapping member 28 can engage the driving moons 34 and the sheave halves 26a, 26b, although in other embodiments the wrapping member 28 may engage only the driving moons 34, or the driving moons 34 may be removed or retracted so that the wrapping member 28 engages only the sheave halves 26a, 26b. Additionally, in one embodiment according to the present disclosure, the driving moons 34 carry substantially the full load and the sheave halves 26a, 26b can be eliminated.

By virtue of the orbital motion of the driving moons 34 around the drive shaft 24, at least one driving moon 34 can remain in mesh with wrapping member 28 at all times at which the wrapping member 28 rolls around the sheave 26. The same driving moon 34 need not, however, be engaged with the wrapping member 28 at all times, and the driving moons 34 can alternately engage the wrapping member 28. Moreover, more than one of driving moons 34 may be engaged with the wrapping member 28 at the same time. For example, in the embodiment in FIG. 1 the two illustrated driving moons 34 may both be engaged simultaneously with the wrapping member 28.

Although it is not necessary that the driving moons 34 and the sheave halves 26a, 26b be utilized together in all embodiments, the use of the driving moons 34 with the sheave halves 26a, 26b to drive the wrapping member 28 provides various features that may be desirable in some applications. For example, existing transmission systems may employ a belt drive that operates around a sheave. Such systems rely on frictional engagement between the belt and sheave to operate. As with any friction-based system, the friction element is required to allow the sheave to engage and transfer power to the belt. More particularly, with insufficient friction, the belt can slip relative to the sheave, thereby reducing the efficiency of the power transfer. Indeed, in any such friction-based system, at least some amount of slip occurs. Slippage of the belt relative to the sheave leads to inefficiencies in the system. While the slippage can be reduced, the cost is typically an increase in friction which also leads to inefficiencies at least in the form of added heat generation.

In the present embodiment, however, the use of the driving moons 34 between the sheave halves 26a, 26b can eliminate or at least significantly reduce the slippage between the wrapping member 28 and the sheave 26. This is particularly so in embodiments in which the wrapping member 28 is a chain and the driving moons 34 are sprockets or other gears. For instance, in such an embodiment, the transmission 10 can include an optional locking system 42. The locking system 42 may act as a brake that locks such sprockets or other driving moons 34 when they are under load (e.g., at one or more locations of the driving moons 34 during which the driving moons 34 are in mesh with the wrapping member 28). The locking system 42 may specifically lock the driving moons 34 to avoid counter-rotation about their internal axes, and optionally locks the driving moons 34 against any rotation about their internal axes. By locking the driving moons 34, the driving moons 34 may resist slippage of the wrapping member 28 relative to the sheave 26.

Additionally, friction-reliant systems have heretofore been suitable for some applications, but largely impractical for other applications for one reason or another. For example, a belt-drive system that relies on friction between the belt and sheave or pulley has not been shown to be suitable for high torque applications. For instance, a belt may be made of a polymeric material that operates between two sheaves. The higher the torque, the higher the frictional forces and the heat generation. If a large amount of torque is applied, the frictional forces create heat that can burn through or otherwise degrade the polymeric belt, and may also cause a torque spike. Even if such polymeric materials are combined with composites, metals, and the like, the high heat creates wear on the belt and/or sheaves and significantly reduce their useful lifecycle. Furthermore, if the polymeric material were to be replaced with metal materials, there could be better properties for heat resistance and possibly for heat generation. However, the metal-to-metal contact would result in reduced frictional properties, thereby leading to increased slippage.

While the foregoing describes some limitations of existing belt-and-sheave systems, the transmission 10 described herein may be used in any of the scenarios or embodiments disclosed herein, including embodiments in which the driving moons 34 are eliminated, and the sheave operates as a largely friction-based system with polymeric, metal, composite, or other belt and sheave materials. However, when the driving moons 34 are included and used in combination with the sheave 26, various desirable characteristics can be obtained. For example, even if the wrapping member 28 is made of a material that is prone to slippage, the driving moons 34 can engage the wrapping member 28 and the wrapping member 28 continues to rotate around the sheave 26. Thus, the driving moons 34 can operate as an additional drive that may not only reduce slippage relative to the sheave 26, but can also provide an additional input so that friction between wrapping member 28 and the sheave 26 is reduced. In some embodiments, the sheave 26 may thus be used largely for positioning of the wrapping member 28, while the driving moons 34 are primarily used for power transfer to the wrapping member 28.

As discussed previously, the wrapping member 28 may engage the sheave 26 and orbit therearound. However, the radius of such orbit about the sheave 26 may change as the sheave halves 26a, 26b move axially, thereby also causing the wrapping member 28 to move radially inward or outward. As will be appreciated in view of the disclosure herein, the driving moons 34 may thus engage the wrapping member 28 at one position of the sheave 26. If, however, the sheave 26 changes its axial position, the driving moons 34 may either become disengaged from the wrapping member 28, or obstruct movement of the wrapping member 28 to a correspond to a new position of the sheave 26.

To account for such changes to the sheave 26 and the wrapping member 28, the driving moons 34 may be configured to move radially relative to the drive shaft 24, although in other embodiments it may not be necessary for the driving moons 34 to move radially. For instance, a wrapping member 28 may be connected to a sheave of the output system 20 and to the driving moons 34 of the input system. As the sheave in the output system 20 moves, thereby causing the wrapping member 28 to change position about the driven member 30, the wrapping member 28 may remain engaged with the driving moons 34 of the input system 18. The wrapping member 28 can thus remain positively engaged with the driving moons 34 and, particularly if a tensioner is used, can reduce or prevent slippage of the wrapping member 28.

Alternatively, the driving moons 34 may themselves move radially inward and outward to correspond to axial movement by the sheave 26, such that the driving moons 34 can remain engaged with the wrapping member 28 as the wrapping member 28 moves radially inward and/or outward relative to the drive shaft 24. Any suitable mechanism may be used for synchronizing movement of the driving moons 34 and the sheave halves 26a, 26b. In FIG. 1, for instance, the synchronizer system 38 is coupled to the driving moon shaft 36 and includes the sheave actuators 32. The synchronizer system 38 may obtain information relating to the desired position of the sheave 26 and cause the sheave actuators 32 to move the sheave 26, while also causing the driving moon shaft 36 to move a corresponding amount to maintain engagement between the driving moon 34 and the wrapping member 28.

The synchronizer system 38 may include or use an electromechanical or other device, such as a controller, that controls the sheave actuators 32 and/or components for moving the driving moons 34. Additionally, or alternatively, a sensor or encoder that detects a corresponding position of the sheave halves 26a, 26b may be used to identify proper radial movement of the driving moons 34. The synchronizer system 38 may also have logic stored therein. For instance, a logic component may be able to use information about an engine speed or gear ratio and move the sheave 26 and driving moons 34 to proper locations. A logic component may also be used in connection with a sensor or encoder and cause a mechanical, hydraulic, pneumatic, electrical, or some other mechanism, or a combination of the foregoing, to adjust the position of the driving moon shaft 36 based on sheave 26 positioning. In other embodiments, the synchronizer system 38 does not include a logic storage for moving the driving moons 34. For instance, a mechanical system may relate movement of the sheave 26 to movement of the driving moon shaft 36 such that the synchronizer system 38 can move one or both of the sheave 26 and the driving moons 34 using a purely mechanical system.

Some embodiments of the present disclosure thus relate to a transmission in which driving members (e.g., sheave 26 and/or driving moons 34) move axially or radially to produce gear ratio changes. Accordingly, the sheave 26 is one example of a means for driving a wrapping member 28. Further, the driving moons 34 are individually and collectively also one example of a means for driving a wrapping member 28. Furthermore, movement of the wrapping member 28, driving moons 34 and/or sheave 26 may occur while at least some of the driving members are under load. The sheave 26 and/or the driving moons 34 may also cause the wrapping member 28 to move. Thus, the sheave 26 is one example of a means for radially positioning a wrapping member 28. Similarly, the driving moons 34 are individually and collectively, one example of a means for radially positioning a wrapping member. Particularly for embodiments in which the transmission 10 includes a chain as the wrapping member 28, another aspect to consider is the radius of the sheave 26 and the corresponding radius of the wrapping member 28 around the sheave 26. In particular, the radius of the wrapping member 28 may correspond to a non-integer position as described below.

In particular, the inventors hereof have identified various challenges that can occur when a positive engagement transmission attempts to slide between gear ratios in very small, and possibly infinitely small, increments. More particularly, a positively engaged transmission can make use of gear teeth and/or chain links to maintain tooth engagement that does not rely primarily on friction. For instance, meshing gear teeth can mate in tooth-to-tooth engagement according to the principles of involutometry, and frictional effects of the engagement can be considered negligible. Similarly, a sprocket or other gear can mate with a chain and similar tooth engagement with the chain can drive, or be driven by, the chain, with minimal friction considerations.

Positive engagement largely performs well because engagement of gear teeth and/or chain links can be considered relatively frictionless because a gear or chain has constant and fixed characteristics. For instance, mating gear teeth may be on gears of different sizes, but can still mesh properly where the teeth have the same pitch. Similar meshing occurs for a gear tooth on a sprocket that engages a link of the chain when the chain link and the gear tooth have the same pitch. In a conventional sprocket and chain system, the sprocket remains in a fixed radial position relative to its rotational center. The sprocket is also equally divisible into an integer number of teeth, and there are no partial teeth around the circumference of the sprocket. As a result, after each full rotation of the sprocket, the gear teeth are in the same position.

In the transmission of FIG. 1, the driving moons 34 can collectively act as a sprocket. However, unlike a conventional sprocket, the radial position of the gear teeth can change relative to the rotational center (i.e., the drive shaft 24). One challenge of sliding between gear ratios with fixed sizes of driving members has been termed by the inventors hereof the non-integer tooth problem. In short, the non-integer tooth problem is that as a set of gears moves radially, there are only certain, discrete radii at which the circumference of the path of the orbiting gears is wholly divisible by the pitch of the gear teeth and/or chain links. At other locations, the circumference of the drive mechanism is not equally divisible by the pitch of a chain link or sprocket. Consequently, after each full rotation of the set of driving moons 34, the gear teeth do not necessarily end up in the same position in which they started.

To account for such variations, the illustrated embodiment of the transmission 10 includes a correction component 40. In effect, the correction component 40 measures or otherwise determines an amount by which teeth of the driving moons 34 are offset with respect to a desired position for engagement with the wrapping member 28, and then corrects such tooth position. Such a determination can be made using an encoder, sensor, mechanical system, or some other component, or a combination of the foregoing. In the illustrated embodiment, the correction component 40 is coupled to the driving moon shaft 36. Based on such a determination, the correction component can determine the amount by which the rotation of the driving moon 34 is to be corrected about their own axes. Using a hydraulic, pneumatic, electrical, mechanical, or other actuator, or a combination of the foregoing, the correction component 40 can then adjust the position of the driving moons 34.

In the illustrated embodiment, the correction component 40 is coupled to the driving moon shafts 36. Accordingly the correction component 40 can implement the correction by rotating the driving moon shafts 36, thereby also causing the driving moons 34 to rotate a corresponding amount. It will be appreciated in view of the disclosure herein that the correction that occurs may occur to each driving moon 34 at a different time. For instance, as noted previously, rotation of the driving moons 34 may be locked using the locking mechanism 42. Such locking mechanism 42 may operate while the driving moons 34 are under load. The correction component 40 may adjust positioning of the driving moons 34, including any gear teeth thereon, while the driving moons 34 are not under load. By way of illustration, the correction component 40 may correct a gear tooth location during the portion of the orbit of the driving moon 34 around the drive shaft 24 during which the driving moon 34 is disengaged from the wrapping member 28. The driving moon 34 can then be brought into alignment with the wrapping member 28 at least just before the driving moon 34 reenters into engagement with the wrapping member 28.

Without corrections for the non-integer tooth problem, a transmission operating with gear ratio changes that occur at very small increments, and even in infinitely small increments, may operate but encounter some difficulties in certain circumstances. For instance, teeth may mesh properly at one radial location of the driving moons 34 and/or wrapping member 28 (e.g., at a position which is equally divisible into an integer number of teeth or chain links), but may not properly mesh at a second location (e.g., at a position which is not equally divisible into an integer number of teeth). There may also be some raking between the teeth. In either case, the transmission, although functional, can operate at a lower efficiency and with less desirable wear characteristics. Thus, in the illustrated embodiment, the optional correction component 40 allows for efficient correction of the driving moons 34. As a result, as the wrapping member 28 and driving moons 34 move to provide gear ratios in very small, or infinitely small, increments, teeth on the driving moon 34 can be corrected as necessary so as to maintain proper engagement at both integer and non-integer locations of the driving moons 34 and wrapping member 28.

With continued reference to FIG. 1, the transmission 10 also includes an optional differential system 22. The differential system 22 can act in any number of different manners and provide a number of different functions. For instance, the differential system 22 can allow the transmission 10 to maintain engagement between a power source and a load, even when the transmission output 14 has zero rotational speed. The differential system 22 can also split torque such that the input and output systems 18, 20 run under less load. In another embodiment, the differential system 22 can cause further gear ratio changes within the transmission 10.

In FIG. 1, the differential system 22 is connected to both the transmission input 12 and the transmission output 14. Furthermore, the differential system 22 can be connected to the driven member 30. For instance, in one embodiment, the transmission input 12 and the driven member 30 provide two inputs to a differential component 46. The two inputs can be provided directly or indirectly, and the differential system 22 can combine the two inputs and provide the resultant output, which may be zero, to the transmission output 14.

To use inputs from both the transmission input 12 and the driven member 30, the differential system 22 of FIG. 1 includes an input relay member 48. In this embodiment, the input relay member 48 may include a gear, pulley, sheave, belt, or other member. The input relay member 48 can be directly or indirectly coupled to the transmission input 12. As a result, as a power input is received by the transmission 10, the transmission input 12 may rotate and the input relay member 48 can experience a corresponding rotation. The input relay member 48 is, in this embodiment, coupled to a first transfer member 50. The first transfer member 50 may be coupled to the input relay member 48 in a manner that transfers rotational power. For instance, the first transfer member 50 may be a gear that engages the input relay member 48. As the input relay member 48 rotates, the first transfer member 50 also rotates. The first transfer member 50 may engage a second transfer member 52 and transfer a corresponding rotation thereto.

In the illustrated embodiment, the second transfer member 52 rotates about a central axis, and a differential input shaft 54 is coupled to the second transfer member 52. As the second transfer member 52 rotates, the differential input shaft 54 also rotates. The differential input shaft 54 may extend into the differential component 46. In one embodiment, the differential input shaft 54 passes through a second differential input member 56 that is also coupled to the differential component 46. For instance, the second differential input member 56 may be a gear with an opening therein, and the differential input shaft 54 may pass through the opening and into the differential component 46. In other embodiments, power from the transmission input 12 may be passed to a differential input shaft 54 in other manners. For instance, a pass-through shaft may extend through the drive shaft 24, or be integral therewith, and directly or indirectly connect to a differential input shaft.

The driven member 30 may also provide an output as described herein. For instance, as the wrapping member 28 rotates, the driven member 30 may rotate about its own axis. In some embodiments the driven member 30 is coupled to an output member 58. For instance, a shaft, belt, pulley, gear train, or other mechanism, or a combination thereof, may rotationally couple the driven member 30 to the output member 58. As a result, as the driven member 30 rotates, the output member 58 may also rotate. In this embodiment, an output transfer member 60 may be coupled to the output member 58 and the second differential input member 56. For instance, the output member 58 and the output transfer member 60 may be gears that are engaged with each other. The second differential input member 56 may also be a gear that engages the output transfer member 60. Consequently, rotation of the output member 58 is transferrable to the output transfer member 60 and the second differential input member 56.

In at least one embodiment, the differential input shaft 54 and the second differential input member 56 both provide inputs to the differential component 46, and the differential component 46 combines the two inputs into a single output. The single output may be provided to the transmission output 14. For instance, the differential component 46 may be coupled to the second differential input member 56. By way of illustration, a housing of the differential component 46 may be rotationally fixed relative to the second differential input member 46, such that as the second differential input member 46 rotates, the housing of the differential component 46 also rotates about a central axis. The differential input shaft 54 may, however, be journaled with respect to the housing, or otherwise configured to rotate in a manner that does not necessarily cause the housing of the differential component 46 to rotate. Instead, the differential input shaft 54 may engage one or more gears, rollers, belts, pulleys, or other members within the differential component 46. The rotational input of the differential input shaft 54 can combine with the rotation of the housing of the differential component 46 to produce an output that is conveyed to the transmission output 14.

1. Two-sheave Transmission Embodiment

Figure 2:
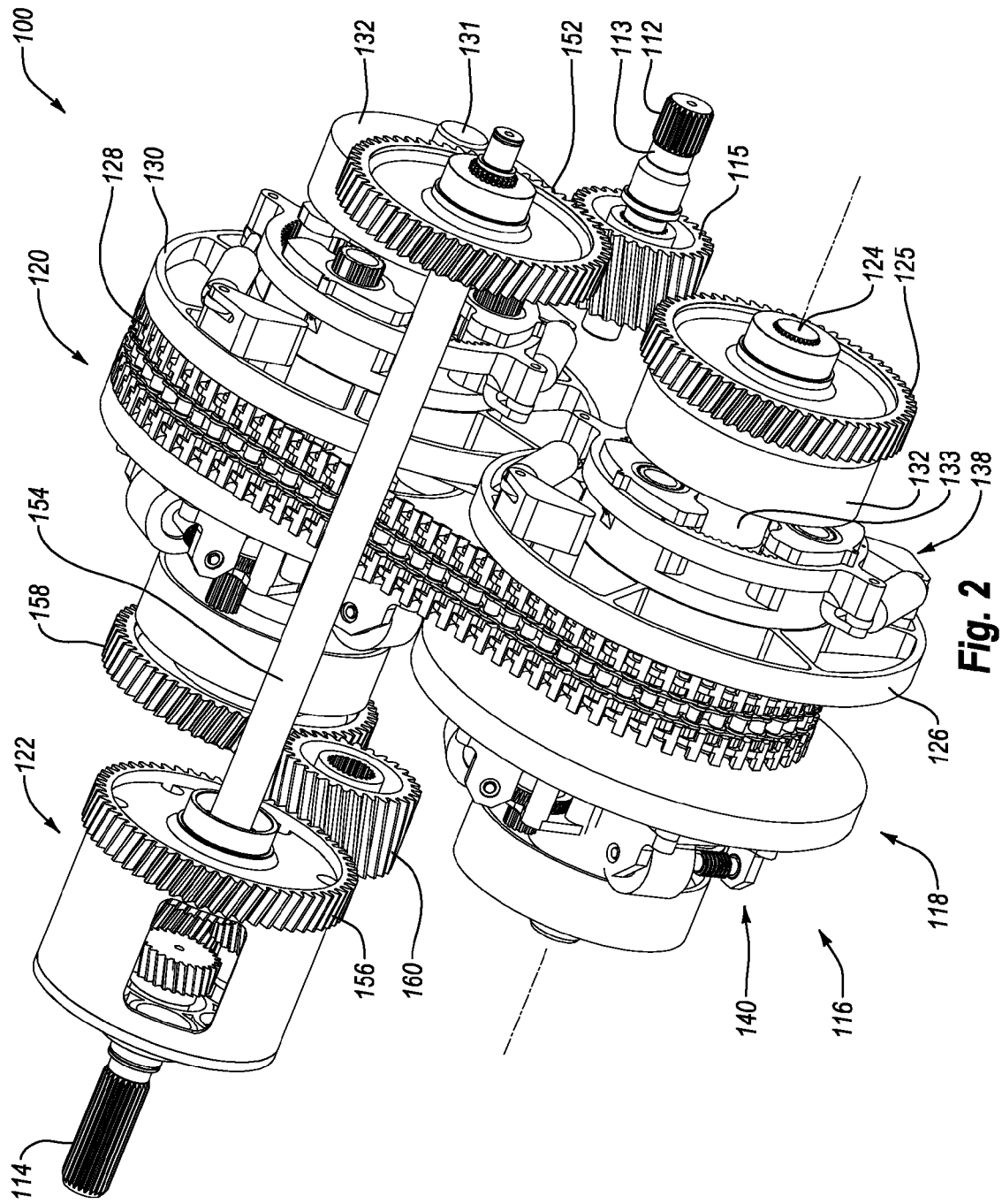
FIG. 2 illustrates a perspective view of an exemplary transmission according to another example embodiment of the present disclosure.

Turning now to FIG. 2, an example embodiment of a transmission 100 is illustrated according to certain exemplary aspects of the present disclosure. The transmission 100 can operate in a manner similar to that described above relative to transmission 10 of FIG. 1. To avoid unnecessarily obscuring aspects of the illustrated embodiment, components, systems, and assemblies of the transmission 100 that operate in a manner consistent with that of transmission 10 will not be further discussed, or will be treated briefly. Accordingly, the following discussion of the transmission 100 will primarily relate to components that can supplement or replace, or otherwise vary from, components of the transmission 10 of FIG. 1. Unless otherwise stated, each component or feature of transmission 100 is considered to be interchangeable with those of other particular transmission embodiments disclosed herein, both individually and in combination with other components.

As shown in FIG. 2, the transmission 100 includes a transmission input 112. The transmission input 112 may be adapted to receive a rotational power input from a power supply and to transmit the received input through a drive system 116 and to a transmission output 114. The rotational speed of the transmission output 114 may also be related to the rotational speed of the transmission input 112 by a gear ratio that is defined at least in part by the drive system 116.

In the illustrated embodiment, the drive system 116 includes an input system 118, output system 120, and a differential system 122. The input system 118 receives power from the transmission input 112. More particularly, in this embodiment, the transmission input 112 includes a rotating shaft 113 on which a transfer gear 115 is positioned. The transfer gear 115 can rotate at the same rotational speed as the rotating shaft 113. The input system 118 can further include a drive shaft 124 having thereon a relay gear 125. In this embodiment, the relay gear 125 mates with the transfer gear 115 on the rotating shaft 113. Accordingly, as the transfer gear 115 rotates, the relay gear 125 also rotates and can cause the drive shaft 124 to rotate at a speed that is the same or different than the transmission input 112.

The drive shaft 124 can rotate about a longitudinal axis passing through the center of the drive shaft 124. Various components may also be connected to the drive shaft 124. For instance, in this embodiment, a sheave 126 is secured to the drive shaft 124, and the sheave 126 may be configured to rotate at the same speed as the drive shaft 124. By way of example, the sheave 126 may be mechanically secured to the drive shaft 124 using a weld, spline connection, or other mechanism, or a combination of the foregoing. In some embodiments, the connection between the drive shaft 124 and the sheave 126 allows the sheave 126 to rotate at a different rotational speed than the drive shaft 124.

Figure 3:
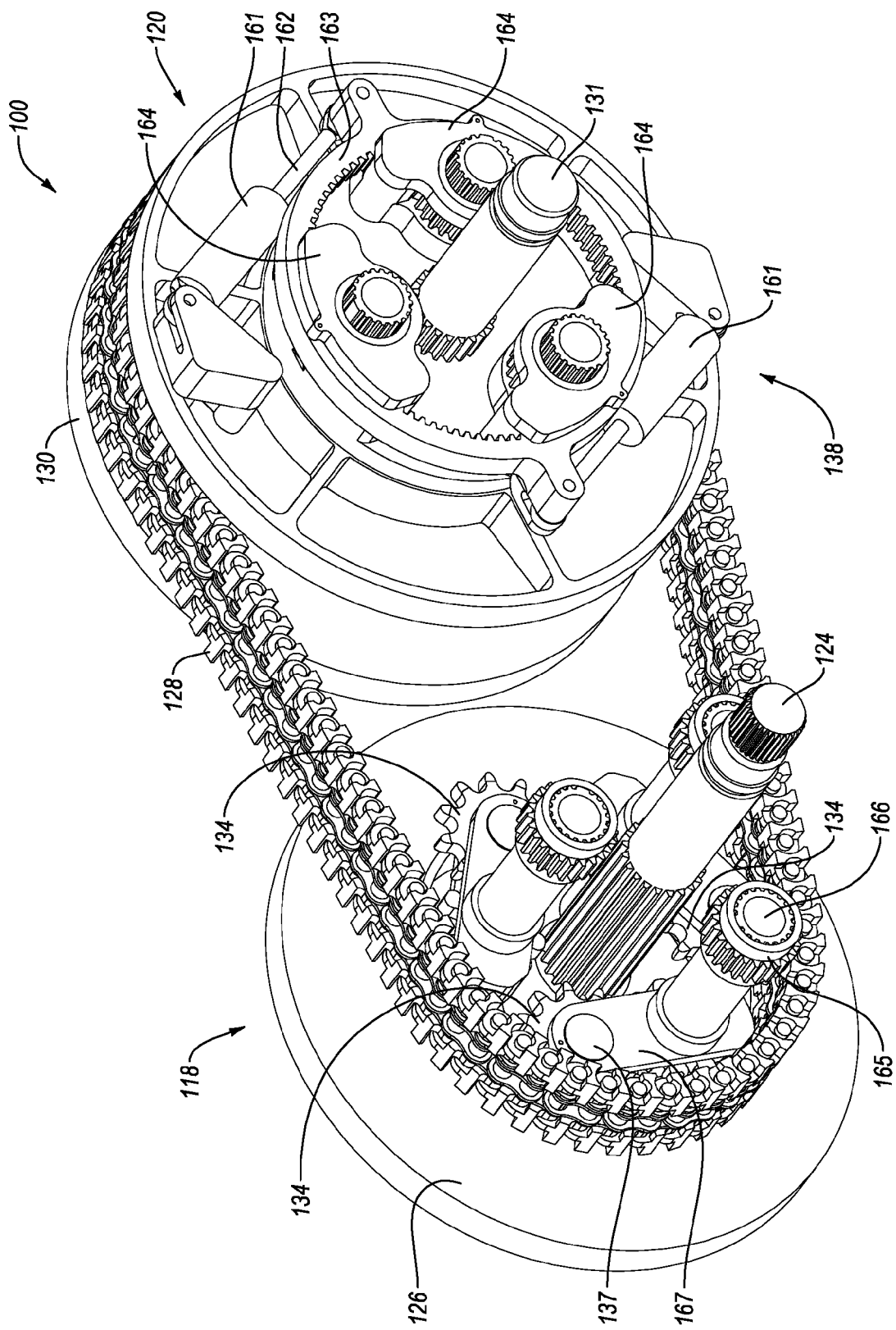
FIG. 3 illustrates a partial perspective view of the transmission of FIG. 2, including an exemplary embodiment of a synchronization system.

Within the sheave 126 are a set of three driving moon gears 134 (see FIG. 3). The three driving moon gears 134 can cooperate with the sheave 126 to drive a chain 128. In particular, in this embodiment, a chain 128 is wrapped around a portion of the sheave 126 and extends between the sheave 126 and the output system 120.

As discussed above with respect to transmission 10, the transmission 100 may also be a variable transmission that can accommodate a large, possibly infinite, number of gear ratios. For instance, the sheave 126 and driving moon gears 134 may be radially moveable. Consequently, as the sheave 126 and driving moon gears 134 move inward or outward in respective axial and radial directions, the path of the chain 128 can be altered. By altering the path of the chain 128, the gear ratio can change within the transmission 100. In some embodiments, the sheave 126 and the driving moon gears 134 move in very small, and possibly infinitely small, increments, to provide a large, possibly, infinite, number of gear ratios.

In the illustrated embodiment, the output system 120 also includes a sheave 130. The sheave 130 can act as a driven member as the sheave 130 is engaged by the chain 128, and rotation of the sheave 130 can be caused by the chain 128. In some embodiments, the sheave 130 has a set of driven moon gears (not shown) therein. The sheave 130 and driven moon gears of the output system 120 may, in such an embodiment, be substantially identical to the sheave 126 and driven moon gears 134 of the input system 118, although the input and output systems 118, 120 can have different sheaves and driving or driven members. Accordingly, the sheave 130 and driven moon gears can move in respective axial and radial directions to further facilitate changes in gear ratio.

Sheave Actuators

As discussed with reference to FIG. 1, a transmission may have one or more sheaves and one or more driving moons that move radially inward and/or outward to adjust the gear ratio of the transmission. The transmission 100 illustrated in FIG. 2 is similarly configured. For instance, in the illustrated embodiment, the input and output systems 118, 120 each include a set of sheave actuators 132. On the input system, for instance, the sheave actuators 132 are aligned on the drive shaft 124. The sheave actuators 132 can include a piston 133 that can be moved axially relative to the drive shaft 124. For instance, the sheave actuators 132 may be hydraulically controlled. As hydraulic pressure is increased within the sheave actuators 132, the pistons 133 may move axially along the drive shaft 124 in a direction extending towards the sheave 126. The increased pressure can cause the pistons 133 to exert a retracting force on the sheave 126. In particular, the pistons 133 may cause opposing halves of the sheave 126 to draw closer together. As a result, a beveled internal groove of the sheave can cause the chain 128 to move radially outward relative to the drive shaft 124.

In contrast, if the pressure on the pistons 133 is backed-off, such that the pistons 133 move axially along the drive shaft 124 in a direction extending away from the sheave 126, one or both halves of the sheave 126 may move axially outward relative to the other. The beveled internal surface of the sheave 126 may then allow the chain 128 to move radially inward relative to the drive shaft 124. The sheave 126 may be spring loaded or otherwise biased to facilitate axial movement as the force exerted by the pistons 133 is backed-off. Such a biasing mechanism is, however, merely exemplary. In other embodiments, no biasing mechanism is used and the force of the chain 128 on the sheave 126 and/or the centrifugal forces on the sheave 126 as a result of the rotation of the sheave 126 around the drive shaft 124 may be sufficient to move the sheave in a radially outward direction. The sheave 130 of the output system 120 may be configured in a manner similar to that disclosed for the sheave 126 of the input system 128. For instance, the sheave 130 may rotate on an output drive shaft 131. Sheave actuators 132 may be positioned about the output drive shaft 131 and include pistons 133 that cause halves of the sheave 130 to move radially inward and outward relative to each other in a manner similar to that previously described.

While the foregoing description of the sheave actuators 132 describes the use of a hydraulic actuator and piston configuration, such an embodiment is merely exemplary. The sheave actuators 132 may be any suitable type of actuator that facilitates movement of one or both halves of a sheave 126, 130 along an axis. For instance, other examples of suitable sheave actuators 132 may include pneumatic actuators, worm gearing, electrical stepper or servo motors, or other actuators, or any combination of the foregoing.

As will be appreciated in view of the disclosure herein, as a sheave 126, 130 changes its axial position, the chain 128 may move radially inward or outward a corresponding distance, based on a bevel angle of an interior surface of the sheave 126, 130, to effect a gear ratio change. In one exemplary embodiment, a sheave actuator 132 may be used in connection with a controller that provides a signal that causes the sheave 126 to move radially outward, thereby causing the chain 128 to rotate around a smaller radial section of the sheave 126. If the sheave 130 remains the same size throughout such a change, slack may be introduced into the chain 128. To maintain tension in the chain—which tension optionally remains about constant at multiple different gear ratios—a tensioning mechanism may be used. In one embodiment, the tensioning mechanism is at least partially integral with the synchronization system 138. For instance, the chain 128 may be tensioned by making a corresponding adjustment to the size and/or position of the sheave 130, to thereby maintain a desired tension in the chain 128. Thus, the second sheave 130 can act as a tensioning device. In other embodiments, however, other tensioning devices may be used. For instance, one or more idlers or tensioning gears may be placed along an interior or exterior of the perimeter of the chain 128, and may be movable to change the alignment of the chain 128 in a manner that produces a desired tension in the chain 128 while the transmission 100 is at a particular gear ratio and/or while the transmission 100 changes between gear ratios.

Synchronizing Sheaves and Moon Gears

As the sheaves 126, 130 move axially inward or outward (e.g., by having one or more halves of the sheaves 126, 130 that can move axially along a respective drive shaft 124, 131), the chain 128 can experience a corresponding positional change. More particularly, as the halves of the sheave 126 move in an inward axial direction, the chain 128 may move on the sheave 126 and in a radially outward direction relative to the drive shaft 124. In contrast, as the halves of the sheave 126 move in an outward axial direction, the chain 128 may move on the sheave 126 in a radially inward direction relative to the drive shaft 124. Similarly, as the halves of the sheave 130 move axially inward or outward, the chain 128 can move radially outward or inward, respectively, on the sheave 130 and relative to an output drive shaft 131.

In embodiments in which the input and output systems 118, 120 include driving moon gears 134 (FIG. 3) that act with the sheaves 126, 130 to engage the chain 128, the driving moon gears 134 may also move in a radial direction relative to the drive shaft 124 and the output drive shaft 131. FIG. 3 illustrates a portion of an exemplary synchronization mechanism by which radial movement of the moon gears 134 can be synchronized with axial movement of the sheaves 126, 130.

In particular, FIG. 3 illustrates a partial view of the transmission 100 in which various components of the transmission 100 have been removed to more clearly illustrate an exemplary manner in which the synchronization system 138 operates. Inasmuch as the input and output systems 118, 120 of the transmission 100 can operate in similar manners, components of the synchronization system 138 in FIG. 3 are shown as being located on either the input system 118 or the output system 120. It should be appreciated, however, that such illustration is merely for simplicity and that each of the illustrated components of the synchronization systems 138 can be included and operate on both the input system 118 and the output system 120.

In FIG. 3, two adjustment actuators 161 are illustrated. Each adjustment actuator 161 is shown as being coupled to a half of the sheave 130, although corresponding adjustment actuators 161 can be connected to respective halves of the sheave 126. As halves of the sheaves 126, 130 move axially inward or outward, the chain 128 can change its radial position and the adjustment actuators 161 can be activated. The actuators 161 have, in this embodiment, an arm 162 coupled to an adjustment ring 163. The arm 162 may be selectively extended or retracted. As the length of the arm 162 changes, the arm 162 can cause the ring 163 to rotate. For example, the arms 162 can be fixed to the sheave 130 and by increasing the length of the arms 162, the adjustment actuator 161 may cause the ring 163 to move in a clockwise direction in the illustration in FIG. 3, whereas retracting the arms 162 may cause the ring 163 to move in a counterclockwise direction. Such directions and motions, as well as the operation of adjustment actuators 161, are merely for illustration.

In FIG. 3, three housings 164 are connected to the adjustment ring 163. Each of the housings 162 is angularly offset from the other housings 164 at about a one-hundred twenty degree interval, and each housing 162 generally corresponds to a placement of a driving moon gear 134. Within each housing 164 is an adjustment gear 165 that can meshes with gear teeth on the interior surface of the adjustment ring 163. Each adjustment gear 165 is, in this embodiment, also coupled to a shaft 166 that extends inwardly, toward a respective driving moon gear 134. On the distal end of shaft 166 is a pivoting arm 167 that connects to one of driving moon gears 134 via a stub shaft 137 about which the driving moon gears 134 can rotate.

The synchronization system 138 collectively, and each of the individual components illustrated in FIG. 3, are one example of a means for radially moving driving moon gears 134 relative to the drive shaft 124. Moreover, when the synchronization system 138 coordinates such radial movement with axial movement of the sheaves 126, 130, the driving moon gears 134 can remain engaged with the chain 128 at various radial positions of the chain 128, and even during changes from one radial position of the chain 128 to another. As a result, the synchronization system 138 provides a mechanism for maintaining constant, positive engagement between the chain 128 and at least the driving moon gears 134 at not only discrete gear ratios, but throughout movement from one ratio to another, and while one or more of the driving moon gears 134 is under load. Thus, the chain 128 and the driving moon gears 134 can be positively engaged throughout very small, and possibly infinitely small, gear ratio changes, and thus through a corresponding infinite number of different ratios. In other words, the transmission 100 not only has the possibility, but not requirement, of maintaining substantially constant frictional engagement (e.g., between the chain 128 and the sheaves 126, 130), but can also maintain constant positive engagement (e.g., engagement between the chain 128 and the driving moon gears 134) over a range of very small, and possibly infinitely small, ratios.

The manner in which the various components of the particular embodiment provide such engagement can be appreciated from the illustration in FIG. 3. In particular, as the adjustment ring 163 rotates, the interior teeth of the adjustment ring 163 engage and rotate the adjustment gears 165. The adjustment gears 165 may be coupled by a spline or other connection to the shafts 166, and therefore may also rotate. The rotation of the shafts 166 may, in turn, cause the pivoting arms 167 to rotate. Inasmuch as the driving moon gears 134 can be connected to the pivoting arms 167, the driving moon gears 134 may then also pivot around the center of the shafts 166. The amount of rotation of the driving moon gears 134 around the shafts 166 can vary, and it is not necessary that the driving moon gears 134 be able to rotate fully around the shafts 166. For instance, in one embodiment, the arms 167 and driving moon gears 134 rotate a maximum of between about fifteen and about ninety degrees around the shaft 166. In other embodiments, a maximum rotation of the arms 167 and driving moon gears 134 relative to the shaft 166 is between about thirty and about sixty degrees.

As the pivoting arms 167 and the driving moon gears 134 rotate relative to the shafts 166, the driving moon gears 134 can move radially inward or outward along a curved path that extends from an innermost position to an outermost position, and can move in very small, or possibly infinitely small, increments. In this manner, selective activation of the adjustment actuators 161, can thereby cause the driving moon gears 134 to move radially inward or outward with the movement of the sheaves 126, 130, and thus facilitates constant tooth engagement between the teeth of the driving moon gears 134 and pockets in the chain 128.

Moon Gear Correction and Braking

Optionally, the transmission 100 includes a correction mechanism that allows for correction of the location of teeth of the driving moon gears 134. Consequently, as the chain 128 and the driving moon gears 134 move so as to provide various different gear ratios, the teeth of the driving moon gears 134 can have a rotational position corrected as necessary so as to maintain proper alignment with the chain 128 at both integer and non-integer positions of the chain 128.

Figure 4:
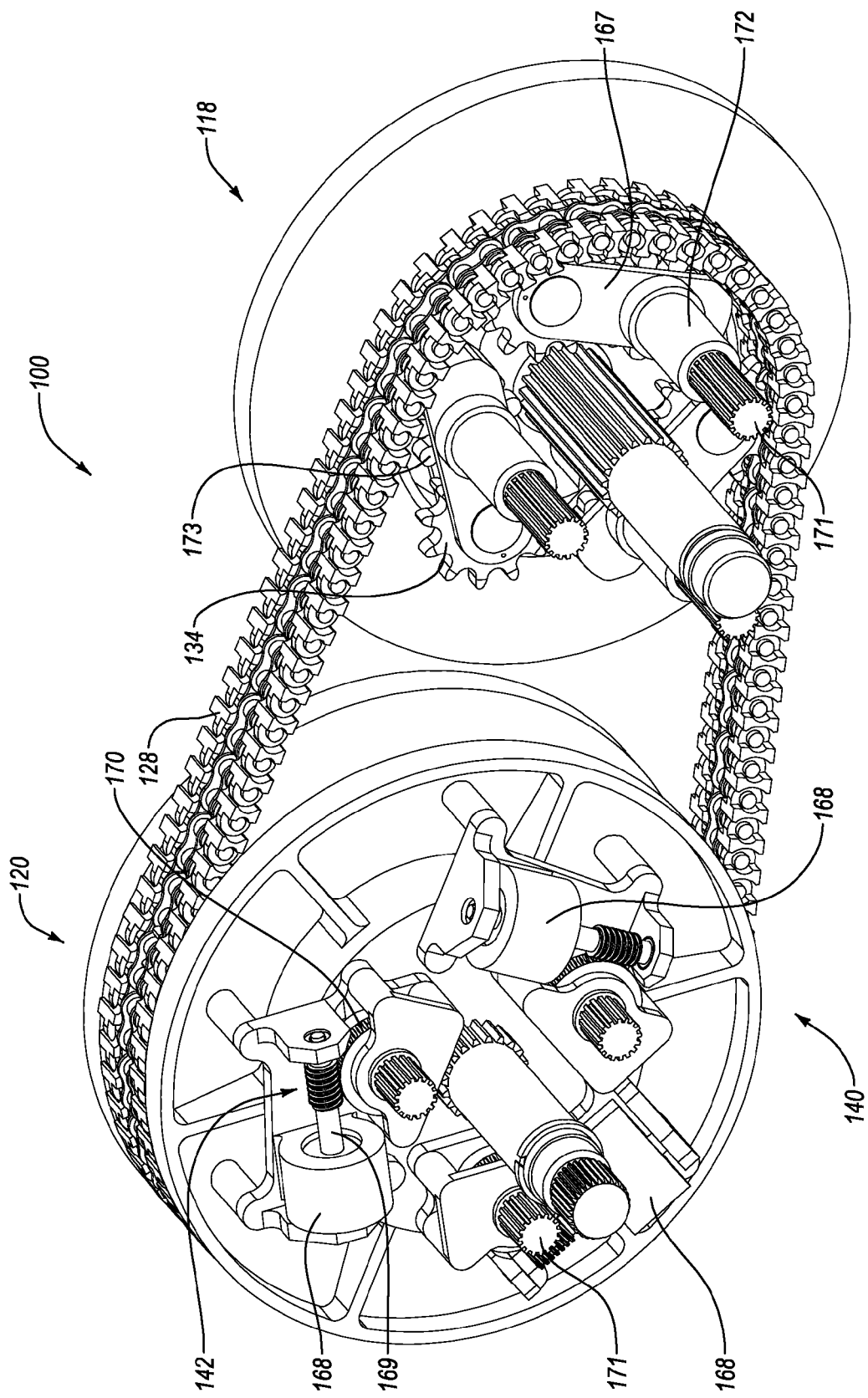
FIG. 4 illustrates a partial perspective view of the transmission of FIG. 2, including an exemplary embodiment of a correction system.

More particularly, FIG. 4 illustrates a partial view of the transmission 100 of FIG. 2. Similar to the illustration in FIG.

3, the transmission 100 in FIG. 4 is illustrated with various components removed so as to more clearly illustrate interior components of the transmission 100. For instance, the transmission 100 in FIG. 4 may be generally identical to transmission 100 of FIG. 2, but is illustrated without differential system 122, sheave actuators 132, and half of the sheave 126. Portions of the gear tooth correction mechanism are also removed on the input system 118 to more clearly illustrate various components thereof.

In one aspect, a correction system 140 is included in the transmission 100 and includes three correction actuators 168. The three correction actuators 168 can be a part of the input system 118 or the output system 120. In some embodiments, each of the input and output systems 118, 120 includes correction actuators 168. Each of the correction actuators 168 can be selectively activated so as to correct a corresponding rotational position of a driving moon gear 134, as necessary.

In particular, in this embodiment, the correction actuators 168 are each connected to a worm gear 169, and each worm gear 169 is maintained in mesh with a worm wheel 170. As the correction actuator 168 is selectively activated, the correction actuator 168 rotates the worm gear 169, and the worm gear 169 causes the worm wheel 170 to rotate. The worm wheels 170 may be mounted on corresponding correction shafts 171 which, in this embodiment, extend through tube 172 that in turn connects to the pivoting arm 167. Within the pivoting arm 167 of this embodiment is a correcting drive gear 173 that is mounted to the correction shaft 171. The correcting drive gears 173 may be engaged with the driving moon gears 134.

At least by virtue of the correction system 140, a position of the driving moon gears 134 can be corrected so that the teeth of the driving moon gears 134 remain in alignment with the chain 128 both at integer and non-integer locations of the chain 128. In particular, as noted previously, the worm gear 169 may cause the worm wheel 170 to rotate. Such rotation of the worm wheel 170 may cause the correction shaft 171 and the correcting drive gear 173 to rotate. As the correcting drive gear 173 is maintained in mesh with the driving moon gear 134, the rotation of the correcting drive gear 173 can be used to cause the driving moon gear 134 to rotate. Moreover, the rotation of the driving moon gear 134 is controllable based upon the position of the sheaves 126, 130. That is, as the sheaves 126, 130 move axially, the correction actuators 168 can be selectively engaged to rotate the driving moon gears 134 such that even at a non-integer positions of the chain 128, sheaves 126, 130 and/or driving moon gears 134, a tooth of the driving moon gear 134 can be aligned for proper meshing with the chain 128. Such control over the corresponding motions of the sheaves 126, 130, and the activation of the correction actuators 168, as well as the activation of the adjustment actuators 161 may be mechanically, electrically, and/or computer controlled. The correction system 140, collectively and its individual components, is thus one example of a means for correcting tooth positions of a driving moon gear 134.

It should also be appreciated that it is not necessary that each of the driving moon gears 134 be corrected at the same time. For example, each driving moon gear 134 can be corrected separately and/or independently. Indeed, in one embodiment, the driving moon gears 134 have their rotational positions corrected only while they are not under load. More particularly, correction may occur during the time a driving moon gear 134 is not engaged with the chain 128, and/or the transmission 100 may delay correcting a driving moon gear 134 until the driving moon gear 134 disengages from the chain 128.

The worm gear 169 described in connection with the correction system 140 can thus facilitate coordinating actuation of the correction actuators 168 and movement of the driving moon gears 134. The worm gear 169 may be replaced with another suitable type of gear; however, in some embodiments, the worm gear 169 may also be used to facilitate reduction of slip between the input system 118 and the chain 128. For instance, even if the chain 128 has the tendency to resist movement by the driving moon gear 134 and to slip relative to the input system 118, the transmission of torque through the driving moon gear 134 back through the correction actuator 168 can be substantially prevented or reduced. For instance, the worm gear 169 can act as a braking mechanism and resist such movement. Thus, the worm gear 169 may also act in some embodiments as a locking mechanism 142 that locks the driving moon gears 168 and prevents at least backward rotation of the driving moon gears 168. Moreover, while the worm gears 169 are the only worm gears illustrated, other gears may be worm gears, helical gears, bevel gears, spur gears, or have any other suitable gear configuration. Additionally, the actuators 161, 168 can be any suitable actuator, including at least stepper or servo motors. The locking mechanism 142 and the worm gear 169 are thus examples of means for locking rotation of the driving moon gears 134.

Differential System

Returning briefly to FIG. 2, the transmission 100 includes a transmission input 112 that is illustrated in the form of a shaft. As a torque is applied to the transmission input 112, a rotational input is provided and transferred through the transmission 100 in the manner described herein (including in the discussion of transmission 10). As shown in FIG. 2, the transmission input 112 can include an input gear 152 that mates with the transfer gear 115 of the transmission input 112. The input gear 152 can be integrally formed with, or attach to, a differential input shaft 154 that rotates as the input gear 152 is rotated by the transfer gear 115.

In FIG. 2, the input and output systems 118, 120 include sheaves 126, 130 that engage a chain 128. Optionally, the input and output systems 118, 120 also include driving moon gears 134 that engage the chain 128. As discussed herein, the sheaves 126, 130 and/or driving moon gears 134 can move with respect to the drive shafts 124, 131 to change a gear ratio of the transmission 100.

The input system 118 thus receives a power input through the transmission input 112 and transfers such power to the sheave 130 of the output system 120. The sheave 130 may be directly or indirectly coupled to the output drive shaft 131, such that as the sheave 130 rotates, the output drive shaft 131 also rotates. For instance, a counterclockwise rotation of the chain 128 may cause the sheave 130 and the output drive shaft 131 to rotate in a counterclockwise direction. Moreover, the rotational speed of the output drive shaft 131 can be geared up or down relative to the power received at the transmission input 112 by virtue of the gear ratio defined by the relative positions of the input and output systems 118, 120.

While the output drive shaft 131 may, in some cases, provide the final output of the transmission 100, it need not do so in all embodiments. Indeed, in the illustrated embodiment, the output of the shaft 114 is further geared through the differential system 122. The differential system 122, in the illustrated embodiment, can provide a variety of features, one of which may be an engaged neutral by which the input 122, while remaining positively connected to the load via the transmission output 114, nonetheless provides zero output speed.

More particularly, power in the transmission 100 is optionally split along multiple paths. As described above one path may include power transmitted through the input and output systems 118, 120 to the output drive shaft 131. Along a second path, as also described above, power can be transmitted from the transmission input 112 to the differential input shaft 154. The power transmitted to the output drive shaft 131 may optionally be combined with the output transmitted through the differential input shaft 154. For instance, the output drive shaft 131 may be attached to an output gear 158. The output gear can mate with an output transfer gear 160 that, in turn, engages a differential input gear 156. Such a transfer is merely exemplary, but illustrates one manner in which power can be conveyed from the output system 120 to a differential system 122.

Figure 5A:
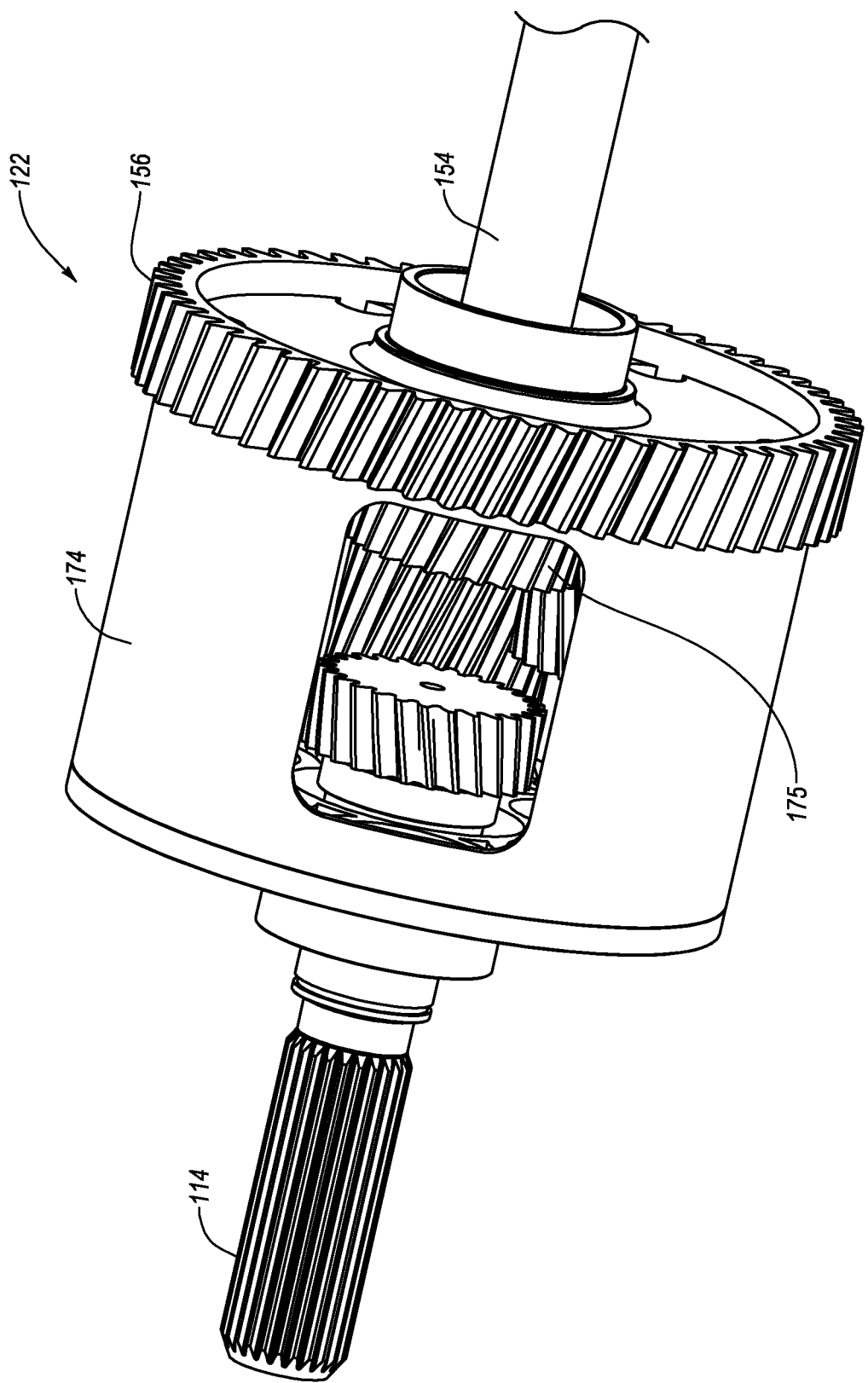
FIG. 5A illustrates a perspective view of a differential system of the transmission of FIG. 2.

Now turning to 5A and 5B, a portion of the differential system 122 of FIG. 2 is illustrated in greater detail. In particular, FIGS. 5A and 5B illustrate a differential system 122 in which a differential input shaft 154 and differential input gear 156 each provide separate inputs to be combined in providing power to the transmission output 114.

In one embodiment, the differential input shaft 154 extends through the differential input gear 156 and into a differential housing 174. Within the differential housing 174 is a differential drive gear 175. The differential drive gear 175 may be coupled to the differential input shaft 154 by, for instance, being integrally formed with the differential input shaft 154, or being secured thereto so as to rotate in the same direction and with the same rotational speed as the differential input shaft 154. The differential drive gear 175 may also be coupled to the differential input shaft 154 in other suitable manners, including a spline connection, a weld, a linkage through one or more other gears, or in other manners, or in a combination of the foregoing.

As discussed previously with respect to FIG. 2, the differential system 122 can also include a differential input gear 156 that is linked to the output of a transmission output system. According to one embodiment, the differential housing 174 is directly or indirectly secured to the differential input gear 156 in a manner that causes the differential housing 174 to rotate with, or be rotated by, the differential input gear 156. The rotation of the differential housing 174 may be configured in any suitable manner relative to the differential input gear 156 and/or the output drive shaft 131 (FIG. 2). For example, the differential housing 174 may rotate at a rotational speed less than, equal to, or even greater than the rotational speed of the differential input gear 156 and/or the output drive shaft 131.

Figure 5B:
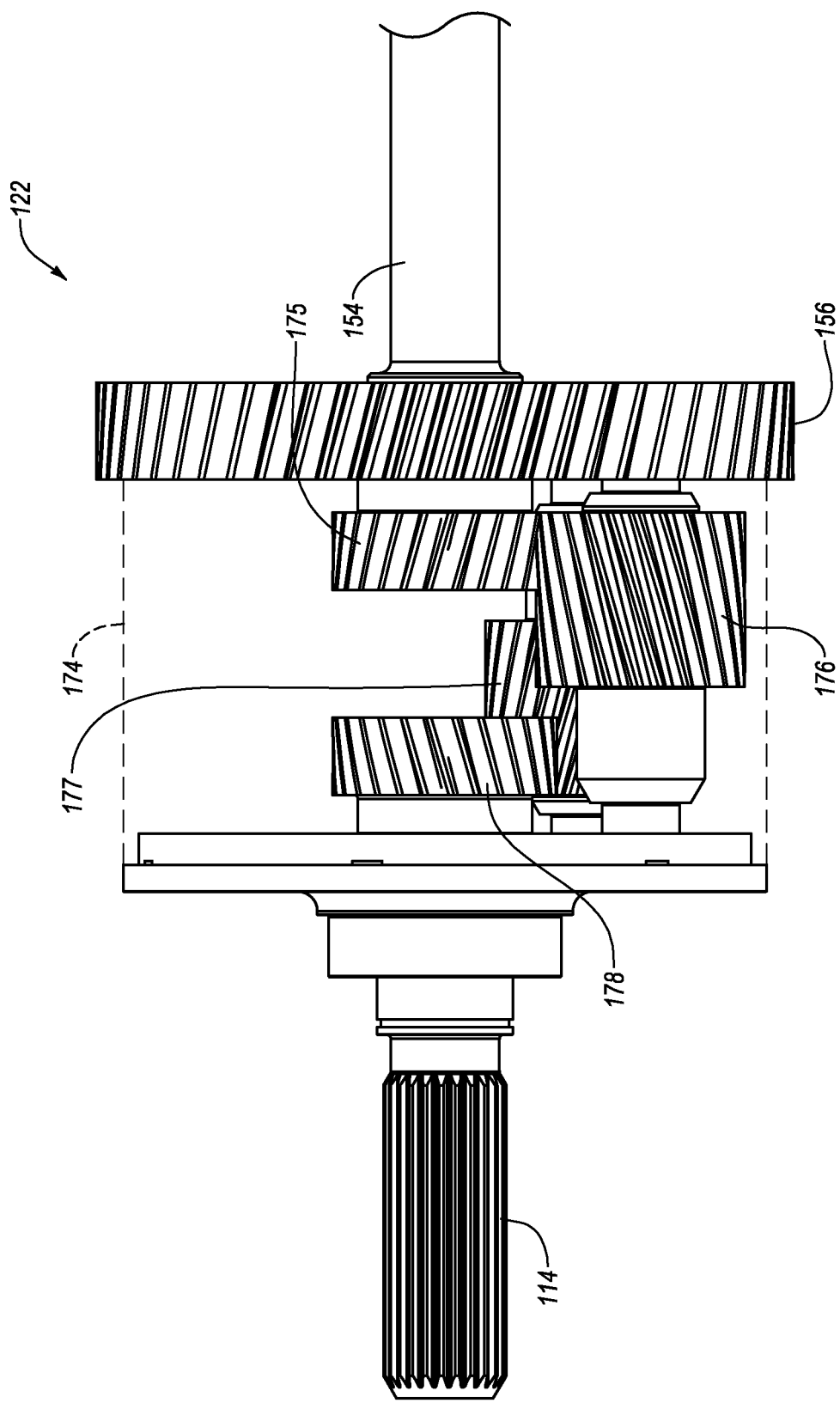
FIG. 5B illustrates a side view of the differential system of FIG. 5A.

As best illustrated in FIG. 5B, the differential housing 174 may have multiple gears secured thereto, or therein. For instance, a first moon gear 176 may be connected to the differential housing 174 and can engage the differential drive gear 175. In one embodiment, the differential drive gear 175 is approximately centered within the differential housing 174 and, as best illustrated in FIG. 5B (which has housing 174 illustrated in dashed lines to provide a better view within the differential housing 175), the first moon gear 176 need not be centered within the differential housing 174. The positioning of the first moon gear 176 in the illustrated embodiment is such that as the differential housing 174 is rotated by the differential input gear 156, the housing 174 causes the first moon gear 176 to orbit around the differential drive gear 175. As the differential drive gear 175 mates with the first moon gear 176, the orbital motion of the first moon gear 176 around the differential drive gear 175 can add to, or subtract from, the rotational motion of the differential drive gear 175. The first moon gear 176 may also engage a second moon gear 177 that orbits with the differential housing 174. As the first moon gear 176 thus orbits and rotates, it can thus also cause the second moon gear 176 to rotate in addition to its orbit provided through the differential housing 174.

A differential output gear 178 is, in the illustrated embodiment, secured to the housing 174 and engages the second moon gear 174. In this manner, as the second moon gear 174 rotates, the second moon gear 174 transfers power to the differential output gear 178. The differential output gear 178 may, in turn, be connected to an output shaft which may be the transmission output 114, or may be coupled to the transmission output 114.

As will be appreciated by one skilled in the art in view of the disclosure herein, the differential system 122 can thus act as a type of differential. In a typical differential of an automotive system, a differential may be used in the final drive on an axle of the vehicle. In such a system, a single input may interconnect with two outputs—one going to either axle on a front drive. The illustrated differential system 122, however, operates in a different manner and, in many regards, opposite the described typical differential. Specifically, the illustrated embodiment includes two inputs and provides a single output. Specifically, a first input to differential system 122 is provided from the transmission input 112 (FIG. 2) and ultimately conveyed into the housing 174 through the differential input shaft 154 and the differential drive gear 175. A second input to differential system 122 is provided from the output drive shaft 131 (FIG. 2), and is applied to the housing 174 through the differential input gear 156.

In the described manner, there may thus be two different inputs provided to the differential system 122, and the two inputs may be combined into a single output. Additionally, based on the directions and magnitudes of such inputs, the inputs may be additive and/or subtractive within the differential system 122. For example, it will be appreciated that through one or more gears, input from the differential input shaft 154 can be provided and transferred such that differential drive gear 175 rotates in a first direction (e.g., counterclockwise). Through appropriate gearing, the rotation of an output drive shaft 131 (FIG. 2) may also be transferred to the housing 174 so that the housing 174 rotates in the same direction (e.g., counterclockwise), although the differential drive gear 175 and the housing 174 may, in other embodiments, provide inputs that are in opposite directions and/or opposite relative to the transmission input and output drive shaft. In the illustrated system, the variations to the respective magnitudes of the rotational inputs can ultimately provide a variety of different outputs at the transmission output 114, including a reverse, neutral, drive, and overdrive for a transmission. Thus, two inputs can combine to provide a clockwise or counterclockwise rotation, or even to provide no output.

More particularly, as the transmission input gear 156 rotates, the housing 174 may also be rotating and causing the first and second moon gears 176, 177 to orbit around the differential drive gear 175 in the same direction as the rotation of the differential input gear 175. At mating gears, the velocity of the gear teeth at the point of engagement must be equal as to direction and magnitude. Further, the velocity of gear teeth is related to the rotational and/orbital motion by the equation V=rω, where V is the linear velocity, r is the radius of rotation at the point of engagement, and ω is the angular velocity.

Figure 6A:
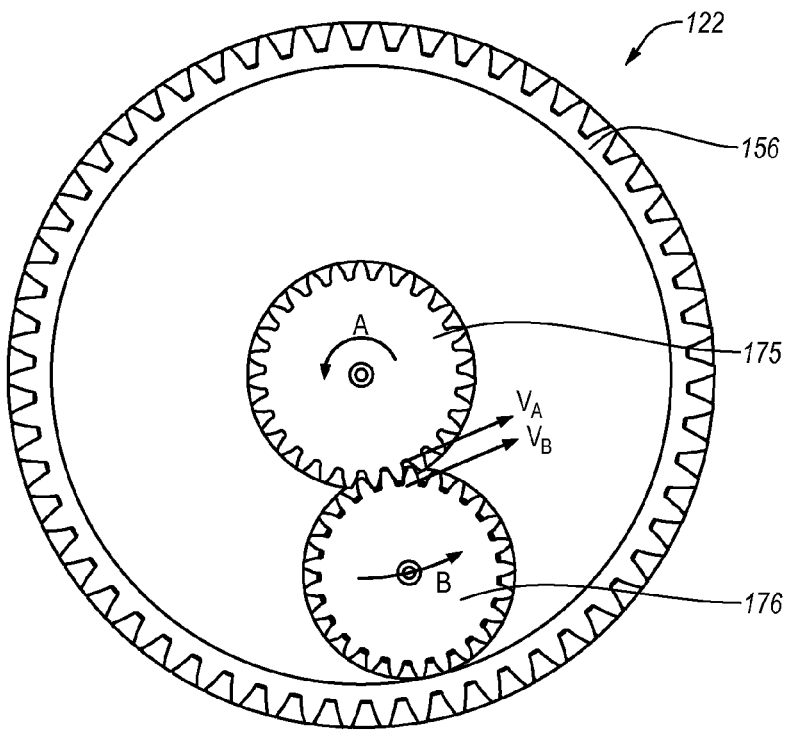
FIGS. 6A-6D illustrate components of the differential system of FIGS. 5A and 5B with exemplary rotational and linear velocity conditions.

FIGS. 6A-6D illustrate exemplary input and output conditions for a differential system 122. For convenience, components from an input are illustrated in solid lines, whereas components of an output are illustrated in dashed lines. FIG. 6A illustrates an example differential drive gear 175 which provides an input by rotating counterclockwise about its own axis, as shown by Arrow A. A second input is provided (e.g., through rotation of the differential input gear 156) that causes the first moon gear 176 to orbit in a counterclockwise direction around the central axis of the differential drive gear 175, as shown by Arrow B. In such an example, the radius of orbit at the point of engagement is equal for both rotations, as both are centered on the same axis, namely the axis of the differential drive gear 175. Accordingly, if the angular velocity of the differential drive gear 175 is equal to the angular velocity of the first moon gear 176, the linear velocities ($V_A$ and $V_B$) are also equal at the point of engagement. Inasmuch as $V_A = V_B$, the introduction of any other velocity to one of the differential drive gear 175 or to the first moon gear 176 could cause an inequality at the point where the teeth on differential drive gear 175 mate with the teeth on the first moon gear 176. For example, if the first moon gear 176 was to rotate about its axis, such rotation would also contribute to the total velocity of the first moon gear 176 at the point of contact (i.e., $V_B$). Such contribution would create an inequality between $V_A$ and $V_B$ unless some other motion is introduced into the differential drive gear 175. The differential drive gear 175 may, however, be configured to provide an input that cannot be modified by the first moon gear 176. Accordingly, to maintain an equality in the velocities of gear teeth at the point of contact, there can, in the illustrated embodiment, be no velocity contribution by the internal rotation of the first moon gear 176 about its own axis. The rotation of the first moon gear 176 about its own axis may be considered a sum of two inputs (e.g., rotational input from the differential drive gear 175 and the differential input gear 156); however, in this embodiment, there may be no output in the form of rotation of the first moon gear 176.

Figure 6B:
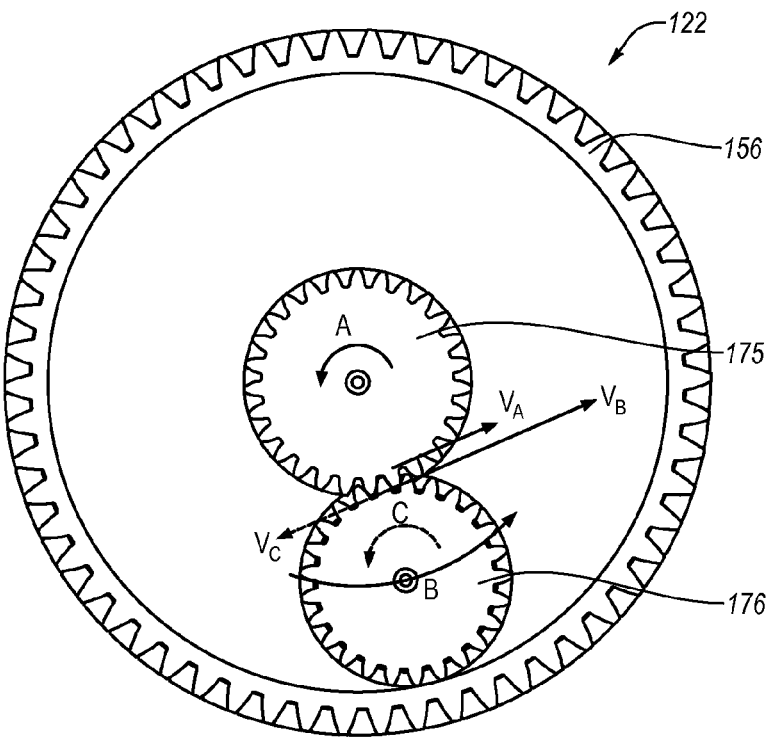

FIG. 6B illustrates an alternative example in which the orbital speed of the first moon gear 176 is greater than the rotational speed of the differential drive gear 175. As a result, at the point of engagement between the first moon gear 176 and the differential drive gear 175, the velocity component $V_A$ of the differential drive gear 175 is, in the illustrated embodiment, less than the velocity component $V_B$ of the orbital of the first moon gear 176. Specifically, in the illustrated embodiment, the linear velocity component $V_B$ provided by the orbital motion of the first moon gear 176 may be approximately twice the linear velocity $V_A$ of the differential drive gear 175, as represented by the magnitudes of the velocity arrows $V_A$ and $V_B$. In such a case, the velocities can be made equal, however, if a velocity component $V_C$ is introduced by rotating the first moon gear 176 about its axis. Specifically, the inequalities of linear velocities $V_A$ and $V_B$ can cause the first moon gear 176 to rotate counterclockwise, in this embodiment, to provide a velocity component $V_C$ that is an output and is equal to a difference between the linear velocity component $V_B$ and the linear velocity component $V_A$. In other words, by changing the gear ratio of a transmission such that the output of the transmission 100 (FIG. 2) as conveyed as one input to a differential system 122 is greater than a second input to the differential system 122, a rotation can be conveyed to the first moon gear 175.

Notably, if the first moon gear 176 in the illustrated embodiment is rotating counterclockwise, the second moon gear 177 (FIGS. 5A and 5B) that engages the first moon gear 176 can have a clockwise rotation. The orbital and rotational motions of the second moon gear 177 can then be combined in a manner similar to that described with regard to the differential drive gear 175 and the first moon gear 176 to provide a rotation to the second moon gear 177 and/or the differential output gear 178. Indeed, if the radii of gears 175, 176, 177 and 178 are equal and counterclockwise rotation is considered positive rotation, the output at the differential output gear 178 (FIG. 5B) can be related to the inputs at the differential drive gear 175 and the differential input gear 156 by the following equation: $\omega_{178} = 2\omega_{156} - \omega_{175}$.

Thus, in the example in FIG. 6A, an output rotational speed at the differential output gear 178, and potentially at the transmission output 114 (FIG. 5A), may be equal to the input rotational speed at the differential drive gear 175 as well as of the differential input gear 156 and/or the differential housing 174 (FIG. 5A). For the example in FIG. 6B, the output rotational speed at the differential output gear 178 may be three times the input rotational speed of the differential input gear 156.

Figure 6C:
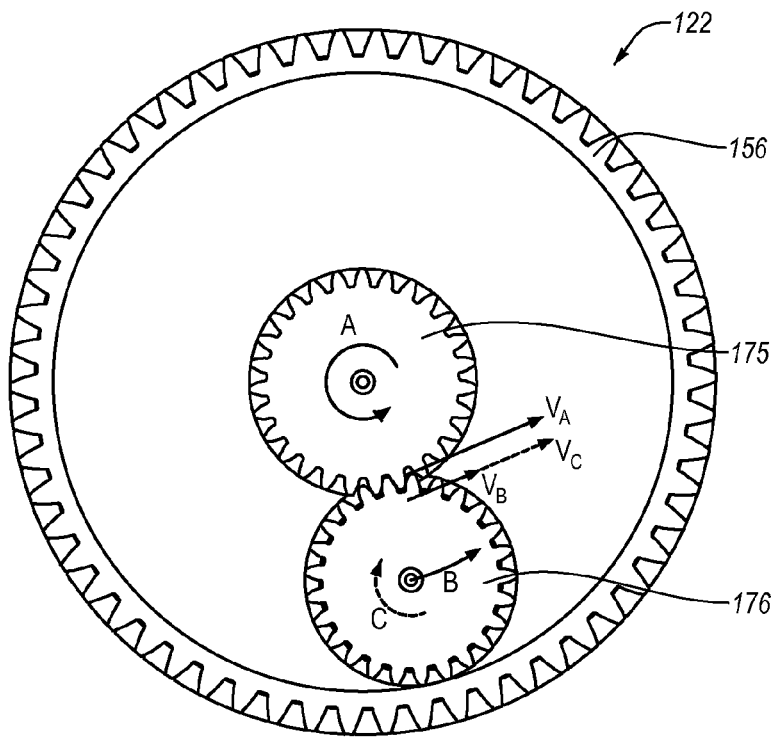
Figure 6D:
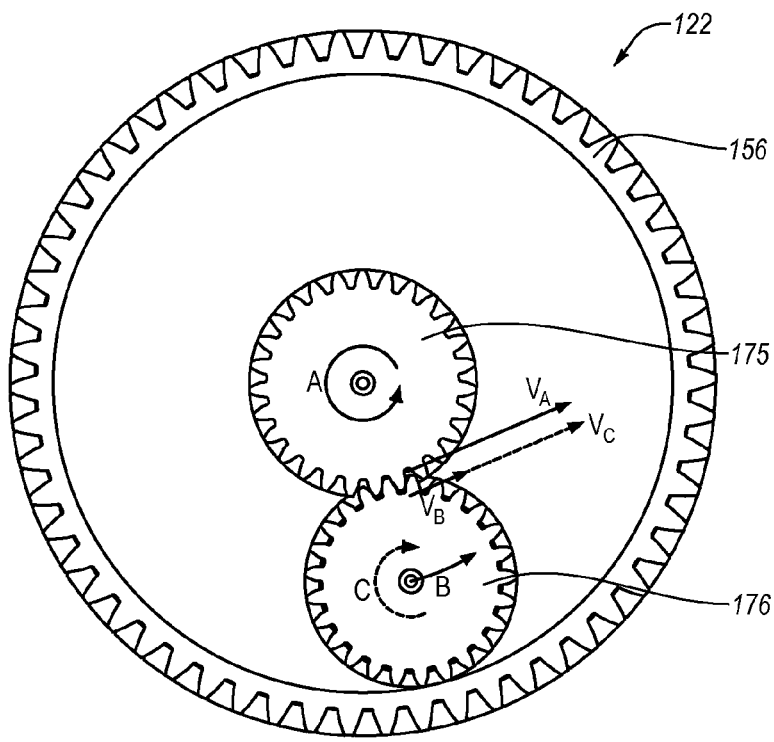

FIGS. 6C and 6D illustrate still other examples of varying input and output conditions for the differential system 122, and operate by the same principles described above for FIGS. 6A and 6B. In FIG. 6C, the input rotational speed A at the differential drive gear 175 is about twice the input rotational speed B of the differential input gear 156. As a result, the velocity component $V_A$ of the differential drive gear 175 is about twice the velocity component $V_B$ of the first moon gear at the point of engagement. Consequently, the first moon gear 176 may also rotate to equalize the velocities at the point of engagement. To equalize the velocities, the first moon gear 175 can provide a velocity component $V_C$ equal to the difference between the velocity component $V_A$ and the velocity component $V_B$, and such velocity can be provided by a clockwise rotation of the first moon gear 176 at a rotational speed about half the rotational speed of the differential drive gear 175. Following the gear rotations through the differential system 122 and assuming all gears 175-178 (FIG. 5B) are the same size, the rotational speed of the output gear 178 is approximately zero.

In FIG. 6D, the linear velocity $V_A$ resulting from the rotational speed of the differential drive gear 175 is about three times the linear velocity $V_B$ resulting from the rotational speed of the differential input gear 156. As a result, the first moon gear 176 is caused to rotate about its internal axis to equalize the linear velocities at the point of engagement. More particularly, the first moon gear 176 may rotate about its own axis at a speed C that is approximately twice the orbital speed B of the first moon gear 176. The rotation is, however, in an opposite and clockwise direction. As such motion is transferred through the differential system 122, the output at the output gear 178 (FIG. 5A), assuming the same criteria described above, would end up being about equal in magnitude to the rotational speed of the differential input gear 156, but opposite in direction (i.e., clockwise).

Returning to FIGS. 5A and 5B, it should be appreciated that by varying the relationship between the rotational speed inputs at the differential input gear 156 and the differential drive gear 175 (e.g., by varying gear ratios between a transmission input and output system), a wide variety of final outputs can be received. Moreover the varied outputs can be obtained while the transmission maintains engagement between all drive and driven members, and can result in forward, reverse, and even neutral/stopped conditions with such engagement. Moreover, the transmission 100 may even operate at a constant input velocity. More specifically, a constant input velocity can be transmitted through the transmission and a variable output velocity can be obtained by varying the gear ratio in the transmission.

The differential system 122 provides one example of a means for combining two inputs to produce a single output, and one example of a means for providing an engaged neutral. It should be appreciated that the foregoing description of a differential system 122 is merely exemplary, and that other configurations can exist. For instance, in some embodiments and means, a second moon gear 177 may be eliminated entirely, or additional moon gears or other gears can be provided. Furthermore, gears within the differential housing 174 may be different sizes such that the relationship between the output and two input rotational velocities can change. In still other embodiments, the differential drive gear 175 may be disconnected and allowed to rotate freely, or held with zero internal rotation. In still other embodiments, the differential drive gear 175 and the housing 174 may receive inputs in opposite directions. Additionally, while only a single first moon gear 176 is illustrated, there may be additional first moon gears 176 that each engage the differential drive gear 175, thereby dividing the torque among multiple gears. Naturally, there may also be additional second moon gears 177, or other gears within the differential system 122. Accordingly, the relative rotational motions, and the magnitudes thereof, of the transmission input gear 175 and the first moon gear 176 can thus act with or against each other, such that the rotational speed of first moon gear 176 (as opposed to the orbital motion of first moon gear) can be in a clockwise or counterclockwise direction.

One feature of the disclosed differential system 122 is the ability to start with engagement from a dead stop. For instance, a vehicle with a high torque engine (e.g., a semi-tractor trailer, tracked land vehicle, construction equipment) may be stopped in an engaged neutral on a road with a steep incline. With the above described differential system 122, such a vehicle can maintain engagement while moving the load forward in infinitely small increments. In particular, infinitely small increments of change can be used to cause the vehicle to move, such that there is little to no rollback when starting the movement, and the infinitely small increments of change can also reduce a torque spike when engaging the engine.

In all regards, the embodiment described above with respect FIGS. 5A-6D is illustrative, and one skilled in the art will appreciate that various alternatives and/or additional components may be utilized. In some regards, for example, gears may be removed or added to provide additional gear ratio changes, and/or to link inputs or outputs to other components. In one embodiment, for instance, the differential housing 174 may be directly coupled to an output drive shaft and/or positioned in-line therewith. Additionally, it will be appreciated that the various gears and components described with regard to transmissions 10 and 100 may be positioned on bearing surfaces. For example, the first and second moon gears 176, 177 and/or the differential output gear 178, may have bearing surfaces interfacing with the differential housing 174 to thereby allow rotation within the differential housing 174.

Various embodiments may thus be provided to provide an engaged neutral, vary gear ratios, use a differential mechanism, and the like. For example, FIGS. 7A and 7B schematically illustrate various possible configurations. In FIG. 7A, for example, differing angular velocities of power supplies can be engineered to provide a reverse, neutral, drive and overdrive gear. This basic illustration is true even when the first and second inputs (e.g., the primary and secondary supplies) are independent sources of power. For instance, the first and/or second inputs can be turbine engines, internal combustion engines, electric motors, or any other suitable input system. Additionally, the amount of load carried by each power supply can be determined by the ratio between the two inputs to the reverse differential.

Additionally, the secondary power supply may optionally be engineered to shut down, thereby allowing the primary power supply (which itself may be geared for overdrive) to run straight from the primary power supply to the load. Such a system may improve the efficiency to exceed that of even the standard transmission.

In FIG. 7B, an alternative schematic is provided in which inputs are split from a single power source. In particular, the secondary power supply can be replaced by a transmission in order to vary speed and torque going into the reverse differential from the secondary power supply. This may be accomplished by tapping into the angular velocity of the primary power supply and splitting the torque between the two inputs to the reverse differential (e.g., via a transmission). The types of transmissions would include, but not be limited to: manual, automatic, belt-driven CVT, toroidal CVT, PECVT, hydraulic pump/motor transmissions, and any other type of transmission.

The configuration in FIG. 7B would provide for many variables between the velocity of the engine and the ratio of the transmission which combine at the reverse differential. The variables could be engineered, for example, to favor performance, fuel economy or the operating RPMs of a motor (e.g., an electric motor). The many options here noted would lend themselves to a wide range of applications.

The aspect of splitting the torque received at the input between multiple, different paths is itself an aspect that can also be desirable for various types of applications. For example, when the torque is split (e.g., using the transfer gear 115 in FIG. 2), some of the torque can be passed through the variable portion of the transmission (e.g., throughout an input system, chain, and output system), while another portion is passable directly to a reverse differential. When splitting the torque in this or a similar manner, it should be noted that the torque can be reduced along both paths with respect to the initial torque input. As such, the torque carried by the variable portion of the transmission can be significantly lower, in some cases, than the amount of torque that would be supplied through the variable portion of the transmission were the splitter not present. By reducing the torque, the wear, heat, friction, and the like can be reduced thereby improving the life of the transmission and/or allowing smaller, lighter, and/or less expensive components to be utilized.

Chain

Figure 8A:
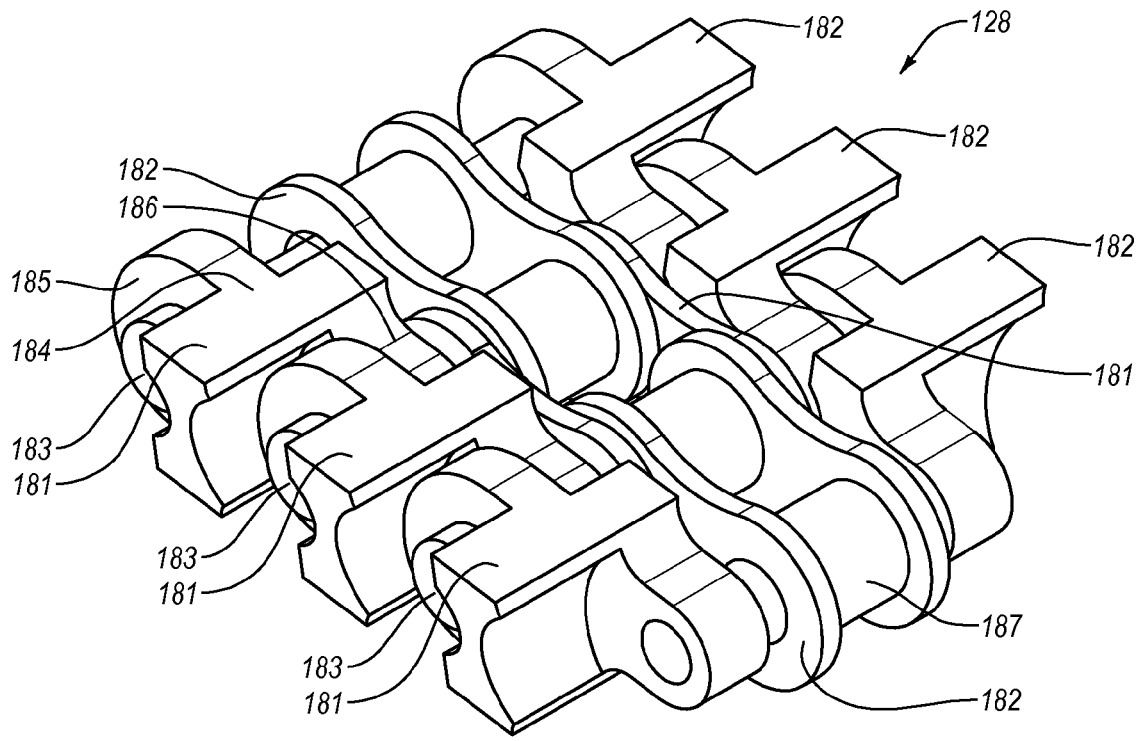
FIG. 8A illustrates a perspective view of a portion of a chain according to one exemplary embodiment of the present disclosure.
Figure 8B:
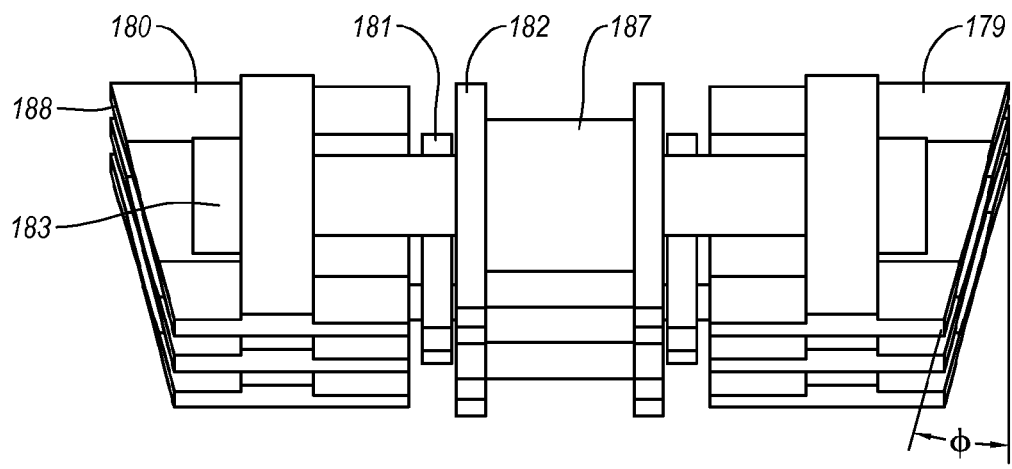
FIG. 8B illustrates a frontal view of the exemplary chain of FIG. 8A.

With reference now to FIGS. 8A and 8B, the chain 128 is described in greater detail. It should be appreciated, however, that chain 128 is merely one example of a chain suitable for use with a transmission according to embodiments disclosed herein, and that other suitable chains may be used and are contemplated. In particular regard to the illustrated embodiments, it can be seen that the chain 128 is comprised of multiple links. FIG. 8A, for example, illustrates a portion of the chain 128 that includes approximately three links. More links may be added so as to provide chain 128 a length suitable for use with a transmission as may be learned from the disclosure herein.

The portion of the chain 128 illustrated in FIGS. 8A and 8B includes a variety of interconnected components. For instance, the chain 128 includes three first side structure 179 and three opposing second side structures 180. The first and second side structures 179, 180 (FIG. 8B) are essentially mirror copies of each other, and form the outer edge of the chain 128. In the illustrated embodiment, outer chain links 181 and inner chain links 182 interpose the first and second side structures 179, 180. In the particular embodiment illustrated in FIG. 8A, for instance, the inner chain link 182 is positioned inside outer walls of the outer chain link 181. Moreover, openings in the outer and inner chain links 181, 182 can be aligned so that a pin 183 can be positioned therein and secure an inner chain link 182 to an outer chain link 181.

The pins 183 can also secure the inner and outer chain links 181, the 182 to the first and second side structures 179, 180, and thus secure a first side structure 179 to a second side structure 180. In some embodiments, the inner chain links 182 may be roller links, and the outer chain links 181 may be pin links.

In the illustrated embodiment, each of the first side structures 179 includes various portions. For example, the first side structures 179 can each include a body 184. The body 184 is, in the illustrated embodiment, elongated and extends in a lateral direction that is generally parallel to the pin 183. It should be noted, however, that the body 184 may be of any suitable shape and may, for example, be generally square or could be elongated and extend perpendicular to the pin 183.

Extending from the body 184 is, in this embodiment, an exterior pin mount 185, as well as an interior pin mount 186. In the illustrated embodiment, the exterior pin mount 185 extends in a direction aligned generally with the length of the chain 128. For instance, the exterior pin mount 185 may extend from approximately a center of the body 184, and in a direction that is generally perpendicular to the pin 183. The interior pin mount 186 can also extend generally in a direction aligned with the chain 128 and/or generally perpendicular to the pin 183. In the illustrated embodiment, however, the pin mounts 185, 186 extend in opposite directions from the body 184. Moreover, in this embodiment, the interior pin mount 186 is at a position on the body 184 that is inward relative to the exterior pin mount 185.

The illustrated exterior and interior pin mounts 185, 186 each define openings therein, which openings are configured to receive the pins 183 therein. Additionally, when two first side structures 179 are positioned adjacent each other, an exterior pin mount 185 on one first side structure 179 can be positioned exterior to, and generally adjacent, an interior pin mount 186 on a second first side structure 179. The pin 183 can then be inserted and can secure the two first side structures 179 together in a nested configuration. The pin 183 can also secure the first side structures 179 to one end of an outer chain link 181 as well as to an opposing end of an inner chain link 182. As noted above, the second side structures 180 may have a similar structure, and may be mirror images of the first side structures 179.

As discussed herein, a chain 128 can be positioned within sheaves and/or around sprockets. It can be seen from the illustrated figures that the interior and exterior chain links 181, 182 thus define pockets into which the gear teeth of a corresponding sprocket can be positioned to drive or otherwise engage the chain 128. More specifically, each inner chain link 182 can include a sleeve or roller 187 centered around an opening into which the pins 183 are positioned. The distance between the sleeve or roller 187 may have a pitch corresponding to a pitch of the sprockets, such that a sprocket tooth can be positioned between two adjacent sleeves or rollers 187.

With particular regard to FIG. 8B, an exemplary manner in which the first and second side structures 179, 180 can facilitate use with sheaves is illustrated. More specifically, the side structures 179, 180 have exterior surfaces that can be offset at an incline, to define an angled outer edge rather than a square outer edge. In particular, rather than having a side surface that is generally perpendicular to top and/or bottom surfaces and/or a longitudinal axis of the pin 183, the side structures 179, 180 have inclined outer edges 188. The outer edges 188 may be offset at an angle generally corresponding to a beveled surface of one or more sheaves. Thus, as a sheave moves together or apart, the outer edges 188 of the chain 128 can correspondingly slide outwardly or inwardly relative to a rotation axis of the sheave. The outer edges 188 may maintain frictional contact with the interior surfaces of a sheave as the chain 128 moves. The chain 128 may also be suitably lubricated with respect to its operation with a sprocket and/or sheave so as to prolong the life of the chain 128 and the transmission components, and to possibly provide a substantially frictionless engagement between the chain 128 and a corresponding sheave.

It should also be appreciated in view of the disclosure herein that the angle of the outer edge surfaces 188 of the side structures 179, 180 can be varied in any desired manner, and can be modified based on the particular application, particular sheaves with which it is used, and the like. For instance, in one embodiment, the outer edge surfaces 188 of the chain 128 are beveled at an angle ($\phi$) ranging between approximately five and fifty-five degrees, although the angle may be less than five or more than fifty-five degrees. In another embodiment, $\phi$ ranges between about ten and about thirty degrees. It should be appreciated in view of the disclosure herein that the chain 128 is one example of a means for conveying power, but is merely an exemplary embodiment of a suitable chain usable according to some aspects of the present disclosure. For instance, while the chain 128 may be a roller chain, in other embodiments the chain 128 may be an involute chain, a custom chain, or another type of chain, or a combination thereof.

2. Transmission Embodiment with Turbine Correction Mechanism

Figure 9A:
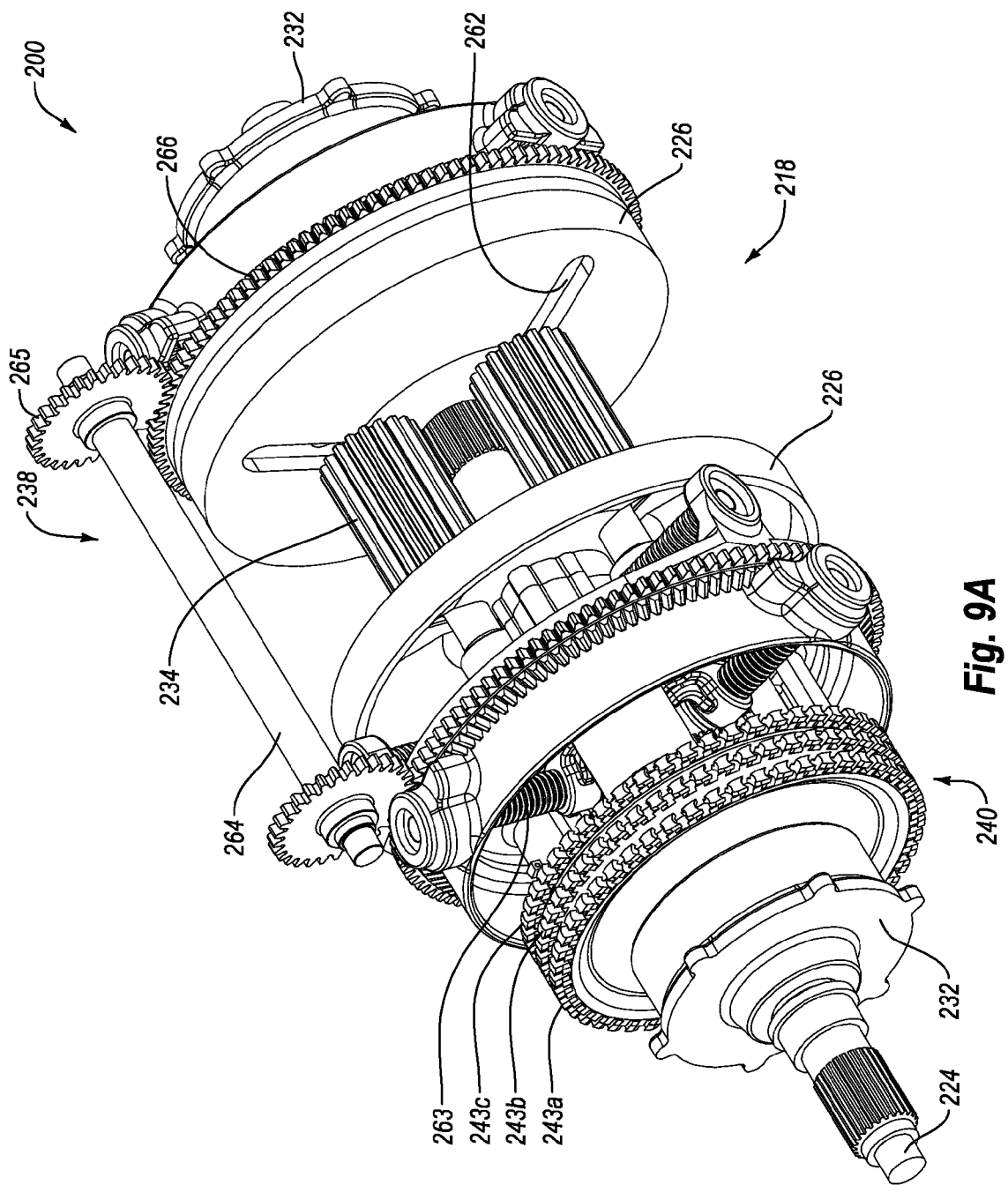
FIG. 9A illustrates a perspective view of a transmission according to another example embodiment of the present disclosure.
Figure 9B:
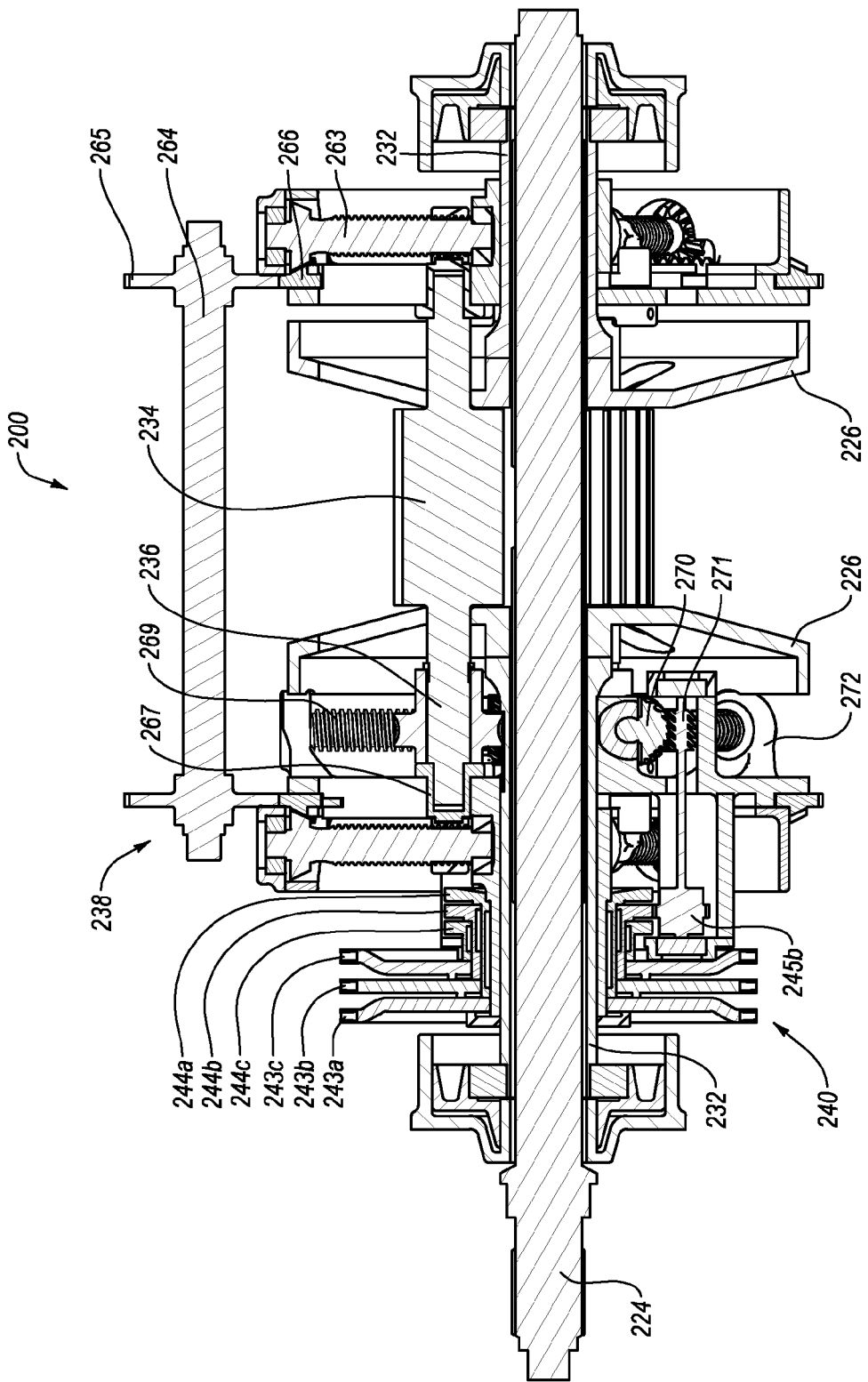
FIG. 9B illustrates a partial cross-sectional side view of the transmission of FIG. 9A.
Figure 9C:
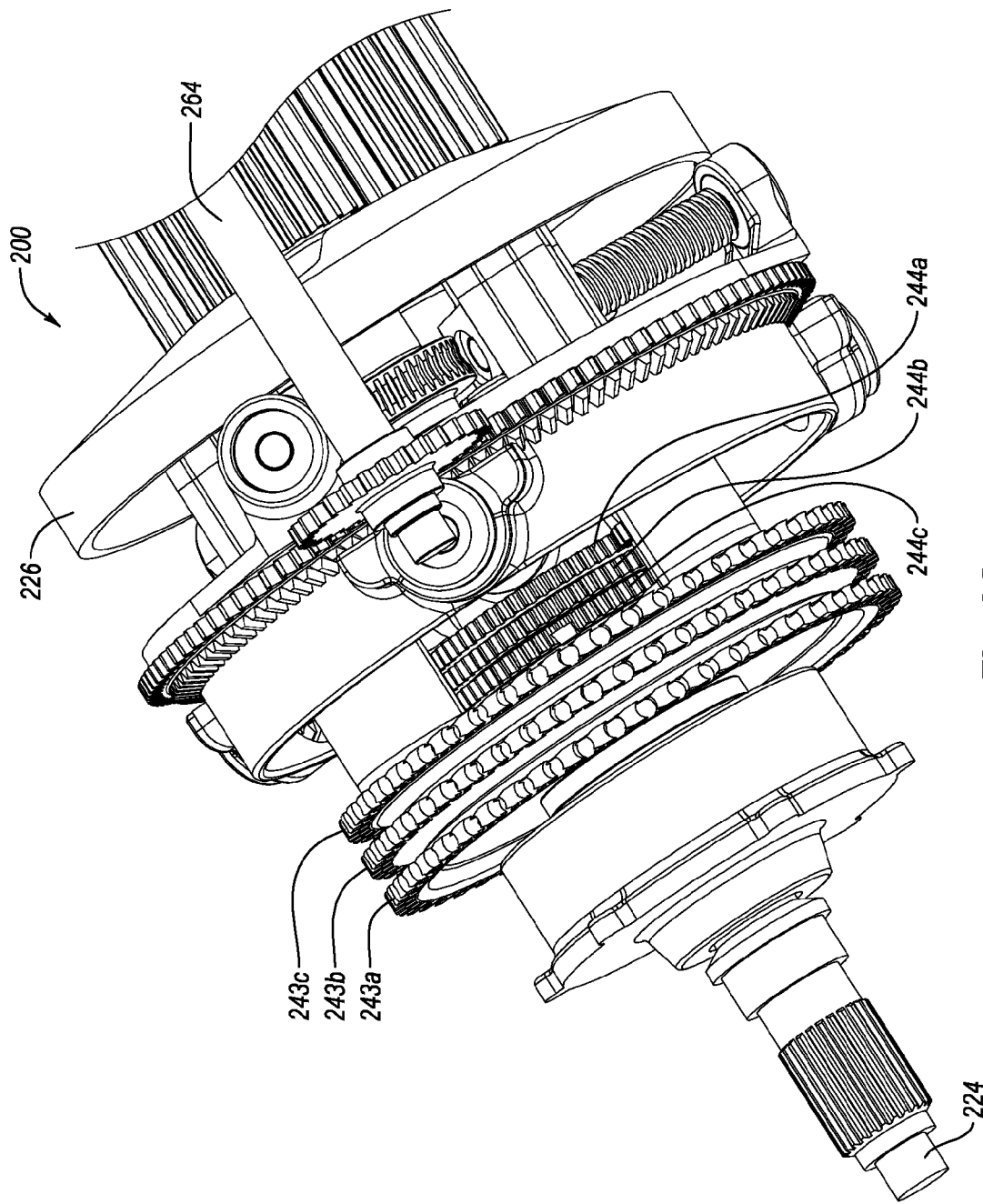
FIG. 9C illustrates an enlarged perspective view of a turbine disk correction mechanism in the transmission of FIG. 9A.

As discussed herein, various components of transmissions described herein are variable and/or interchangeable. Turning now to FIGS. 9A-9C, another example embodiment of a transmission system 200 is described. In particular, FIGS. 9A-9C illustrate another transmission system 200 having at least synchronization and correction systems 238, 240 described in greater detail herein, and which are interchangeable with other transmissions described herein. Components of other transmissions described herein, or which may be learned by a review of the disclosure herein, may also be combined with the transmission system 200. For instance, in the illustrated embodiment, a single sheave assembly 218 is illustrated. The illustrated sheave assembly 218 may act at least as a portion of an input and/or output. For instance, the illustrated sheave assembly 218, or a portion thereof, may replace or supplement the input systems 18, 118 and/or output systems 20, 120 of FIGS. 1 and 2, as well as such systems described hereafter.

The sheave assembly 218 of FIGS. 9A-9C includes various components operating in a manner similar to other components described elsewhere herein. Accordingly, to avoid obscuring additional aspects of the sheave assembly 218, such components will generally not be described, or only treated briefly, as a suitable discussion is found elsewhere herein. Rather, additional detail will be given to additional components in this particular embodiment.

In the illustrated sheave assembly 218, and similar to other embodiments herein, a drive shaft 224 may pass through sheave assembly 218 and have attached thereto opposing halves of a sheave 226. The halves of the sheave 226 are, in this example, attached to the drive shaft 224 using a spline connection on the shaft 224, although other types of connections may also be used. The spline or other connection on the drive shaft 224 can allow the drive shaft 224 to rotate and further cause the sheave 226 to rotate; however, as the sheave assembly 218 may also operate in an output system, the sheave 226 may provide the input and cause the drive shaft 224 to rotate.

In some embodiments, and as described herein, halves of the sheave 226 may be axially movable along the drive shaft 224. Such axial movement may, for example, allow a wrapping member such as a chain or belt to ride on the sheave 226 and to move radially inward and outward relative to the drive shaft 224. Such movement can allow the transmission system 200 to effect changes in gear ratio. To facilitate movement of the sheave 226, two sheave actuators 232 are provided and can compress the sheave 226, or allow the sheave 226 to expand. The sheave actuators 232 can, as described herein, be or include hydraulic actuators that use fluid pressure that increases to compress the sheave 226 and decreases to expand the sheave 226. The sheave actuators 232 may, however, include other actuators as described herein, and can reside on the drive shaft 224 as described herein, although such positioning is merely exemplary.

As also disclosed previously herein, one or more drive gears 234 can be positioned relative to the sheave 226 and be configured to engage with a chain (not shown) positioned around the sheave 226. The drive gears 234 can engage the chain and act to prevent or reduce slippage of the chain on the sheave 226. The number of drive gears 234 may be varied, although in one embodiment, three drive gears 234 are spaced around the drive shaft 224. In other embodiments, more or fewer drive gears 234 may be used. For instance, four, five or six drive gears 234 may be used.

Inasmuch as the sheave 226 can be selectively positioned to cause a corresponding chain to move radially inward or outward relative to a longitudinal axis about which the sheave 226 rotates, the drive gears 234 may also be configured to move radially inward and/or outward relative to the longitudinal axis of the sheave 226, which in this embodiment is centered in the drive shaft 224. In the illustrated embodiment, a synchronization system 238 can be used to adjust the radial position of the drive gears.

Synchronizing System

In the illustrated embodiment, the synchronization system 238 may include a slot 262 and worm gear 263. The drive gears 234 may rotate around a drive gear shaft 236 and the worm gear 263 may be directly or indirectly connected to an actuator (not shown). The actuator may include, for instance, a hydraulic or pneumatic actuator, an electrical actuator, a mechanical actuator, or some other type of actuator, or a combination of the foregoing. As such an actuator engages, the worm gear 263 may be caused to rotate. A carrier 267 may be coupled to the drive gear shaft 236 and can engage the worm gear 263. As a result, as the worm gear 263 rotates, the carrier 267 and the drive gear shaft 236 can move radially inward or outward relative to the drive shaft 224, depending on the direction of actuation of the worm gear 263. The drive gear shaft 236 may extend through the slots 262 formed in one or both halves of the sheave 226 to allow for radial movement of the drive gear shafts 236 relative to the sheave 226. As best illustrated in FIG. 9A, the radial movement of the drive gears 234 may follow a generally linear path. In other embodiments, however, the drive gears 234 may follow an arcuate or other path. For instance, in the embodiment of the transmission 100 (FIG. 2) described above, the driving moon gears 134 (FIG. 3) can be rotated on a shaft to cause radial movement, thereby moving along an arcuate path.

According to one embodiment, the drive gears 234 generally move along the slot 262 when a corresponding drive gear 234 is not under load. As such, each drive gear 234 may be actuated or otherwise moved independently relative to each other drive gear 234. In other embodiments, however, the worm gears 263 may be collectively coupled to an actuator or other mechanism that causes collective movement of the drive gears 234.

In one embodiment, the synchronization system 238 may operate on two halves of the sheave 226. For instance, to link movement of the drive gears 234 such that the drive gear shaft 236 is moved at or within both halves of the sheave 226, the illustrated example embodiment includes a cross-over shaft 264. The cross-over shaft 264 is, in this embodiment, coupled to a pair of linking gears 265 that may in turn drive the worm gears 263 directly or indirectly. In FIG. 9B, for instance, the linking gears 264 drive a synchronizing ring gear 266 that couples to the worm gears 263. The synchronizing ring gear 266 includes, in this embodiment, two tooth profiles. A first profile may mate with the linking gears 265. The second tooth profile may include, for instance, a bevel gear set that mates with the worm gear 263.

A single cross-over shaft 264 is illustrated; however, more may be included. For instance, the number of cross-over shafts 264 may correspond to a number of drive gears 234. For example, multiple cross-over shafts 264 may be included to separately and independently move the drive gears 234, although a single cross-over shaft 264 may be linked to collectively cause the drive gears 234 to move radially, or multiple cross-over shafts 264 may be used to cause collective radial translation of the drive gears 234 while reducing the load on each cross-over shaft 264 relative to a single shaft operating to coordinate radial movement of drive gears 234. In some embodiments, the one or more cross-over shafts 264 are fixed, such that they do not orbit around the drive shaft 224. As a result, as the sheaves 226, drive gears 234, and worm gears 263 rotate around the drive shaft 224, an actuator interacting with the worm gears 263 can alternatively engage the cross-over shaft 264 (e.g., through the linking gears 265 or another mechanism) to coordinate the radial position of the drive gears 234. In other embodiments, the one or more cross-over shafts 164 can co-rotate with the sheave 226 around the drive shaft 224.

By translating the drive gears 234 as the sheaves 226 move axially inward or outward, the drive gears 234 may remain in constant contact with an associated chain, and optionally act as a non-slip mechanism. More particularly, in some embodiments, the drive gears 234 may carry the chain and transfer power to the chain. The sheave 226 may transfer some power, or may be used primarily to radially position the chain. The components of the synchronization system 238, both collectively and individually, are thus examples of a means for radially positioning the drive gears 234 and/or a chain, and means for transferring power to the wrapping member.

The radial movement of drive gears 234 may be referred to herein as "synchronizing" as gears 234 are synchronized in radial movement to correspond to the radial position of the chain as determined by the sheave 226. Another mechanism, referred to herein as "correcting" may relate to the rotational movement of the drive gears 234 to align teeth of the drive gears 234 with respect to pockets of a chain, and includes correction of tooth position by changing the rotational position of gear teeth when the radius of rotation of the chain on the sheave 226 corresponds to a non-integer ratios, as described herein. Thus, the term "synchronizing" when used in connection with drive gears or moon gears generally relates to the radial movement of the drive gears 234, whereas "correcting" relates to the rotational movement of the drive gears 234.

Correction System

With regard to correction of the drive gears 234 illustrated in FIGS. 9A-9C, a correction system 240 may be used. For instance, the correction system 240 may be used to rotate the drive gears 234, and to thereby advance and/or retreat teeth of drive gears 234 as desired for alignment with a chain. As described herein, tooth correction may be useful where, for instance, the drive gears 234 have teeth of a fixed pitch and changes in the radial position of the drive gears 234 and/or sheave 226 cause the chain to rotate around an effective or virtual circle having partial teeth. The particular embodiment described herein performs correction of the drive gears 234 while they are not under load (e.g., while not engaged with the chain), although in other embodiments it may be desired to correct motion while under load. In correcting the drive gears 234 while not under load, each drive gear 234 can be corrected independent of and/or at a different time than other drive gears 234.

Particularly with regard to FIG. 9B, the drive gears 234 may be corrected using a correction system 240 that includes a set of worm gears 269. Specifically, the example embodiment in FIGS. 9A-9C includes one worm gear 269 for each of the three drive gears 269, and the worm gear 269 is directly or indirectly coupled to a drive gear 234. For instance, in the illustrated embodiment, the worm gear 269 is mounted to a housing 272 that is connected to the drive gear shaft 236. According to at least one embodiment, the housing 272 is coupled to the worm gear 269 and the drive gear shaft 236 such that as the worm gear 269 rotates, a kinematic transfer of power causes the drive gear shaft 236 and a corresponding drive gear 234 to rotate. For instance, as shown in FIG. 9B, the worm gears 269 may be coupled to a set of one or more driving gears 270, 271 that cause the worm gear 269 to rotate. As the worm gear 269 rotates, the housing 272 may rotate (e.g., by directly coupling to the worm gear 269 or through one or more relay gears), thereby rotating the drive gear shaft 236 and the drive gear 234. According to one embodiment, the housing 272 includes a worm wheel mating with the worm gear 269. The worm wheel may be co-axial with the drive gear shaft 236 such that as the worm gear 269 rotates the worm wheel, the drive gear shaft 236 rotates.

The particular manner of correcting drive gears 234, as described and illustrated herein, is merely exemplary. Moreover, the manner of controlling such a correction mechanism may also be varied in any suitable manner. For example, an actuator may be included that mechanically, electrically, hydraulically, or otherwise controls indexing and/or correction of drive gears 234. Moreover, a controller may be embedded within the actuator, or may be separate therefrom. In the illustrated embodiment, a hydraulic actuator is one exemplary mechanism for controlling correction of the drive gears 234.

In the illustrated hydraulic actuator, a set of three turbine disks 243*a-c* is illustrated. Each turbine disk 243*a-c* of the illustrated embodiment may be a reversing turbine disk and can rotate around a longitudinal axis in both forward and reverse directions. Such rotation of the turbine disks 243*a-c*, which can ultimately be transferred to the drive gears 234, may be used to advance or retreat the teeth of the drive gears 234 and thereby correct tooth position in, by way of illustration, a partial-tooth position. For instance, as best shown in FIGS. 9B and 9C, each of turbine disks 243*a-c* is linked to an interior main gear 244*a-c*. Specifically, the first turbine disk 243*a* links to a first interior main gear 244*a*, the second turbine disk 243*b* links to second interior main gear 4047*b*, and the third turbine disk 243*c* links to a third interior main gear 244*c*.

In FIG. 9B, some components have been removed to provide a more clear view of the internal components of the transmission system 100. For instance, the turbine disks 243*a-c* are optionally coupled to three gear sets, each of the three gear sets including the interior main gears 244*a-c*. Each of the sets of interior main gears 244*a-c* may in turn also connect to a particular correction drive gear 245*a-c*. For instance, the correction drive gear 245*b* in FIG. 9B may connect to the second interior main gear 244*b* of the illustrated drive gear set. In view of the disclosure herein, it should be appreciated that second drive gear sets may also couple to a correction drive gear although such correction drive gears are not illustrated in FIG. 9B so as to provide a more clear view of other features of the transmission 100.

In the illustrated system, as the turbine disk 243*b* rotates, the interior main gear 244*b* is rotated, and the correction drive gear 245*a-c* may also rotate and transfer power to the driving gears 270, 271 (e.g., along a shaft). Such power transferred to the driving gears 270, 271 can ultimately correct the rotation of the drive gears 234. For instance, in the illustrated example embodiment, each of the three turbine disks 243*a-c* can correct one of the drive gears 234. Thus, any drive gear 234 can be corrected independent of any other drive gear 234 by using an appropriate turbine disk 243*a-c*. Furthermore, while each correction drive gear set is illustrated as including three correction drive gears 245*a-c*, this is merely exemplary. For instance, each correction drive gear set could include only one of the correction drive gears 245*a-c*.

It should be appreciated in view of the disclosure herein, that any number of control and actuation mechanisms can accordingly be used to adjust a transmission according to the present disclosure. For example, one actuator may move the sheaves 226 axially, while a separate actuator may be used with the drive gears 234 to cause them to translate radially, while still another actuator can correct the drive gears 234 by causing them to rotate a desired amount that aligns a tooth with a chain. In some embodiments, some or all actuators may be combined together. For instance, radial translation of the drive gears 234 may be configured to also implement a correcting action. In some embodiments, the correcting action may be all or a part of the needed correction for a gear tooth.

Figure 10:
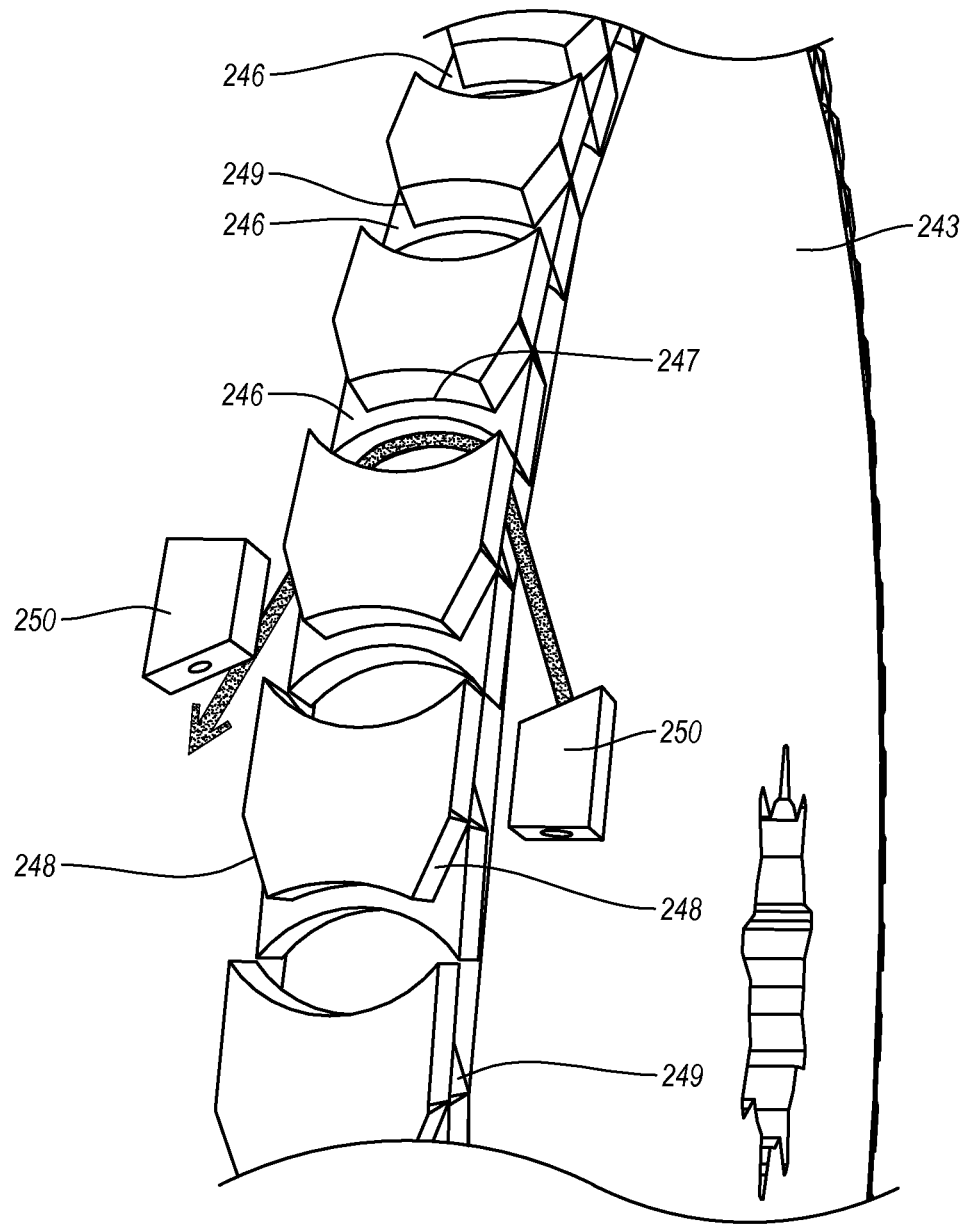
FIG. 10 illustrates an enlarged perspective view of a surface of a turbine disk in the transmission of FIG. 9A.

Turning now to FIG. 10, an example of a portion of an exemplary turbine disk 243 is described in additional detail. It should be appreciated that the turbine disk 243 may be used in the sheave assembly 218 (FIG. 9A) described previously, but may also have additional applications. Moreover, the sheave assembly 218 may use other types of turbines or other correction or control mechanisms. For example, the sheave assembly 218 may use a turbine with a series of blades, rather than the disk as described herein, may use hydraulic, pneumatic, mechanical, electrical, or other actuators, or a combination of the foregoing, to correct a gear position. Moreover, while the turbine disk 243 is described in the context of a correction mechanism, it should be appreciated that a similar construction may be used as a synchronizing mechanism to, among other things, cause drive gears to move radially with respect to a drive shaft or sheave.

The turbine disk 243 as shown in FIG. 10 is generally disk-shaped and includes a series of ports 246 configured to receive and reverse fluid (e.g., a liquid or gas) injected therein. In particular, a port 246 may include an opening 247 formed in the outer circumference of the turbine disk 243. The opening 247 may have a generally circular or elliptical shape, although other shapes may also be used. In one embodiment, such an opening may be formed by drilling a series of radially inward directed holes towards a center of the turbine disk 243, although any other suitable manufacturing method may also be used, including CNC machining, milling, laser etching, water jets, or other processes, or combinations thereof.

In practice, fluid in the form of a liquid or gas may be injected into the port 246. Fluid may, for instance, be hydraulic fluid and injection of the fluid may be configured to cause the turbine disk 243 to rotate. As described herein, rotation of the turbine disk 243 may in turn cause other effects. For instance, in a transmission, the turbine disk 243 may correct or synchronize gears due to rotation. In other embodiments, the turbine disk 243 may rotate and be used to control sheave axial positions or perform a number of other functions.

To provide improved access to the ports 246, one or more reliefs 248 may also be cut or otherwise formed on the turbine disk 243. For instance, in the illustrated embodiment two reliefs 248 are formed on the outer perimeter of the turbine disk 243 and generally taper inward. As fluid is then injected towards the ports 246 (e.g., from a nozzle 250), the fluid may pass through the reliefs 248 and engage against an interior surface that defines at least a portion of the opening 247. The shape of the interior surface and of the opening 247 may then optionally reverse the flow of the fluid. As fluid is injected through the turbine disk 243, the flow can be reversed and pass through a corresponding relief 248 formed on an opposing edge of the disk 243. The flow of fluid in this manner can cause the disk 243 to rotate, and the amount of rotation can be controlled hydraulically by at least pressure of the fluid and the duration of the flow.

As noted previously, the turbine disk 243 may be a reversing disk. In one aspect, a reversing disk may have reversible motion and the turbine disk 243 may be able to rotate in opposing directions. In particular, as shown in FIG. 10, the relief 248 may be an upper, or first relief, and there may be a lower, or second relief 249. In particular, along all or a portion of the length of the port 246, a lower relief 249 may be formed. Further, the lower relief 249 may be in an opposite direction relative to the upper relief 248. As a result, another nozzle 250 may be aligned and positioned to inject fluid into the ports 246 along the lower relief 249. As will be appreciated in view of the disclosure herein, a nozzle 250 aligned with the lower relief 249 may inject fluid in an opposite direction as compared to a nozzle 250 aligned with an upper relief 248. As a result, based on which nozzle 250 is used to inject fluid, the direction of rotation of the turbine disk 243 can be controlled. Further, in some cases, it may be possible to inject fluid through nozzles 250 to the ports 246 in two directions. In such a case, the fluid injected in one direction may rotate the turbine disk 243, while fluid injected in a second direction may act as a braking mechanism to stop rotation of the turbine disk 243, or relative differences in the fluid flows may otherwise cause a controlled rotation of the disk 243.

While FIG. 10 illustrates two nozzles 250 and upper and lower portions to the ports 246, it should be appreciated that this is merely exemplary. In other embodiments, a single nozzle may, for instance, inject fluid in either of two directions and/or a port 246 may have a single portion that receives fluid directed in either of two or more directions.

A turbine disk 243 according to the present disclosure can therefore be used to allow selective control over a rotation used to control synchronization, correction, or other aspects of a transmission. Further, as noted previously, the turbine disks described herein are merely exemplary and other types of turbines, actuators, controllers, or other structures may be used. In one embodiment, a turbine disk 243 provides an advantage over traditional turbines with blades, inasmuch as the turbine disk 243 can provide two-directional rotation with a minimum number of parts and relative ease of manufacture. Indeed, the turbine disk 243 optionally has an integral construction such that only a single component need be formed.

In contrast, other turbines may use a series of blades that increase the number of parts and/or the cost of manufacture and assembly. Nevertheless, other turbines may be used as they potentially increase the efficiency of the system and/or reduce wear, fluid losses, or for any other number of reasons. In some embodiments, the turbine disk 243 may operate at low power, such that efficiency losses may be negligible or the cost-savings associated with such disks may warrant use over more expensive, higher efficiency turbines.

As will be appreciated by one skilled in the art in view of the disclosure herein, while FIG. 10 illustrates two nozzles, each of which direct fluid in a single direction, other configurations are possible. For instance, multiple nozzles may be aligned around the circumference of the turbine disk 243, such that multiple nozzles can act to rotate the turbine disk 243. In other embodiments, multiple turbine disks 243 may be used in a single system, and each turbine disk 243 may have its own set of one or more nozzles, or nozzles may be shared between turbine disks 243.

Another aspect of the turbine disks 243 is that the series of ports 246 can, but are not necessarily, formed on the exterior surface of the disk 243. As a result, the turbine disk 243 may have an exterior surface or edge that is interrupted by each port 246. By positioning a sensor on such an interrupted surface or edge, or in a position where the sensor can obtain information from the interrupted surface or edge, the sensor may also be used as an encoder. For example, a magnetic reluctance or other sensor may be used to detect interruptions in the edge surface, thereby also providing positioning information that can be used to determine the precise rotation and/or position of the turbine disk 243. By knowing the position and rotation of the turbine disk 243, a corresponding position of, for example, a drive gear may also then be known. Accordingly, the turbine disk 243 may be used to advance, retreat, and track the position of a drive gear.

Figure 11:
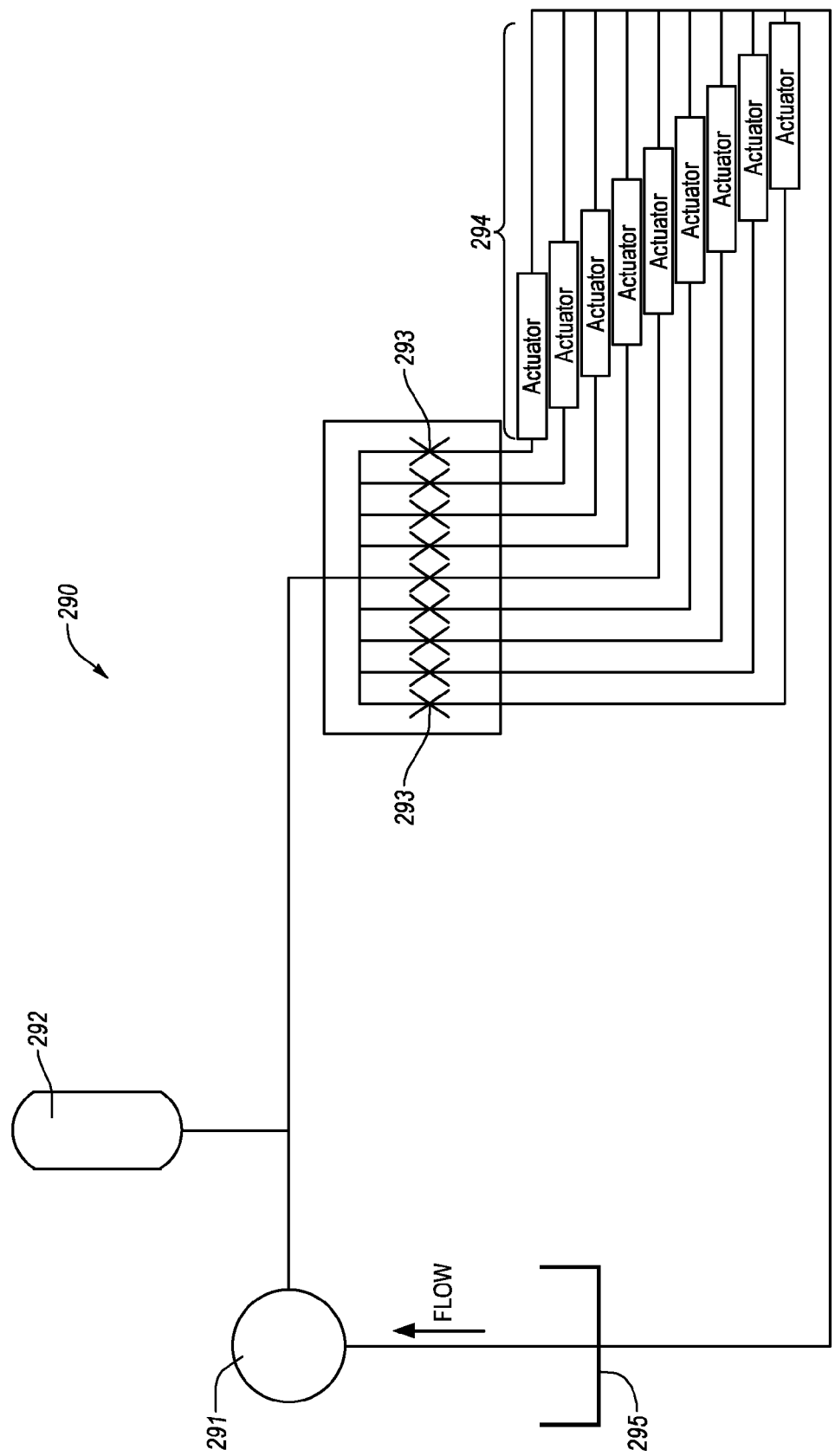
FIG. 11 illustrates an example hydraulic system usable to drive hydraulic actuators used in connection with embodiments of the present disclosure.

With reference now to FIG. 11, an example hydraulic system 290 is schematically illustrated. The hydraulic system 290 is one example of a control and/or actuation system usable to control a transmission as described herein, including a transmission that includes the sheave assembly 218 in FIGS. 9A-9C. In the illustrated system, a hydraulic pump 291 is provided and is connected to an accumulator 292. As fluid travels from the pump 291, the accumulator 292 acts as a pressurized storage reservoir. From the accumulator 292, fluid travels to a valve set. The valve set may include any number of valves 293. For instance, one or all of the valves may be independently selectable to selectively be activated and opened to allow hydraulic fluid to pass from the pump 291 and/or accumulator 292. Each valve 293 may, for example, correspond to a different nozzle, actuator, or other component with in a system. Such components are collectively illustrated as the actuators 294, but may include any type of actuator, controller, and the like.

For instance, in the sheave assembly 218 in FIGS. 9A-9C, a number of different components may be hydraulically driven. For instance, there are two sheave actuators 232 that may utilize hydraulics, and which are optionally separately driven. In addition, three turbine disks 243*a-c* may each have forward and reverse capabilities facilitated by a pair of nozzles 250. Thus, six total nozzles 250 may be used to facilitate forward and reverse functionality for the set of turbine disks 243*a-c*. Optionally, the cross-over shaft 264 may also have an associated hydraulic actuator to drive the linking gears 265 and thereby cause indexing of the drive gears 234 to a desired radial position. Thus, in total, two hydraulic actuators may be used to control axial movement of the sheave 226, one hydraulic actuator may be used to control indexing and radial translation of the drive gears 234, and six hydraulic actuators may be used to control correction of the drive gears 234 via as set of nozzles that control gear teeth advancement in forward and reverse directions. Of course, more or fewer actuators may also be used, or the manner of using actuators may be altered. For example, a single actuator may be used to control axial movement of the sheave 226, multiple actuators (e.g., two) may be used for the indexing of the drive gears 234, and more or fewer components may be combined or added to the transmission system 200.

In view of the nine actuators discussed, FIG. 11 illustrates nine valves 293 within a valve set. Each valve 293 can include a line leading to its own actuator 294, which may be any of the actuators discussed, but also generally represent any other type of actuator as well. Each of the actuators 294 may then tie into one or more return lines that lead to a reservoir 295 that supplies hydraulic fluid to the pump 291.

The components described herein can take any desirable form. For instance, in one embodiment, the pump 291 may be electrically driven, shaft driven, mechanically driven, or have another suitable configuration. As a result, the pump 291 may also have a pressure relief regulating valve that returns to the reservoir. Such a pump 291 may then run continuously and, when not needed, the pressure relief may bleed back the fluid into the reservoir 295. An electrical pump may, for example, be used intermittently, and the accumulator 292 may instead be used to build up pressure for maximum usage conditions. Thus, an intermittently used pump—whether electrical, mechanical or otherwise driven—can optionally minimize pump usage time and power consumption and then peak its usage with an accumulator 292, although the accumulator 292 is also not necessary. A pump 291 may be sized for the maximum usage condition and therefore bypass the need for the accumulator 292, or a reduced power pump 291 may be used in connection with the accumulator 292. An accumulator 292 may also compensate for changes in system volume due to expansion and contraction of hydraulic fluid. The illustrated hydraulic system 290 is therefore merely exemplary of a suitable hydraulic system, but numerous alternative hydraulic systems may also be used. Furthermore, while some actuators in a system may be hydraulically controlled, other actuators may be mechanical, pneumatic, electrical, or otherwise controlled, such that a hydraulic system may control actuation of only some components of the transmission system 200.

With respect to the embodiments illustrated in FIGS. 9A-10, it should be appreciated that the individual and collective components of the correction system 240 and the hydraulic system 290 can thus act as examples of means for correcting a position of teeth of a driving gear 234. The correction system 240 for a transmission may also act as a vibration control system. For example, in a belt drive system, a friction belt may stretch as it unwraps off a sheave, and due to the existing tension in the belt. According to similar principles, a chain drive system also may appear to stretch as the chain wears. More particularly, as a chain wears, the pitch of the chain changes. As a result, when the chain becomes disengaged from a gear and tension is applied, the wear can allow some amount of stretch to be observed. The chain may stretch link-by-link, as each link becomes disconnected from each tooth. The full stretching may not be instantaneous and some stretching may occur as the chain wraps around the sheaves; however, a large portion of the apparent stretching may still occur at disconnection between a chain link and a carrying sprocket/sheave.

As a result of the cycling of the chain and the link-by-link apparent stretching of the chain, a vibration may be produced. For example, if there are three sprockets or drive gears carrying the chain, the chain may stretch back to each other sprocket, such that vibration may occur as the angular relationship in the chain changes three times per revolution. The embodiments herein can, however, provide control to correct or minimize such vibration. For example, as noted herein, a transmission may include a correction system 240 to rotate the drive gears 234. By correcting the drive gears 234 and rotating the drive gears 234 about their respective axes, the transmission can be adjusted to control at least the period of the vibration and reduce or minimize the effect of such vibration.

In some cases, the correction of the drive gears 234 to control the vibration may be produced with a small amount of slip occurring between the chain relative to the sheave. Such slip, while not necessarily desirable in itself, may nonetheless be desired on a system perspective as the slip can be managed and may help control unwanted vibration. Further, the amount of slip can be defined relative to the apparent stretch of the chain to limit the effect of the slip. Thus, advancing and/or retreating the drive gears 234 may be of significant use in controlling vibration of the transmission system 200, and the forward/backward control of the rotation of the drive gears 234 permits the drive gear 234 to become loaded during rotation.

Chain

Figure 12A:
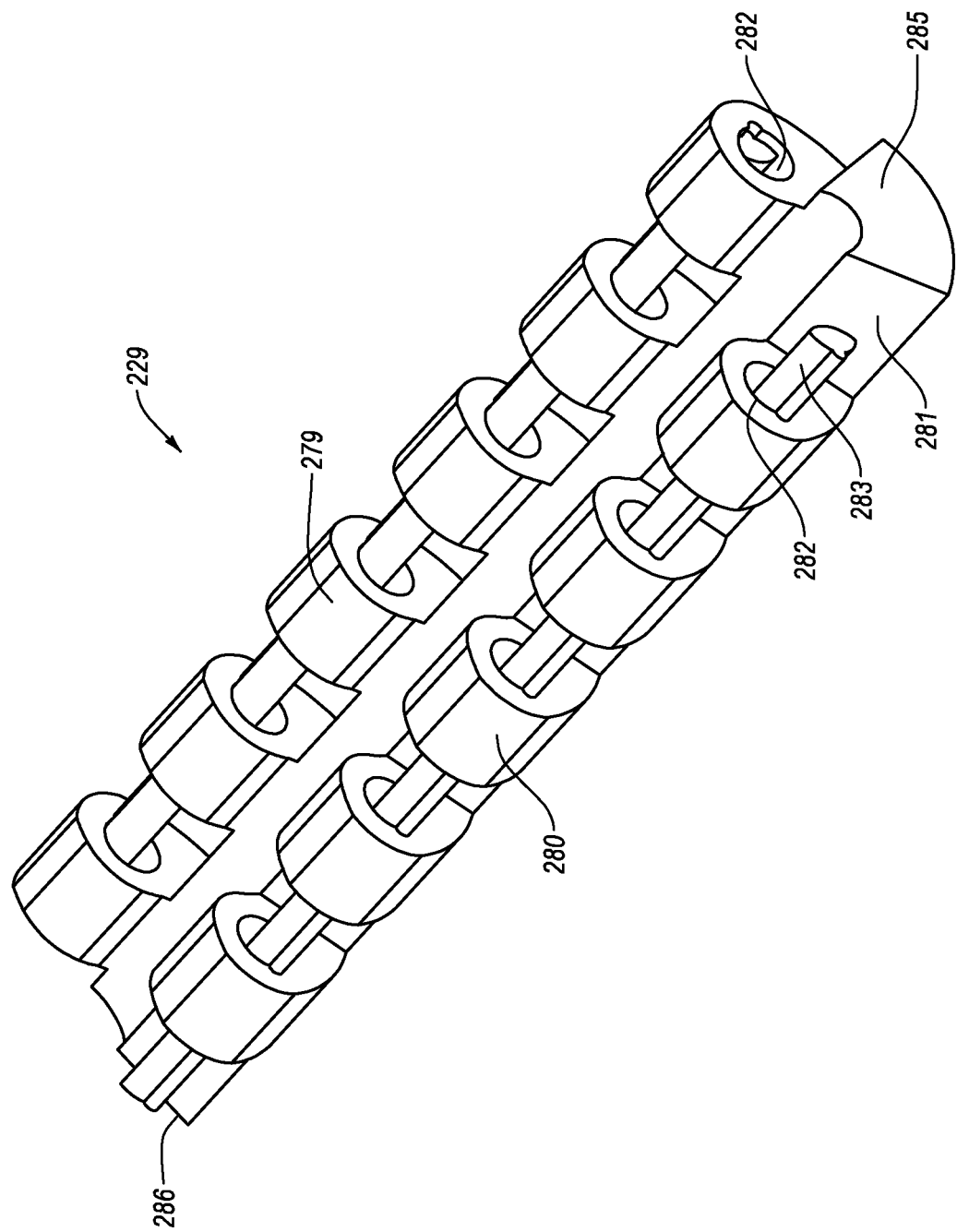
FIG. 12A illustrates a perspective view of a chain link usable with transmissions according to some embodiments disclosed herein.
Figure 12B:
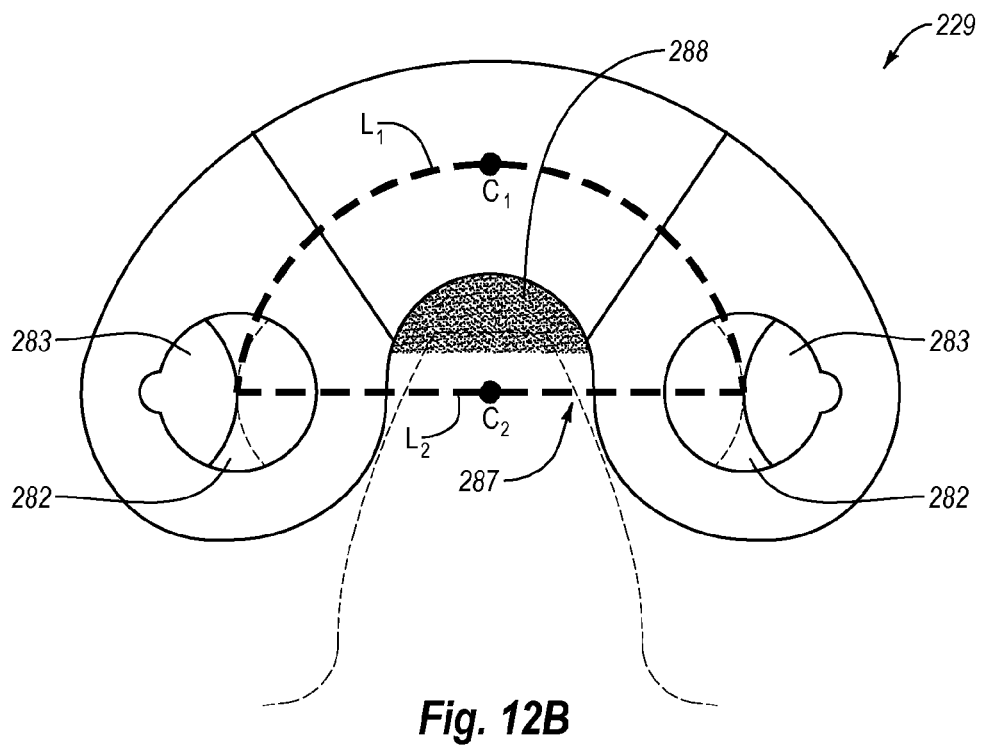
FIG. 12B illustrates a frontal view of the chain link illustrated in FIG. 12A.

Turning now to FIGS. 12A and 12B, an example chain link 229 that may be used in connection with the transmission system 200 (FIGS. 9A-9C) is illustrated. It should be appreciated, that multiple chain links 229 may be combined to form a chain that may then be coupled to the sheave assembly 218 of FIGS. 9A-9C. It should be appreciated that the chain links 229 are merely exemplary embodiments of suitable chains and links that may be used in connection with the disclosed embodiment, and other chains and links are contemplated, including, but not limited to, chains and links described elsewhere herein.

More particularly, FIG. 12A provides an isometric view of a single chain link 229 that may be combined with other links 229 to form a chain. In particular, FIG. 12A illustrates a link 229 that has a generally elongated body 281. In this embodiment, the body 281 includes a plurality of interlocking features 279, 280. For example, on a first elongate side of the body 281, the example embodiment of the chain link 229 includes six interlocks 279. Specifically, the interlocks 279 are, in this embodiment, generally spaced apart at equal intervals, with the intervals between the interlocks 279 having a length generally corresponding to the length of the interlocks 279. Similarly, a second side of the body 281 includes, in this embodiment, five interlocks 280. As with the first interlocks 279, the second interlocks 280 are also, in this example embodiment, spaced apart at generally equal intervals, and the intervals between the second interlocks 280 optionally have a length that corresponds generally to the axial length of the interlocks 280 and the axial length of the interlocks 279.

According to one embodiment, the first and second interlocks 279, 280 have an offset configuration. For instance, the first interlocks 279 may be offset from the second interlocks 280. In this particular example, the first interlocks 279 are generally positioned to be aligned with the intervals between the second interlocks 280. In a similar fashion, the second interlocks 280 are aligned with the intervals between the first interlocks 279 on the opposing side of the chain link 229. According to an example embodiment, such an arrangement allows chain links 229 to be connected in a side-by-side fashion, by positioning adjacent links such that the first interlocks 279 of an intermediate chain link 229 are placed within the intervals between the second interlocks 280 of an adjacent link 229, and such that the second interlocks 280 of the intermediate chain link 229 are positioned between the intervals between the first interlocks 279 of a different chain link 229.

When adjacent links 229 are positioned in the manner described above, the links 229 may then be connected together to form a chain. For instance, FIG. 12B illustrates a frontal view of the exemplary chain link 229 of FIG. 12A. As shown in this embodiment, the first and second interlocks 279, 280 may have openings 282 therein. Such openings 282 may be configured to receive a pin 283. A single pin 283 may pass through a set of first interlocks 279 on one chain link 229, and through a set of second interlocks 280 on a second chain link, and thereby secure adjacent chain links 229 together. In other embodiments, however, two pins 283 may each pass through a single set of openings 282 defined by interlocked, adjacent chain links 229.

While the pins 283 may be sized and shaped to correspond to a shape of the openings 282 in the first and second interlocks 279, 280 of a chain link 229, this is not necessary. For instance, as shown in FIG. 12B, the pins 283 may not be shaped or sized to fully fill openings 282, or to have a shape corresponding to that of the openings 282. In the illustrated embodiment, for instance, the openings 282 are generally circular while the pins 283 have an elliptical shape with a minor diameter that is about half the diameter of the openings 282. As a result, when adjacent links 229 are positioned together, two pins 283 may each be positioned within a same opening 282 and used to secure adjacent links 229 together. As shown in FIG. 12B, the openings 282 and/or pins 283 may also include corresponding tabs 284 that are used to position pins 283 within a corresponding structure of the openings 282. Such feature is exemplary only, and in other embodiments, detents, lock fits, interference fits, or other structures, or a combination thereof, may be used to secure the pins 283 to the chain links 229. FIG. 12B further illustrates, in dashed lines, that optional second pins may be included within the openings 282.

As shown in FIG. 12A, the chain link 229 can include first and second side faces 285, 286 that are configured to engage a sheave or other member. The first side face 285 and second side face 286 are further optionally angled. In this embodiment, for instance, the side faces 285, 286 angle inward from an outer surface towards an interior surface. The angle itself is optional, but may be desired particularly in embodiments in which the chain link 229 is used in connection with an angled sheave. For instance, the angle on side faces 285, 286 may match or otherwise generally correspond the angle on an adjoining sheave. Thus, as the sheave moves axially, a chain composed of the chain links 229 may move radially outward or inward relative to a central axis of the sheave, and along the face of the sheave.

Moreover, in some embodiments, the chain links 229 may be configured to engage a sprocket or other gear. For instance, as described herein, one or more gears may be configured to engage the chain links 229 to prevent or reduce slip between a chain and an adjoining sheave. In the illustrated embodiment, the chain link 229 has a curved configuration that facilitates engagement between the chain links 229 and a gear. For instance, relative to the orientation in FIG. 12B, if a line $L_1$ is drawn between the centers of interlocks 279 and interlocks 280, and follows the contour of the body 281, a center point $C_1$ is positioned within body 281, but is vertically offset from the centers of the openings 282. Such an offset, and the curved shape of the body 281 is even more evident if a straight, horizontal line $L_2$ is drawn between the centers of the interlocks 279, 280 and/or the openings 282. A center point $C_2$ of line $L_2$ remains in plane with the centers of the openings 282, but is positioned vertically below the center point $C_1$ of the line $L_1$.

Such a curved body 281 may also provide a gap in the body 281. For example, along the horizontal line $L_2$, the body 281 is shown as defining a channel 287. The channel 287 may be a gap that is sized and otherwise configured to mate with a corresponding gear, such that as the gear engages the chain link 229, the gear teeth may engage the interior surfaces of the interlocks 279, 280. Moreover, as described previously, body 281 may also be elongated. As a result, an engaging gear optionally has a width that generally matches the elongated length of the chain link 229. In other embodiments, the engaging gear may have a width substantially less than the elongated length of the chain link 229. In still other embodiments, multiple engaging gears may engage the same chain link 229. Moreover, as noted above, the chain link 229 is merely exemplary and in other embodiments a chain link may have fewer interlocks 279, 280, may not be elongated to the extent illustrated particularly in FIG. 12A.

One skilled in the art will appreciate in view of the disclosure herein that a lubricant is optionally used in connection with engagement between the chain links 229 and a sheave and/or drive gears. According to one embodiment, chain oil or another lubricant may be used in connection with a chain composed of the chain links 229, and the lubricant may facilitate operation of the chain with a corresponding set of gears, sprockets, sheaves, or other components.

As discussed herein, a chain or other wrapping member may orbit around elements of an input and output system. As the chain rotates within the system, the rotational speed may have an effect on a lubricant or other materials on the chain. For example, based on the rotational speed of the sheave and/or a chain, the inertia of the lubricant may pressurize itself and a force may be exerted that is in a radial direction. More specifically, a force may tend to press the lubricant in a direction that extends radially outward relative to a center of the sheave.

According to some embodiments, while a lubricant may thus generally tend to move away from a chain and sheave, some embodiments of the chain may be configured to at least partially restrict or prevent such lubricant from freely flying away from the center of the sheave, and away from the chain. For instance, as best shown in FIG. 12B, which offers a profile of a chain link 229 and illustrates engagement of the chain link 928 with a gear tooth, and as discussed above, a chain link 229 may have a curved configuration in which a channel 287 is formed. The channel 287 may be approximately centered within the body 281 of the chain link 229, and can act as a trap for a lubricant. More particularly, the lubricant 288 may be trapped in the channel 287 such that as the inertial force is applied, the lubricant 288 becomes pressurized. Continued orbital motion of the chain link 229 can cause the lubricant 288 to remain trapped on the interior surface of the chain link 229 that defines the channel 287. Furthermore, as the side faces of the chain link 229 may be positioned generally adjacent corresponding faces of a sheave, the lubricant may be radially and axially trapped within the channel 287. In being trapped within the channel 287, the lubricant 288 is collected and can not only lubricate the engagement between the chain link 229 and a gear tooth, but can also be delivered through the channel 287 to the lubricate the sheave contact area on the side faces of the chain link 229.

Figure 13:
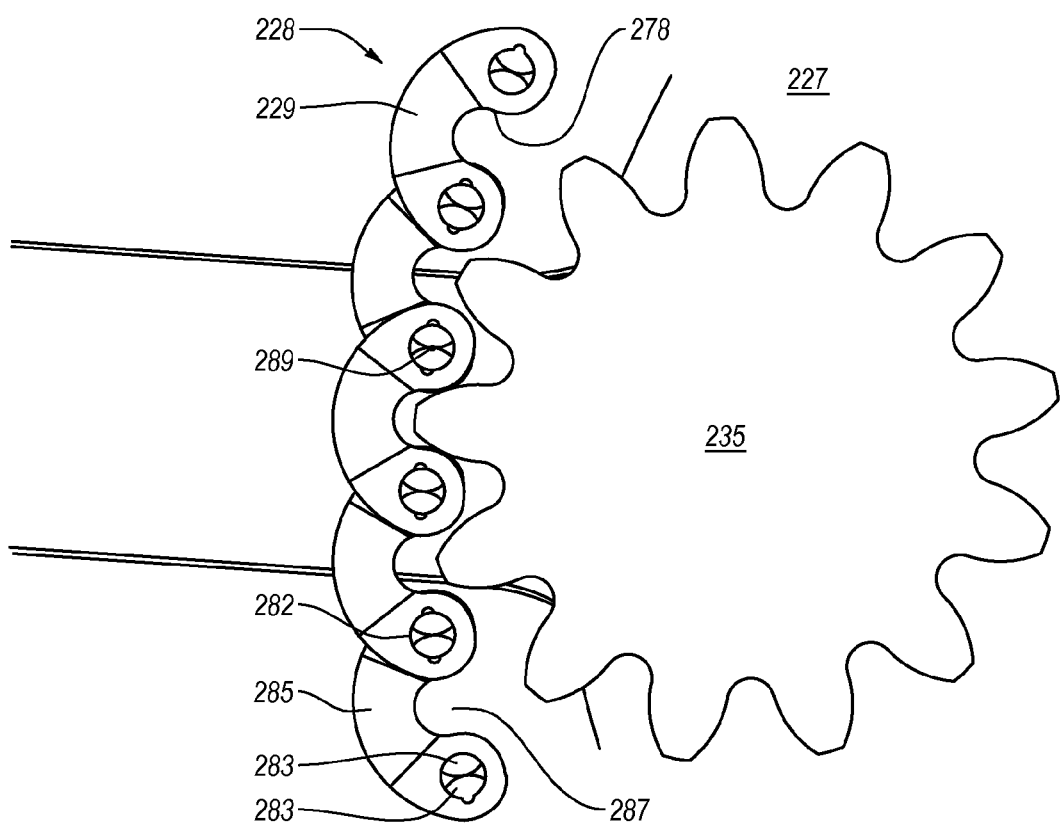
FIG. 13 illustrates a frontal view of a chain engaged with a transmission sprocket, according to some embodiments of the present disclosure.

When multiple links 229 are connected together (e.g., by using pins 283), a chain 228 may be formed. FIG. 13, for example, illustrates a chain 228 that is composed of a series of chain links 229. Each of the chain links 229 may be connected to one or more adjacent links 229. The illustrated chain 228 is only a partial chain, however, it will be appreciated that end links of the chain 228 may be attached so as to define a continuous chain 228. Furthermore, in the illustrated embodiment, the side faces 285 of the chain links 229 may be contact surfaces where the chain 228 rides on a corresponding sheave.

In FIG. 13, the chain 228 is shown as being coupled to a sprocket 235. Optionally, the chain 228 is also engaged with, or otherwise configured to operate in connection with, a sheave 227. In one embodiment, the chain 228 and sprocket 235 can move radially with respect to the sheave 227. In the illustrated embodiment, it can be seen that adjacent, connected links 229 of the chain 228 may be pivotally connected, such that each link 229 may at least partially rotate relative to adjacent links 229. During such relative rotation, there may be a point of contact between the adjacent links 229. In FIG. 13, for instance, each link 229 may be connected to an adjacent link 229 through the use of two pins 283 passing through a single opening 282 in a chain link 229. In this embodiment, the pins 283 have generally elliptical shapes with minor diameters about half the diameter of the opening 282 such that a pin contact point 289 is formed approximately in the center of the openings 282, and is defined by a point of contact between the two pins 283 within the opening 282.

The sprocket 235 does not need to engage the chain 228 at the pin contact points. For instance, in the illustrated embodiment, sprocket contact faces 278 are formed on the interior faces of the link body 281. The interior faces of the body 281 may, for example, be faces that at least partially define the channel 287.

As will be appreciated in view of the disclosure herein, the shape and configuration of the links 229 and pins 283 may be such that the sprocket contact faces 278 are concentric with pin contact points 289. Furthermore, in contrast to a typical "silent chain" configuration, which has chain link spacing dependent on the diameter of an engaging sprocket, the spacing of the chain links 229 can be independent of the diameter of the sprocket 235 around which chain 228 is wrapped. In other embodiments, a silent chain may be utilized. Regardless of the specific form of the chain 228, the chain 228 may be used to convey power. Accordingly, the chain 228 and links 229 are each examples of means for transferring power. In embodiments in which the chain 228 retains fluid, the chain 228 and links 229 are further each examples of means for retaining lubricants and means for pressurizing lubricants.

Accordingly, it will be appreciated that a chain 228 according to embodiments of the present disclosure can provide numerous features. Included among such features is the ability to trap oil or another lubricant for use in a self-pressurizing lubrication system that delivers lubricant to a sheave contact area. Furthermore, a single link may be made to connect with adjacent links without necessarily requiring different links (e.g., "A" links and "B" links).

3. Transmission with Ring Gear

Figure 14A:
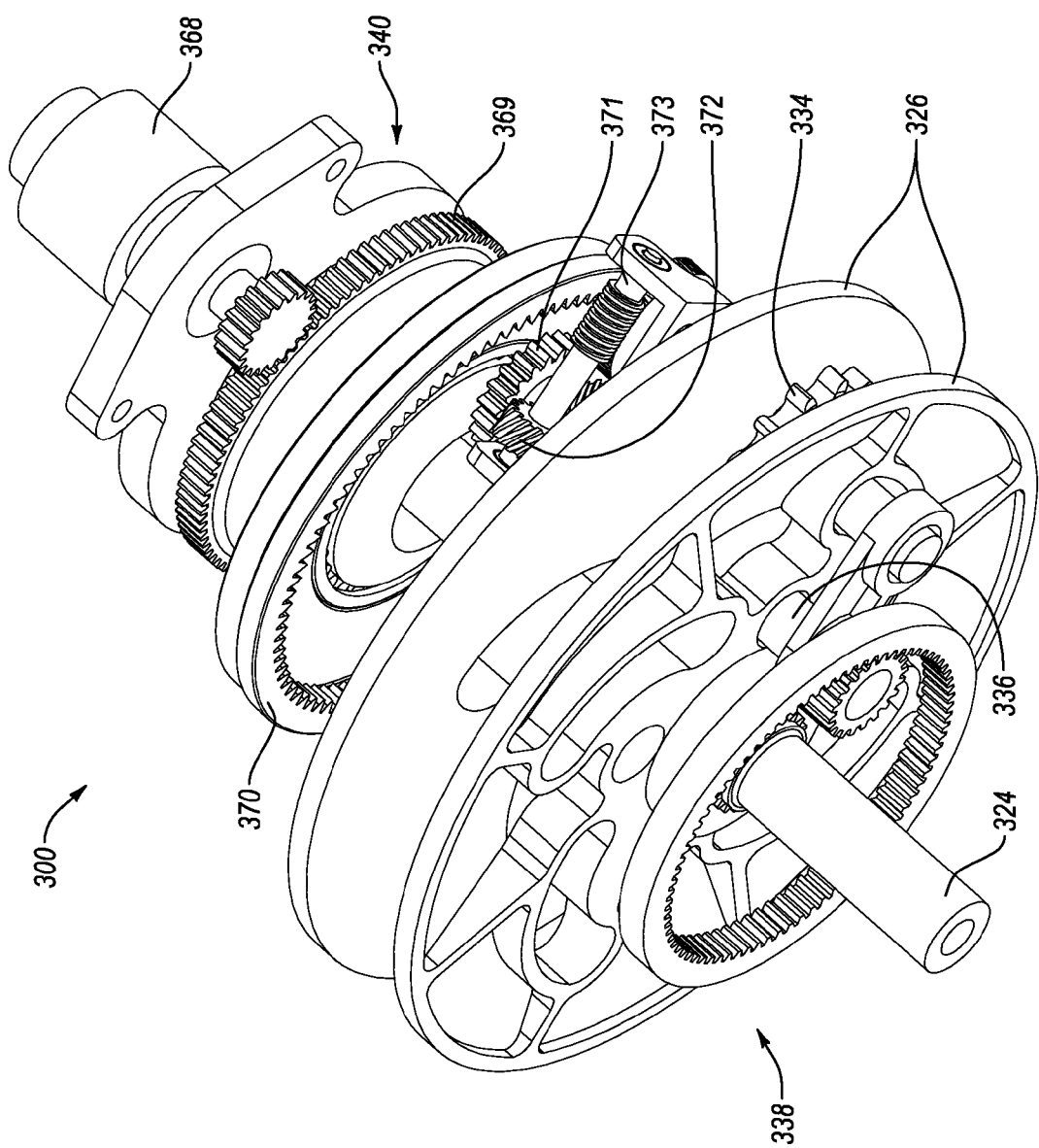
FIG. 14A illustrates a perspective view of a transmission according to another exemplary embodiment of the present disclosure.
Figure 14B:
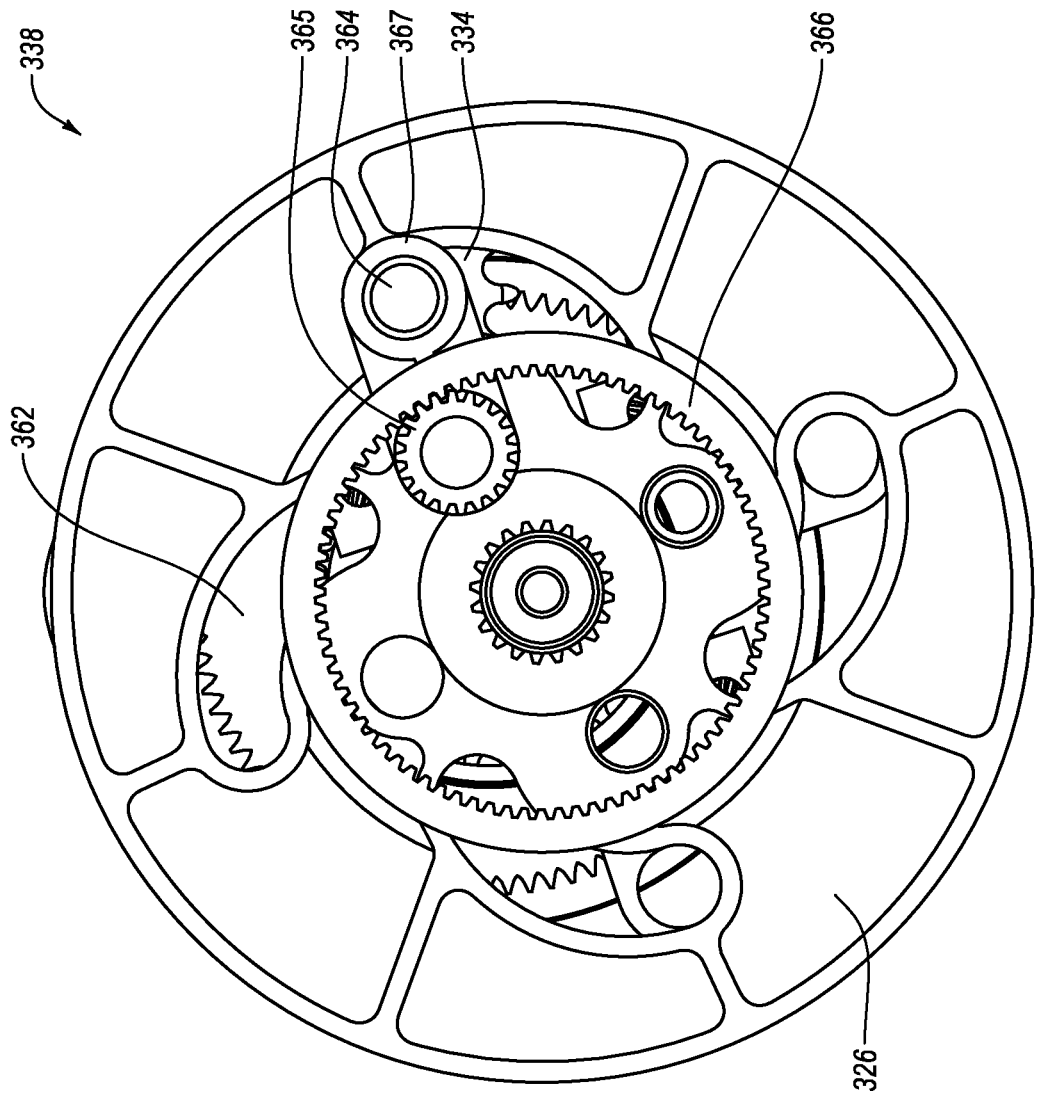
FIG. 14B illustrates a frontal view of the transmission of FIG. 14A.
Figure 14C:
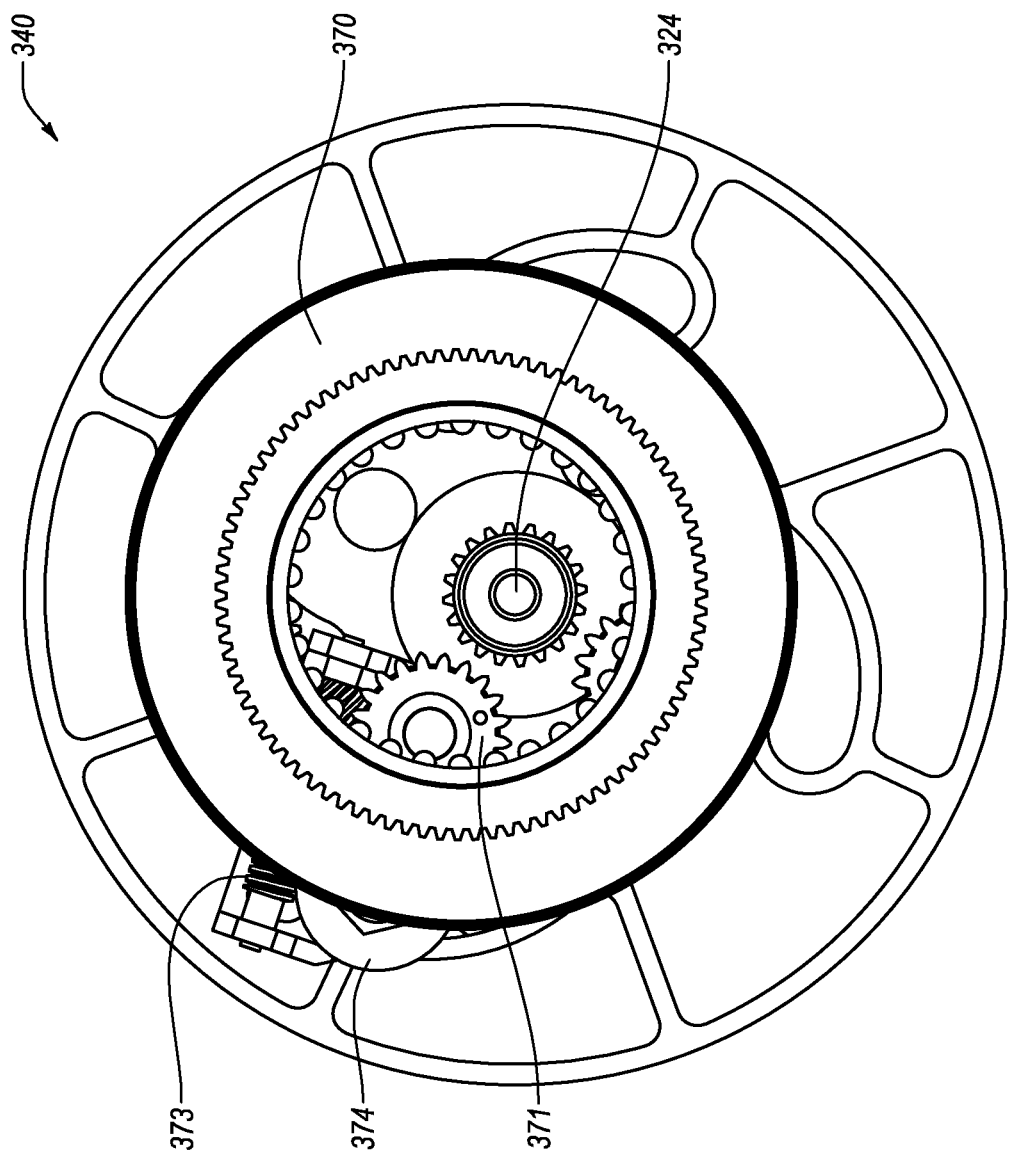
FIG. 14C illustrates a partial rear view of the transmission of FIG. 14A.

As noted herein, there are various alternative embodiments that may be used for any of the components, systems, subsystems, or assemblies illustrated and/or described herein, and which are suitable to replace or supplement the specific embodiments disclosed herein. FIGS. 14A-14C, for example, illustrate an embodiment of a sheave-and-belt transmission 300 according to another embodiment of the present disclosure. In the illustrated embodiment, only a portion of the transmission 300 is illustrated in order to more clearly view various components of the system (e.g., the illustrated portion may generally represent a power input and/or power output system). The transmission 300 may, however, operate on the input and/or output sides of a transmission.

In some regards, the transmission 300 can be operated in a manner similar to other transmissions described herein (e.g., transmissions 10, 100, and 200). For example, the transmission 300 may include a sheave 326 that is optionally formed from one or more movable halves. The halves may be mirror images or may differ relative to each other. A wrapping member such as a belt or chain (not shown) may be used in connection with the sheave 326, and can be used to drive another element, or can be used to drive the illustrated sheave 326. For instance, as the transmission 300 may be an input system, the transmission 300 may drive the wrapping member as it connects to a sprocket, sheave, gear, or other component on an output system. The wrapping member may also connect to a driven sprocket and/or a chain tensioner to account for changes to the wrapping member by virtue of movement of the sheave 226.

In the illustrated embodiment, the transmission 300 includes a set of sprockets 334 that can act as drive gears. For instance, the sprockets 334 may be disposed within the sheave 226. As with other transmission embodiments described herein, the sprockets 334 may engage the wrapping member and may also move radially inward and outward relative to the sheave 226. Such radial movement of the sprockets 334 may generally correspond to axial adjustments made by the sheave 326.

Synchronization System

The transmission 300 may include a synchronization system 338 that is used to adjust the position of the teeth of the sprockets 334, so as to ensure the sprocket teeth are aligned with a wrapping member. In some embodiments, the synchronization system 338 may act to correct sprocket teeth when the wrapping member is running at a gear ratio corresponding to a non-integer position.

With particular regard to FIG. 14B, a synchronization system 338 is illustrated. For clarity, only a single sprocket 334 is illustrated, although it will be appreciated that more sprockets 334 may also be used. For instance, the transmission 300 can include four sprockets 334 spaced at ninety degree intervals. More or fewer than four sprockets 334 may also be used.

In FIG. 14B, a ring gear 366 is illustrated. The ring gear 366 is connected to a linking gear 365 in the illustrated embodiment, although there may be one linking gear 365 for each sprocket 334. When the sheave 326 is moved axially, it may be desirable to also move the sprockets 334. As a result, to coincide with the movement of the sheave 326, the ring gear 366 can be rotated. Rotation of the ring gear 366 may cause the linking gears 365 to rotate as well. According to one embodiment, the ring gear 366 rotates independently relative to the sheave 326. In another embodiment, the ring gear 366 rotates about a longitudinal axis of a drive shaft of the sheave 326, and relative rotation of the ring gear 366 is used to drive the sprockets 334.

According to the illustrated embodiment, the linking gears 365 are attached to an arm 367 which in turn attaches to a shaft 364 (FIG. 14A). Rotation of the linking gears 365 causes the arm 367 to rotate. The arm is positioned within an arcuate channel 362 in the sheave 326. As the arm 367 rotates, the shaft 364 is moved along the arcuate path defined by the channel 362. The sprocket 334 is attached to the shaft 364 in this embodiment, such that as the shaft 364 moves along the channel 362, and changes a radial position relative to the sheave 326, the sprocket 334 is also moved radially. The components of the synchronization system 338, thus collectively and individually, are examples of means for radially moving the sprockets 334 and/or a chain that engages the sprockets 334.

In other embodiments, the ring gear 366 of the synchronization system 228 may be eliminated. For example, in some embodiments, the sheave 326 may have channels formed therein along which the shafts 364 move. Optionally, the shafts 326 can be fitted within the channels 362, and can float therein in a manner such that movement of the sheave 326 automatically causes the shafts 364 to move to a corresponding radial position.

Correction System

FIGS. 14A and 14C further illustrate exemplary components of a correction system 340 that can be used to selectively rotate sprockets 334. For instance, such system may selectively rotate the sprockets 334 to provide tooth correction in chain positions corresponding to partial tooth effective circles.

More particularly, the illustrated correction system 340 includes a correction actuator 368 that can cause an outer gear 369 to rotate. The outer gear 369 engages a correction ring gear 370 that rotates. An interior gear 371 may be positioned within the ring gear 370, and potentially multiple interior gears 371 (e.g., one corresponding to each sprocket 334) may engage the ring gear 370. Notably, in this embodiment, and as best shown in FIG. 14C, the correction ring gear 370 may be positioned off-center relative to a drive shaft 324 on which the sheave 326 is positioned. As a result, as the sheave 326 and drive shaft 324 rotate, the various interior gears 371 may alternately engage the ring gear 370. In other words, some but not all of the interior gears 371 may engage the ring gear 370 at any particular point of time. The interior gears 371 may also engage a worm driving gear 372. The worm driving gear 372 may be coupled to a worm gear 373 that rotates as the worm driving gear rotates 372. For instance, the worm driving gear 372 may rotate a shaft on which the worm gear 373 is positioned. A worm wheel 374 may be co-axial with the sprocket axles 336, or an axle on which a gear that engages the sprockets 334 rotates. The worm wheel 374 may engage the worm gear 373, such that as the worm gear 373 rotates, the worm wheel 374 and the sprocket axles 336 are selectively rotated. In some embodiments, the worm gear 373 may cause the sprockets 334 to rotate while not under load. For instance, the alternate engagement of the interior gears 371 with the ring gear 370 may occur only while the corresponding sprocket 334 is not engaged with a chain.

One aspect of the embodiment in FIGS. 14A-14C, and which can be applied equally to all embodiments disclosed herein, is that the transmission 300 provides mechanical intelligence for correcting the sprockets 334. For example, in the illustrated system, the off-center position of the correction ring gear 370 relative to the drive shaft 324 facilitates a mechanical intelligence whereby each of the sprockets 334 is automatically adjusted, so that the mechanism corrects itself. The correction system 340, as well as the illustrated and described components thereof, thus are examples of means for correcting a tooth position of a sprocket 334, and examples of means for providing mechanical intelligence to correct a tooth position of a sprocket 334.

Moreover, the use an eccentric or off-center gear is not the only manner in which mechanical intelligence may be utilized in this regard. For example, in another example, there may be multiple chains running on multiple sheaves. For example, four chains may be positioned on four sheaves. During operation, only one sheave may be carrying the load.

Additionally, in another embodiment a differential is used as a mechanical intelligence device. For instance, with a differential, there may be two inputs that are related to each other by the differential and used to produce an output. As the inputs change relative to each other (e.g., by changing the distance between sheave halves so that the chain moves radially), a corresponding change will be obtained as an output of the differential. More specifically, as rotational size changes, there may be a proportional change in the rotational output of the differential. In knowing that the drive shaft 324 will turn a certain amount with each rotation, and by knowing the proportion of change in the rotational motion of the drive shaft 324, the proportions can tied back into the sprockets 334 to automatically adjust the sprockets 334 for engagement with a chain at non-integer locations. Thus, sensors, encoders, motors, actuators, and the like may not be necessary for correcting the sprockets 334.

Additionally, while the above examples illustrate correction of the sprockets, in other embodiments the chain itself may be corrected. For example, a roller may be placed outside the chain, and can then adjust the chain position to engage even at non-integer locations.

Chain

Figure 15:
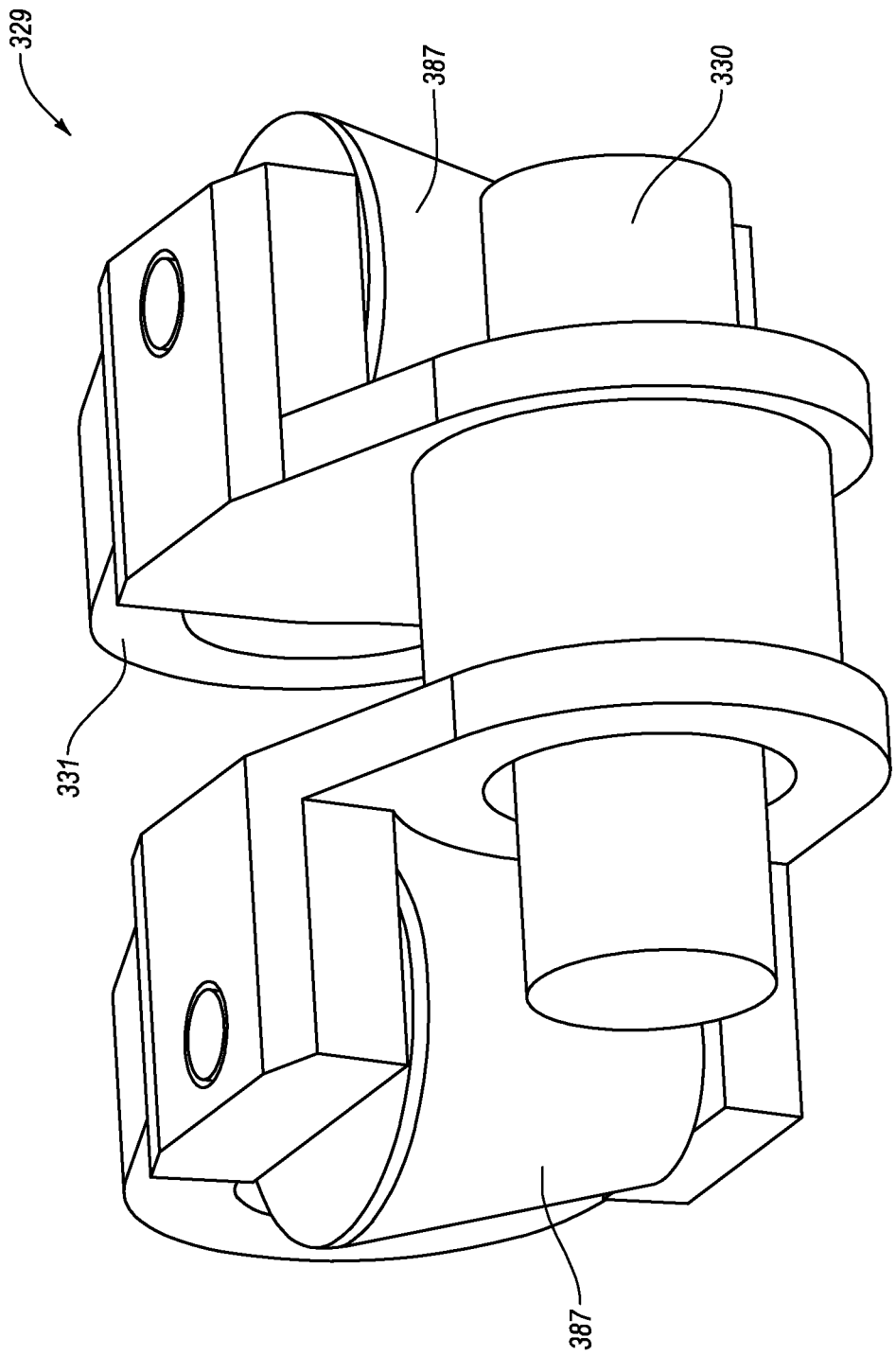
FIG. 15 illustrates a chain link usable in accordance with some embodiments of transmissions disclosed herein.

The transmission 300 of FIGS. 14A-14C may use any suitable chain or other wrapping member that can carry a load between an input and an output system. FIG. 15 illustrates an example embodiment of a chain link 329 that can be utilized in connection with the system herein. As shown in FIG. 15, a chain link 329 includes a set of rollers 387. The rollers 387 may be inclined and configured to rotate about respective internal axis. As such, when the rollers 387 of the chain link 329 roll against a sheave, or on a layer of fluid on a sheave, the rollers 387 can roll, instead of drag, thereby reducing dynamic friction in the system. The chain link 329 can also include corresponding connection structures 330, 331 for connecting the chain link 329 to adjacent links. For instance, in FIG. 15, the chain link 329 includes a first structure 330, which may include a pin. The chain link 329 may also include a second structure 331 that optionally includes a receptor, which may be a channel, opening, or other receptor. The pin of one link 329 may be received within the receptor of an adjacent link 329 to form a chain.

Figure 16B:
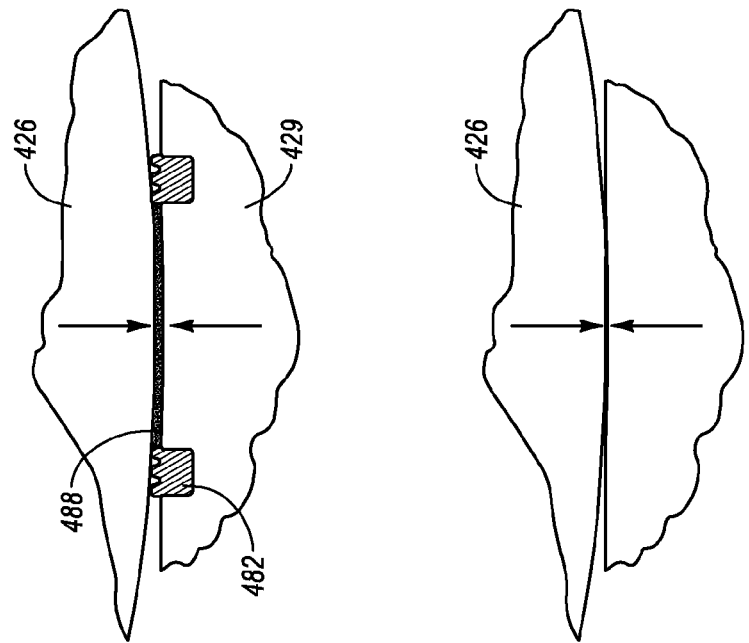
FIG. 16B illustrates a side cross-sectional view of the portion of the chain link and sheave in FIG. 16A.
Figure 16A:
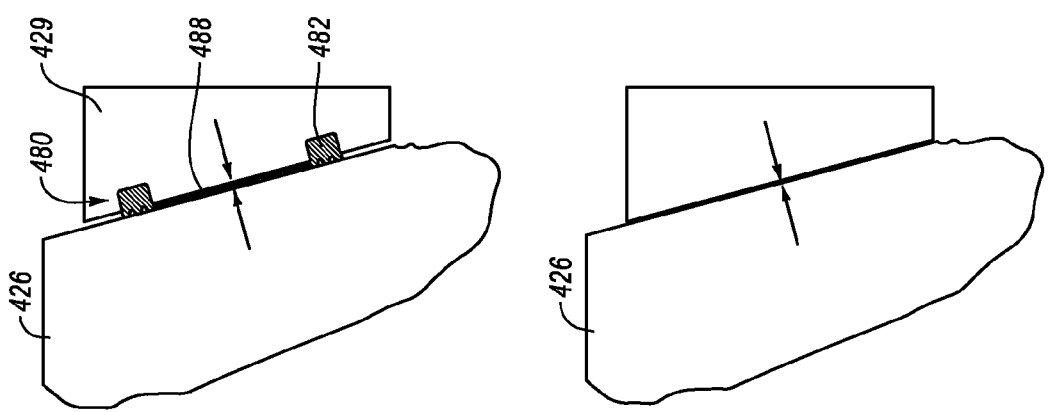
FIG. 16A schematically illustrates an overhead cross-sectional view of a portion of a chain link engaging a sheave.

FIGS. 16A and 16B, schematically illustrate another example embodiment of a chain link 429 according to one embodiment. As noted herein, a chain may operate with one or more sheaves in a reduced friction manner, and may possibly have no significant dynamic friction during engagement. One manner in which reduced friction can be accomplished is by using a chain link 429 that includes a fluid retention system 380.

The fluid retention system 480 is, in this embodiment, configured to substantially prevent a lubricant (e.g., gear oil) from weeping out from between link 479 and a corresponding sheave 426. An embodiment in which the chain link 429 is contrasted against a link without a retention system 480 is shown in FIGS. 16A and 16B, and it can be seen that with the fluid retention system 480, a thicker film of lubricant 488 may be positioned between the sheave 426 and the chain link 429. The increased fluid film layer can improve the wear characteristics by preventing or reducing metal-to-metal contact. Further, the preservation of the lubricant between the sheave 426 and the link 429 can allow regular gear oil to be used as a lubricant, thereby eliminating the need for traction fluids that are not only expensive but which can also have only a short shelf life. Further, such traction fluids are typically more viscous that a gear oil, and thereby absorb torque from the system. In short, the fluid retention system 480 can relax the requirements for fluid properties in a lubricant between the chain link 429 and the sheave 426.

In this embodiment, the fluid retention system 480 includes a set of O-rings 482 positioned around the exterior of the chain link 429. The O-rings 482 are optionally compressible. For instance, the O-rings 482 can be made of a polymeric material, such as silicone, that can be compressed. The O-rings 482 may, however, be made of other materials. For instance, the O-rings 482 can be made from other polymers, metals, organic materials, alloys, composites, other materials, or combinations of the foregoing.

The O-rings 482 can engage against the sheave 426, or against fluid on the sheave 426 as shown in FIGS. 16A and 16B. Moreover, the O-rings 482 may form a seal around fluid trapped therebetween, thereby preventing or at least reducing the amount of fluid weeping out from between the sheave 426 and the link 429. In some embodiments, the O-rings 482 may maintain the fluid seal for only a short period of time (e.g., 25 ms, 1/60 second), although based on the speed and other requirements of the transmission, such time may be increased or decreased. Inasmuch as the chain links 429 can be on a chain that constantly has the links 429 moving in and out of engagement with input and output systems, the time for fluid retention can be reduced and, further, the film of lubricant 488 can constantly renew itself as the transmission operates.

Accordingly, while the sheave 426 and chain link 429 may be described herein as being in frictional engagement, in some embodiments it is not necessary that significant dynamic friction be present, or even that the chain link 429 directly engage the sheave 426. For example, in the above embodiment in which an O-ring traps lubricant for a time while placed under compression due to an interface between the sheave 426 and the chain link 429, the chain link 429 effectively floats on a bed of lubricant 488, and near frictionless engagement can occur. Accordingly, in at least some embodiments, the chain link 329 and the chain link 429 are examples of means for transferring power. In some embodiments, the chain link 429 is further one example means for retaining lubrication fluid.

4. Transmission with Pivoting Tensioning Mechanism

Figure 17A:
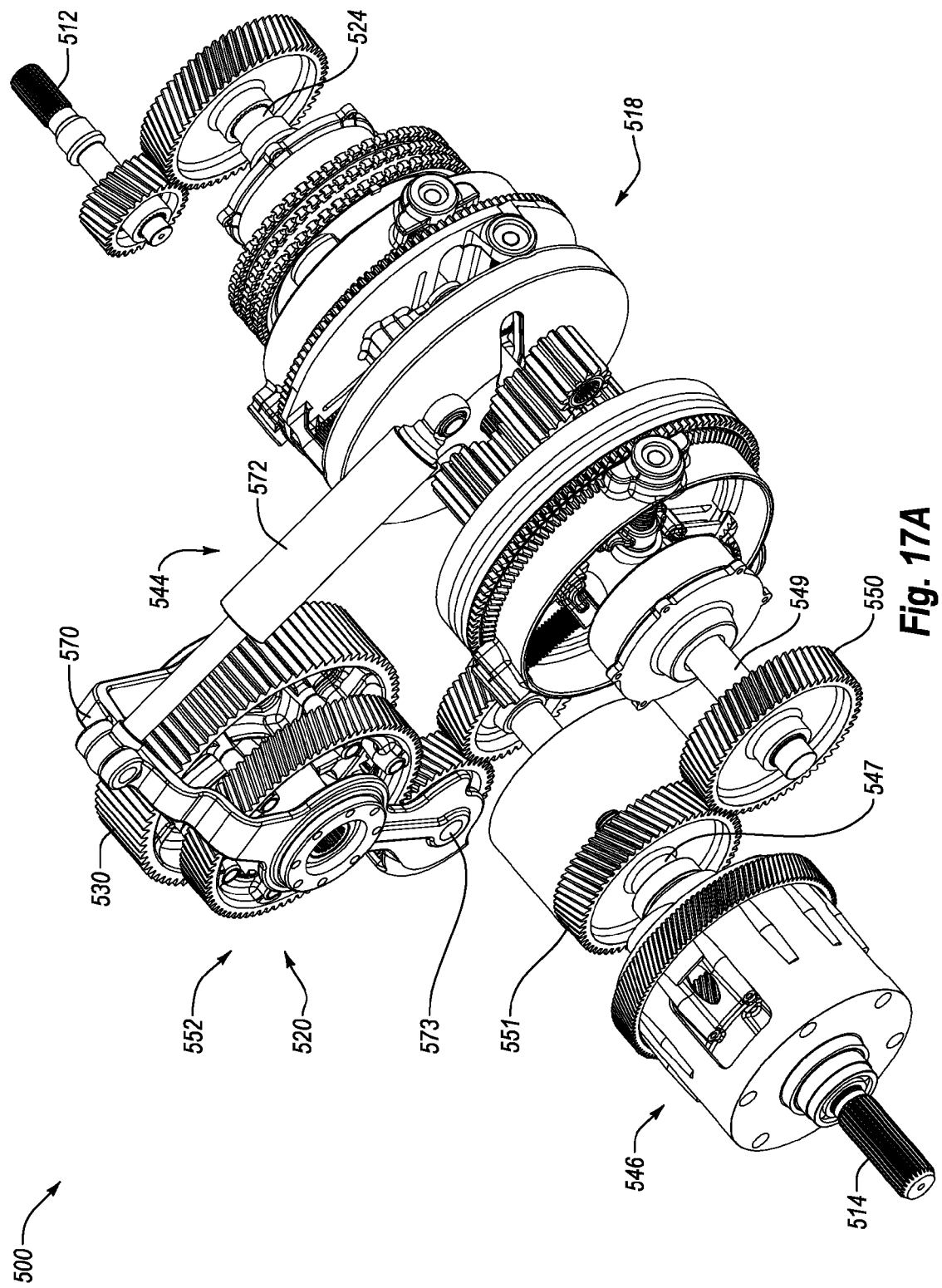
FIG. 17A illustrates a perspective view of a transmission according to another exemplary embodiment of the present disclosure.
Figure 17B:
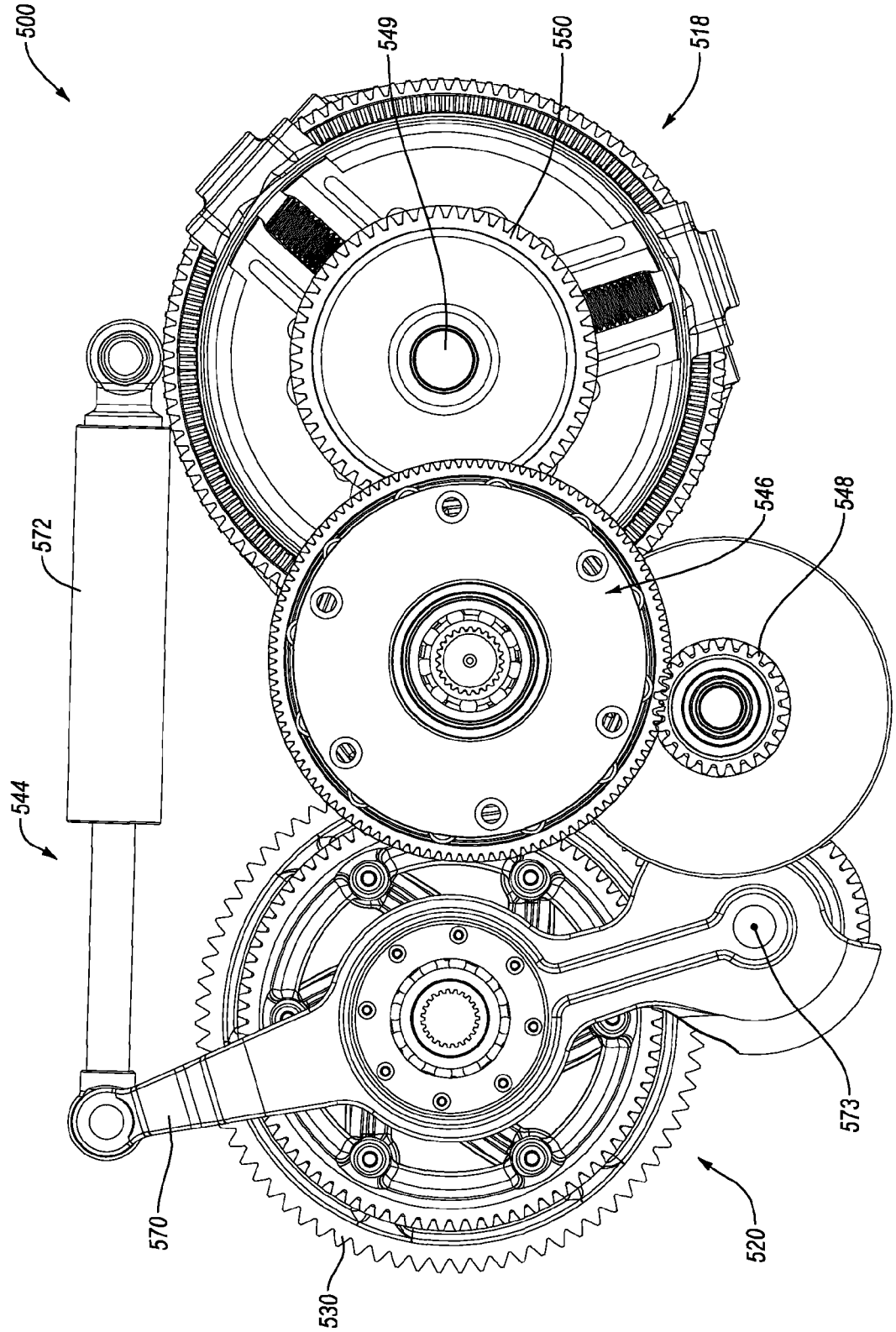
FIG. 17B illustrates a rear view of the transmission of FIG. 17A.

Turning now to FIGS. 17A and 17B, another exemplary aspect of a transmission 500 is described in additional detail. The transmission 500 may include various and components aspects as described above. Accordingly, the following discussion related to FIGS. 17A and 17B is intended to provide additional detail with respect to various components, assemblies, and features, but is not intended as a complete discussion of transmission 500, particularly inasmuch as the components and operation of other embodiments of transmissions described herein, can be equally applied to the transmission 500. Accordingly, other aspects of exemplary transmissions as described herein are also incorporated into, and usable in connection with, the transmission 500 of FIGS. 17A and 17B.

As reflected in FIGS. 17A and 17B, the transmission 500 may include variety of different components and assemblies. In one exemplary embodiment, the transmission 500 includes an input assembly 518 and an output assembly 520. The input assembly 518 of the illustrated embodiment may also be considered a sheave assembly, although in other embodiments, the output assembly 520 is additionally, or alternatively, a sheave assembly. In this embodiment the output assembly 520 is optionally connected to the input assembly 518 by using a wrapping member (not shown) that wraps at least partially around elements of the input assembly 518 and the output assembly 520. The wrapping member may include a chain or belt, although in other embodiments, other components such as gears, may connect the output assembly 520 to the input assembly 518. In the illustrated embodiment, the wrapping member is not illustrated so as to avoid obscuring various components of the input and output assemblies 518, 520. Nevertheless, it will be appreciated in view of the disclosure herein that any suitable chain or other wrapping member, including those disclosed elsewhere herein, may be utilized.

In FIGS. 17A and 17B, the output assembly 520 is illustrated as including a driven gear 530, rather than sheaves. In view of the disclosure herein, it will also be appreciated that the output assembly 520 may also have a sheave or be otherwise configured. In still other embodiments, the input assembly 518 may have a drive gear and lack a sheave. Accordingly, while the illustrated embodiment shows illustrates an embodiment in which a wrapping member may engage a driven gear 530 of the output assembly 520, with the driven gear 530 acting as a sprocket, it will be noted that such single sheave embodiment is exemplary only. In other embodiments, a wrapping member may engage a set of sheaves, a sheave cluster, internal moon gears, other types of output gears or members, or a combination of the foregoing.

Tensioning System

In the illustrated embodiment, the output assembly 520 is connected to a tensioning system 544. The tensioning system 544, as well as the individual components illustrated and described with respect thereto, are examples of means for controlling tension in a wrapping member.

As discussed herein, the input assembly 518 may be configured such that it can move a wrapping member radially relative to the axis of the input assembly 518. As the wrapping member moves, tension or slack may occur within the wrapping member. In some embodiments, the tensioning system 544 may be used to adjust the tension in the wrapping member so as to increase or decrease the tension therein. For instance, when the wrapping member moves on the input assembly 518 in a manner that increases tension (e.g., increasing the radius around which the wrapping member extends), the tensioning system 544 may be used to relieve some of the tension in the wrapping member. Alternatively, when the wrapping member moves on the input assembly 518 and slackens, the tensioning system 544 may be used to increase the tension to take up some or all of the slack. Accordingly, although not necessary, the tensioning system 544 can be used to dynamically adjust the tension in a wrapping member. In some embodiments, the tensioning system 544 may be used to maintain the wrapping member at a generally constant tension despite changes in gear ratios and/or positioning of the wrapping member. In other embodiments, the tension may vary based on the gear ratio or other considerations.

To facilitate increasing or decreasing the tension in the wrapping member, the tensioning system 544 may be configured in any suitable manner. According to one embodiment, such as that illustrated in FIGS. 17A and 17B, the tensioning system 544 may include a tensioner arm 570 and a tensioner 572. In the illustrated example, the tensioner arm 570 is arranged such that it engages with, and optionally holds thereon, the driven gear 530. As a result, by moving the tensioner arm 570, the position of the driven gear 530 may be altered, thereby changing the path of the wrapping member and affecting the tension in the wrapping member. More particularly, the illustrated embodiment of the tensioner arm 570 is configured to be fixed at a pivot 573, and connected to the tensioner 572 at a location displaced from the pivot 573. Thus, as the tensioner 572 applies a force to the tensioner arm 570, the direction of the force can cause the tensioner arm 570 to rotate around the pivot 573 in either of two directions. Optionally, the pivot 573 is placed along a longitudinal axis that extends in a direction that is about parallel to the longitudinal axis about which the driven gear 530 rotates.

The tensioner arm 570 may further be connected to the tensioner 572. In some embodiments, the tensioner 572 may act as an actuator, or be connected to an actuator. Thus, upon determining that a change in the tension of wrapping member is desired, the tensioner 572 can be actuated to move the tensioner arm 570. As shown in FIGS. 17A and 17B, the tensioner 572 may have a piston/cylinder arrangement to facilitate movement of the tensioner arm 570. Such an arrangement may be actuated in any suitable way, including mechanically, electrically, pneumatically, hydraulically, or in another manner, or in a combination thereof.

In the illustrated embodiment, one end of the tensioner 572 is illustrated as being coupled to the tensioner arm 570, while an opposing end of the tensioner 572 is illustrated as being free. Such a free end may be connected to a transmission housing (not shown) to ground against such housing in providing the actuating force to move the tensioner arm 570. While a piston/cylinder actuator is illustrated, still other types of actuators may be used. Indeed, any suitable actuator that may be used to adjust the position of the input assembly 518 or output assembly 520, or to adjust the wrapping member to modify the tension therein.

In view of the disclosure herein, it will thus be appreciated that some example embodiments may operate in a manner that does not require opposing sheaves to act in opposing directions to maintain tension in a wrapping member. For instance, the tension in a wrapping member may be adjusted by moving the driven gear 530 as shown in FIGS. 17A and 17B. While the illustrated movement of the driven gear 530 is rotational, the driven gear 530 could alternatively be moved in a linear motion. In still other embodiments, the tension in a chain or other wrapping member may be adjusted by using a tensioner gear that operates on one or both of an input assembly. For instance, one or more tensioner gears may be placed along the inside and/or outside of the wrapping member. One or more of the tensioner gears may then be moved to adjust the position of the wrapping member, thereby also adjusting the tension in the wrapping member.

Reverse Differential

With continued reference to FIGS. 17A and 17B, another optional aspect of the transmission 500 is described in additional detail. More particularly, the transmission 500 may include a differential system 546. The differential system 546 collectively, and with respect to its individual components, are examples of means for combining two inputs into a single output and well as means for providing an engaged neutral.

In some embodiments, the differential system 546 may have two inputs that are combined to produce a single output. For instance, in the illustrated embodiment, the differential system 546 may have a first differential input provided by a differential input shaft 547, as well as a second differential input provided by a carrier driver 548. Within the differential system 546, these two inputs may be combined in a manner that produces a single output, such as may be output by an output shaft 514.

To provide the two described, exemplary inputs to the differential system 546, a pass-through shaft 549 may be positioned within at least a portion of the input assembly 518. In one embodiment, the pass-through shaft 549 may pass through all, or substantially all, of the input assembly 518. For instance, the pass-through shaft 549 may be positioned within the drive shaft 524, or may be integral with the drive shaft 524. Further, the rotational speed of the pass-through shaft 549 may be directly related to the transmission input 512 input, or may otherwise be related to a partial gear-ratio that may not be influenced by, for example, the output assembly 520.

The pass-through shaft 549 may, in this example, also be connected to a first input transfer gear 550. A second input transfer gear 551 that is optionally aligned with the differential input shaft 547 may engage the first input transfer gear 550. In such a manner, the rotational speed of the pass-through shaft 549 may be passed to the differential input shaft 547, although one or more transfer or other gears may be used to produce a gear ratio between the rotational speed of the pass-through shaft 549 and the rotational speed of the differential input shaft 547.

In this exemplary embodiment, the second input to the differential system 546 is optionally received from an output of the output assembly 520. More particularly, the output assembly 520 includes, in this embodiment, a driven gear 530 that is driven by a wrapping member. The driven gear 530 may be connected to, engage, or otherwise be related to one or more other gears of an output gear chain 552. The output gear chain 552 may be configured to receive a rotational or other input from the driven gear 530 and translate the input to a carrier driver 548. The carrier driver 548 is, in this embodiment, a gear configured to mate with an external gear profile on a housing of the differential system 546. By virtue of such relationship, the output of the driven gear 530 may be transmitted to the carrier driver 548, which in turn may cause the housing of the differential system 546 to rotate. Internal components of the differential system 546 may be fixed to the housing, such that the internal components may rotate relative to a central axis of the housing in the differential system 546.

Figure 18:
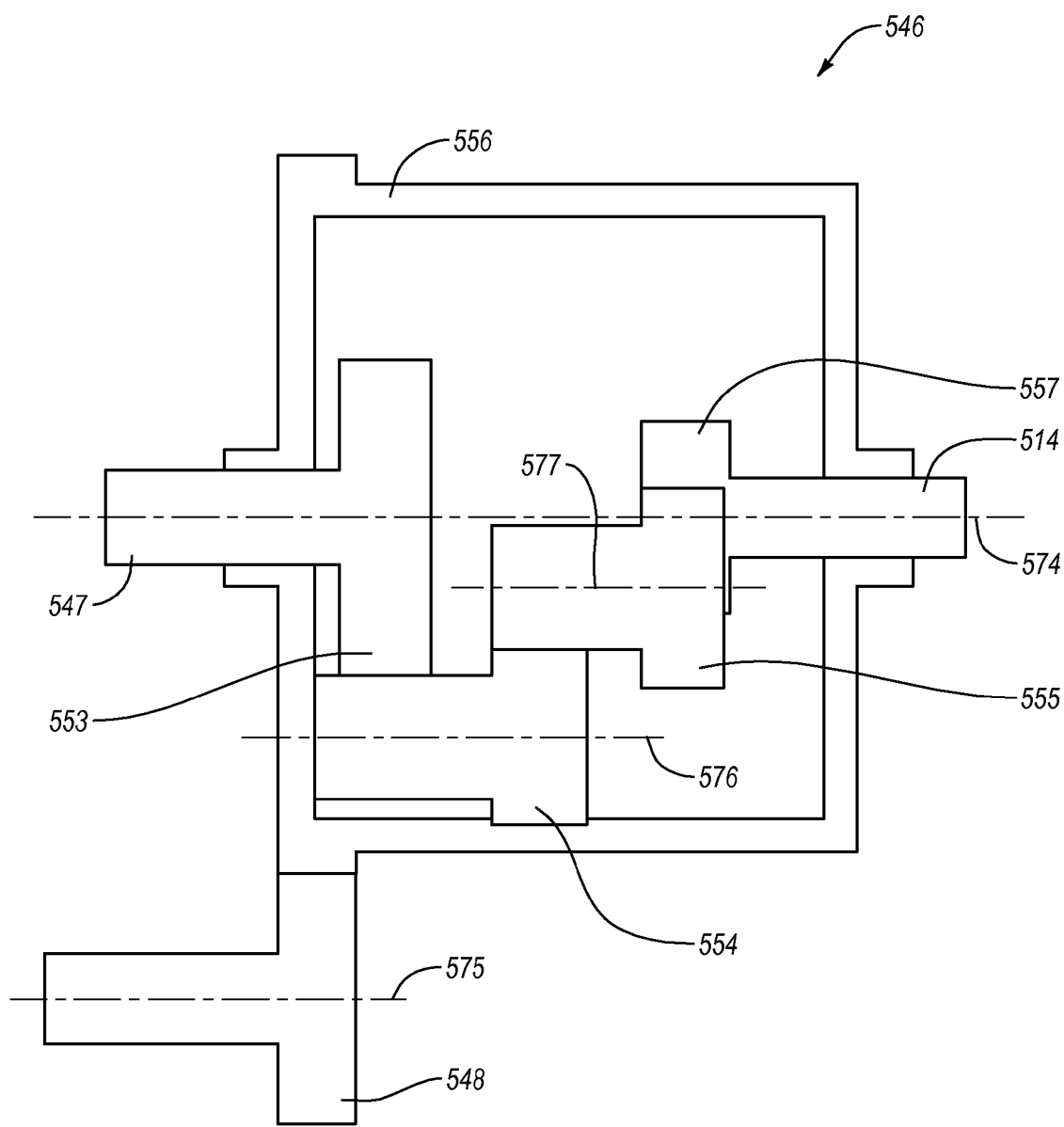
FIG. 18 schematically illustrates an exemplary differential system usable in accordance with various transmissions.

FIG. 18 schematically illustrates an example manner in which the differential system 546 can operate. As shown in such figures, a carrier 556 may be configured to rotate around a sun axis 574, and the carrier driver 548 may rotate around a carrier driver axis 575. A first input may be received through a differential input shaft 547 that is connected to an input sun gear 553 that is, in this embodiment, positioned within the carrier 556. The second input may be received from the carrier driver 548 which rotates around the carrier driver axis 575 and engages gear profile on the carrier 556.

As each of the two inputs is received, a compound gear ratio may be defined. For instance, interior to the carrier 556, the input sun gear 553 may engage a first planet gear 554. The first planet gear 554 may in turn engage one or more other gears. For instance, in this schematic illustration, the first planet gear 554 engages a second planet gear 555, and the second planet gear 555 in turn engages an output sun gear 557. The output sun gear 557 is, in this embodiment, connected to an output shaft 514 that rotates around the sun axis 574. In other embodiments, the first planet gear 554 may directly engage the output sun gear 557, more than two planet gears may be used, the output shaft 514 may not be aligned with the sun axis 574, or other configurations may be used.

According to one aspect, the two planet gears 554, 555 may be fixed to the carrier 556 and can be configured to have both orbital and rotational motions. The planet gears 554, 555 may, for instance, each rotate about respective internal, central axes (e.g., the first and second plane axes 576, 577). The planet gears 554, 555 may also be coupled to the carrier 556 in a manner that allows or causes the planet gears 554, 555 to orbit around the sun axis 574. Optionally, the planet gears 554, 555 are connected to the carrier 556 using a bearing or other similar device so as to facilitate rotation of the plane gears 554, 555 about their own axes within the carrier 556. Accordingly, the planet gears 554, 555 may not only rotate about internal axes, but may also orbit around the input and output sun gears 553, 557 that may be aligned with the sun axis 574.

Accordingly, as will be appreciated in view of the disclosure herein, the input sun gear 553 may rotate and at least partially cause the planet gears 554, 555 to rotate and transmit a rotation to the output sun gear 557. In a circumstance where the carrier 556 is fixed such that the carrier 556 and the planet gears 554, 555 do not orbit around the sun axis 574, a simple gear ratio may be identified. However, where the carrier 556 is not fixed and can rotate, the rotational speed of the carrier 556 may be added to, or subtracted from, the overall gear train value, thereby producing compound addition to determine the resulting output at the output shaft 514. The overall gear ratio may thus determined by the relative speed of the rotation of the carrier 556 to the rotation of the input sun gear 553, and is dependent on the sizes and profiles of the gears within the carrier 556. In effect, such a configuration provides a two-stage planetary gear system that does not require the use of ring gears.

As one skilled in the art will appreciate in view of the disclosure herein, by using different sizes of gears and/or numbers of teeth, the overall speed ratio and overall transmission ratio may be changed. For example, the illustrated differential system 546 may be set-up to have a train value of 1, 1/2, 3/2, 2, or any other suitable value. In effect, by changing the number of teeth and/or other gear parameters, the dynamic range of the transmission 500 and/or the differential 546 may also be changed. By allowing different sizes of gears within the differential system 546, there may not only be compound addition, but a multiplication factor allowing for a significant variation in gear ratios. Accordingly, for any application, the differential system 546 may itself be designed with particular gear ratios that allow an overall transmission, and/or the differential system itself, to operate at a reduced size and/or with reduced parts. As also discussed elsewhere herein, a differential system 546 similar to that described herein may act as a reverse differential that accepts two energy streams (e.g., first and second inputs) using a differential-style planetary that may also drive the output speed to zero, and thus provide a neutral speed while continuing to maintain a connection between a power source and a load.

Figure 19A:
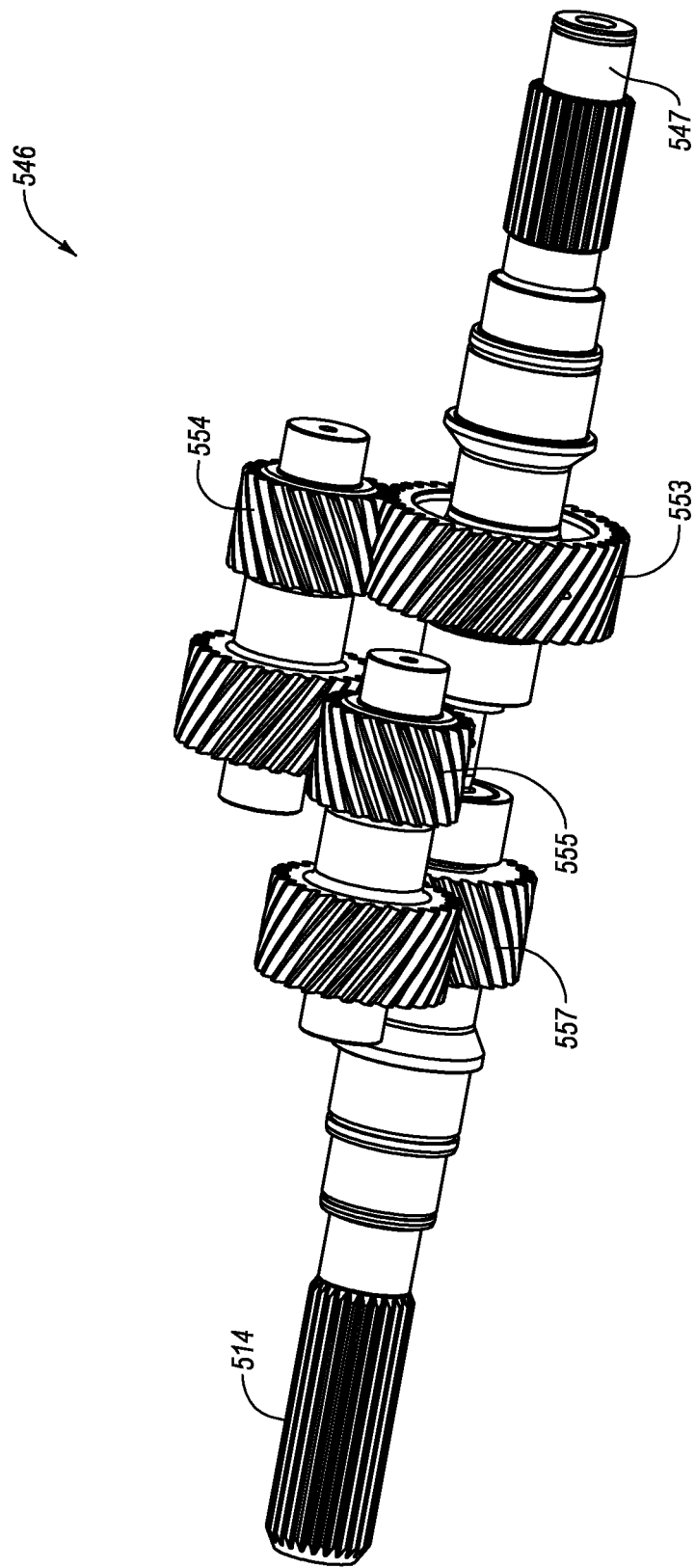
FIG. 19A illustrates a partial perspective view of a differential system of the transmission of FIG. 17A.
Figure 19B:
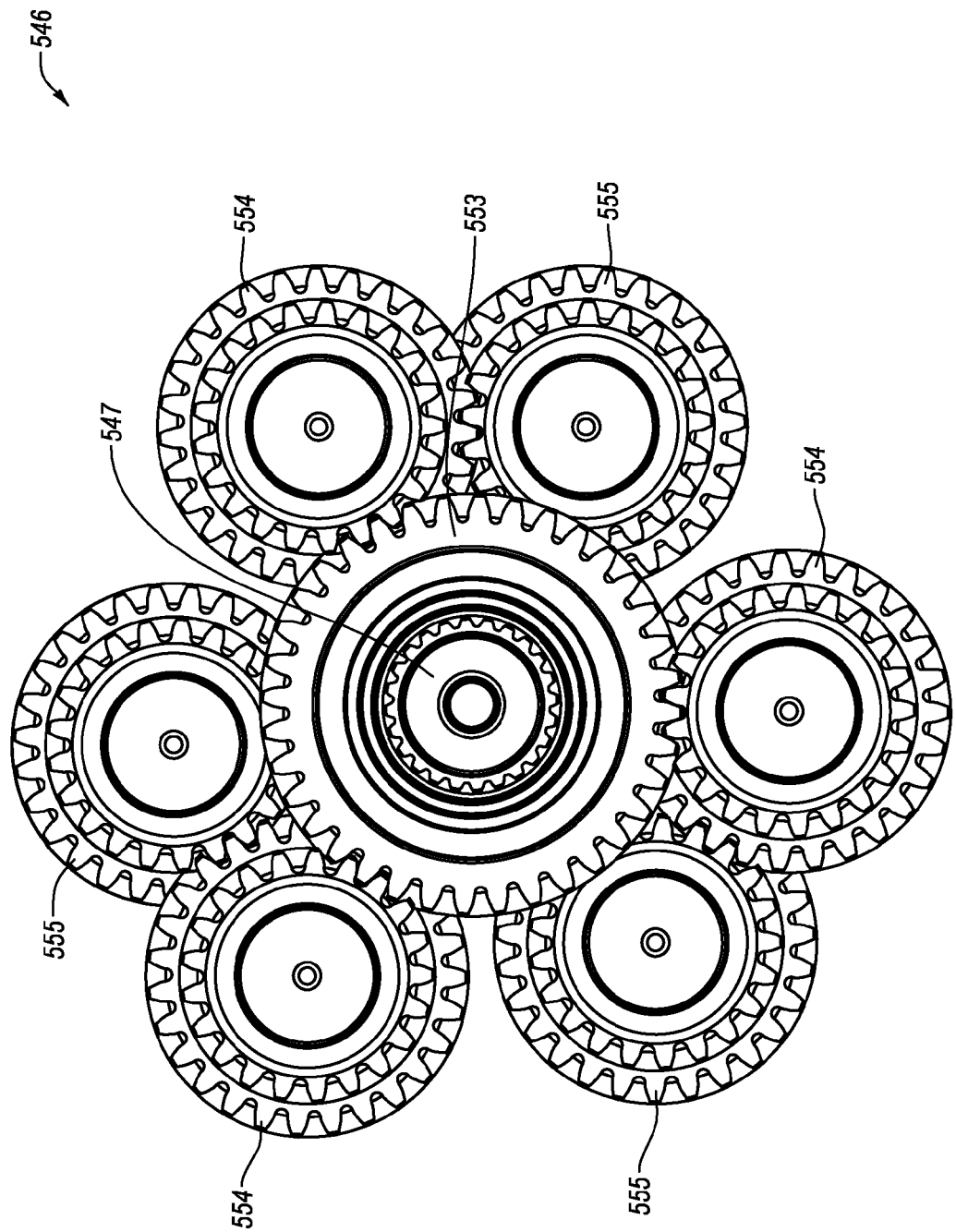

A more particular discussion of the schematic differential system of FIG. 18 is provided in FIGS. 19A and 19B. In FIG. 19A, for example, a partial view of the differential system 546 of FIGS. 17A and 17B is shown. In 19A, the carrier 556 for the differential system 546 has been removed. Additional components such as bearings, journals, rollers, duplicate planet gears 554, 555, and the like have also been removed to enable a clear view of particular aspects of the differential system 546.

In FIG. 19A, a differential input shaft 547 may receive an input. For instance, the input shaft 547 may be directly or indirectly connected to a pass-through or other shaft from an input system, or to an output shaft of an output system. The input shaft 547 may be connected to an input sun gear 553. The input sun gear 553 may, for example, be fixed in relation to the input shaft 547 such that they have the same rotational speed. In other embodiments, however, the input sun gear 553 may rotate at a speed different than that of the input shaft 547.

The input sun gear 553 is illustrated as engaging a first planet gear 554, although as shown in FIG. 19B, the input sun gear 553 can engage a set of first planet gears rather than a single planet gear 554. In this example, the input sun gear 553 and the first planet gear 554 each include helical gear teeth that mate together. As a result, when the input sun gear 553 rotates, the input sun gear 553 engages the first planet gears 554 and may cause the first planet gears 554 to rotate about their own axes. If the rotation of the input sun gear 553 defines a linear velocity at a point of engagement that is about equal to the linear velocity from the orbital motion of the first planet gear 554 as described herein, the first planet gear 554 may orbit around the input sun gear 553 without rotating on its own longitudinal axis.

The first planet gears 554 may actually include two profiles along a shaft. A first of the gear profiles may mate with the input sun gear 553, while the second profile may mate with a second planet gear 555. The two gear profiles may be the same or different, as desired. In some embodiments, the first planet gears 554 have two gear profiles that each have opposing helix angles (e.g., one right hand and one left hand). Such arrangement may act to reduce thrust loads on bearings operating in concert with the first planet gears 554. Further, the use of opposing helix angles may be eliminated in other cases, or may be used regardless of whether the two gear profiles have differing numbers or characteristics of gear teeth.

The second planet gears 555 are optionally similar to the first planet gears 554. Accordingly, the second planet gears 555 may include one or more gear profiles. For instance, if two gear profiles are included, the two gear profiles may have the same or a different number of teeth, be the same or different sizes, and may have the same or different helix angles. The second gear profile of the second planet gears 555 in FIG. 19A may in turn engage the output sun gear 557 which itself may be used to drive an output shaft 514.

While only a single first planet gears 554 and a single second planet gear 555 are illustrated in FIG. 19A, this is merely illustrative. For example, a partial frontal view of the differential system is illustrated in FIG. 19B, and illustrates that multiple sets of planet gears may be used. For example, in FIG. 19B, three first planet gears 554 are angularly spaced around the longitudinal axis of the differential input shaft 547. Each first planet gear 554 may also correspond to a separate one of three second planet gears 555. Each of second planet gears 555 may then engage and drive the same output sun gear 557 (FIG. 19A).

While not illustrated in FIGS. 19A and 19B, it will be appreciated that the differential system 546 optionally includes a housing that can receive a second input. In some cases, the housing may operate as a carrier in which all or portions of the components illustrated in FIGS. 19A and 19B are contained. For example, the first and second planet gears 554, 555 may be fixed within the housing such that as the housing rotates, the first and second planet gears 554, 555 also orbit around the input sun gear 553 and/or the output sun gear 557 as described herein. The housing may be used in producing a compound gear ratio in which the rotation of the first and second planet gears 554, 555, for example, are dependent upon the rotation of the input sun gear 553, as well as an input received in the form of a rotation to the housing.

5. Transmission with Brake Mechanism

Figure 20:
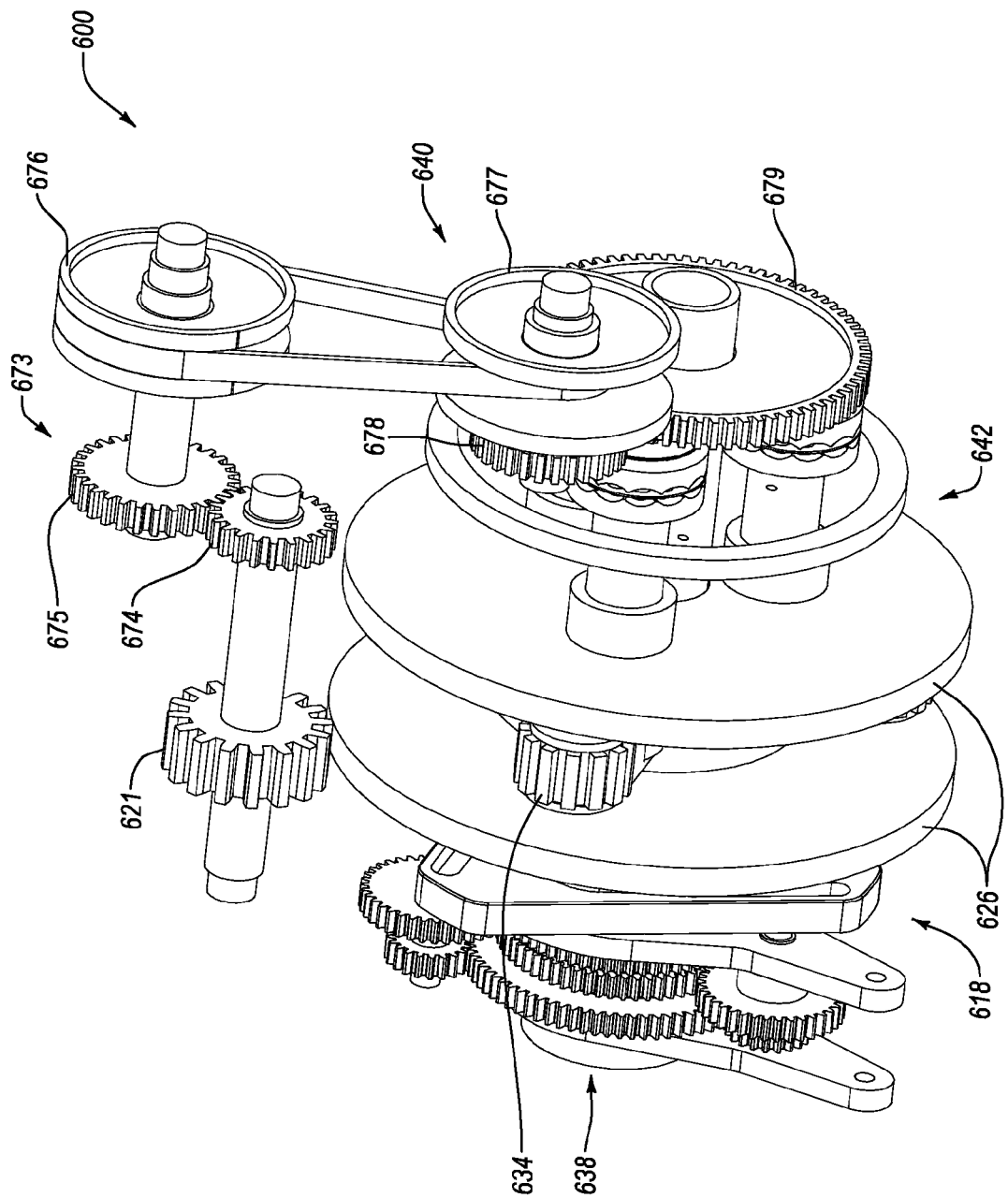
FIG. 20 illustrates a perspective view of a transmission according to another embodiment of the present disclosure.

Turning now to FIG. 20, an exemplary transmission 600 according to still another embodiment is disclosed. It will be appreciated that the illustrated transmission 600 may operate in a manner generally consistent with various embodiments disclosed herein. For instance, the transmission 600 may include or act as an input system 618 that includes a sheave 626 and a set of moon drive gears 634. The sheave 626 and the moon drive gears 634 may engage a wrapping member such as a chain (not shown) that is also connected to an output system. While the illustrated embodiment is described in the context of an input system, it should be appreciated that the disclosure with respect to this embodiment is equally applicable to an output system. In particular, rather than drive a wrapping member, the moon gears 634 and sheave 626 can be driven by a wrapping member.

As with some of the exemplary embodiments herein, the exemplary transmission 600 may provide gear ratios that change in very small, and possibly infinitely small increments. For instance, the sheave 626 may move axially while the moon drive gears 634 move radially. Accordingly, a wrapping member can also move radially with respect to the sheave 626 to vary a gear ratio in the transmission.

According to one embodiment, the transmission 600 may include various components, systems, and assemblies. For instance, as described in greater detail hereafter, the transmission may include a synchronization system 638, a locking system 642, and a correction system 640. The synchronization system 638 may be used to adjust the radial position of the moon drive gears 634. The locking system 642 optionally locks one or more moon drive gears 634 to prevent rotation of the moon drive gears 634 along at least a portion of the orbit of the drive gears 634 around an axis of the sheave 626, and the correction system 640 can be used to selectively rotate the moon drive gears 634 to align gear teeth for a tooth engagement with the wrapping member, and can further effect such correction even at non-integer gear ratios in which the effective circle of the sheave produces a partial tooth relative to a pitch of the wrapping member and/or the drive gears 634.

Synchronization System

With reference to the synchronization system 638, it will be noted that the described and illustrated components of the synchronization system 638 are individually and collectively examples of means for synchronizing movement of a sheave 626 with movement of moon drive gears 634, as well as means for radially moving the moon drive gears 634 and/or a wrapping member. However, the synchronization system 638 is merely exemplary, and can be replaced with any other suitable synchronization system, including those describe herein. Similarly, the synchronization system 638 of FIG. 20 can be implemented in other transmissions and can replace other synchronization systems described herein, or which may be learned by a review of the disclosure herein.

Figure 21A:
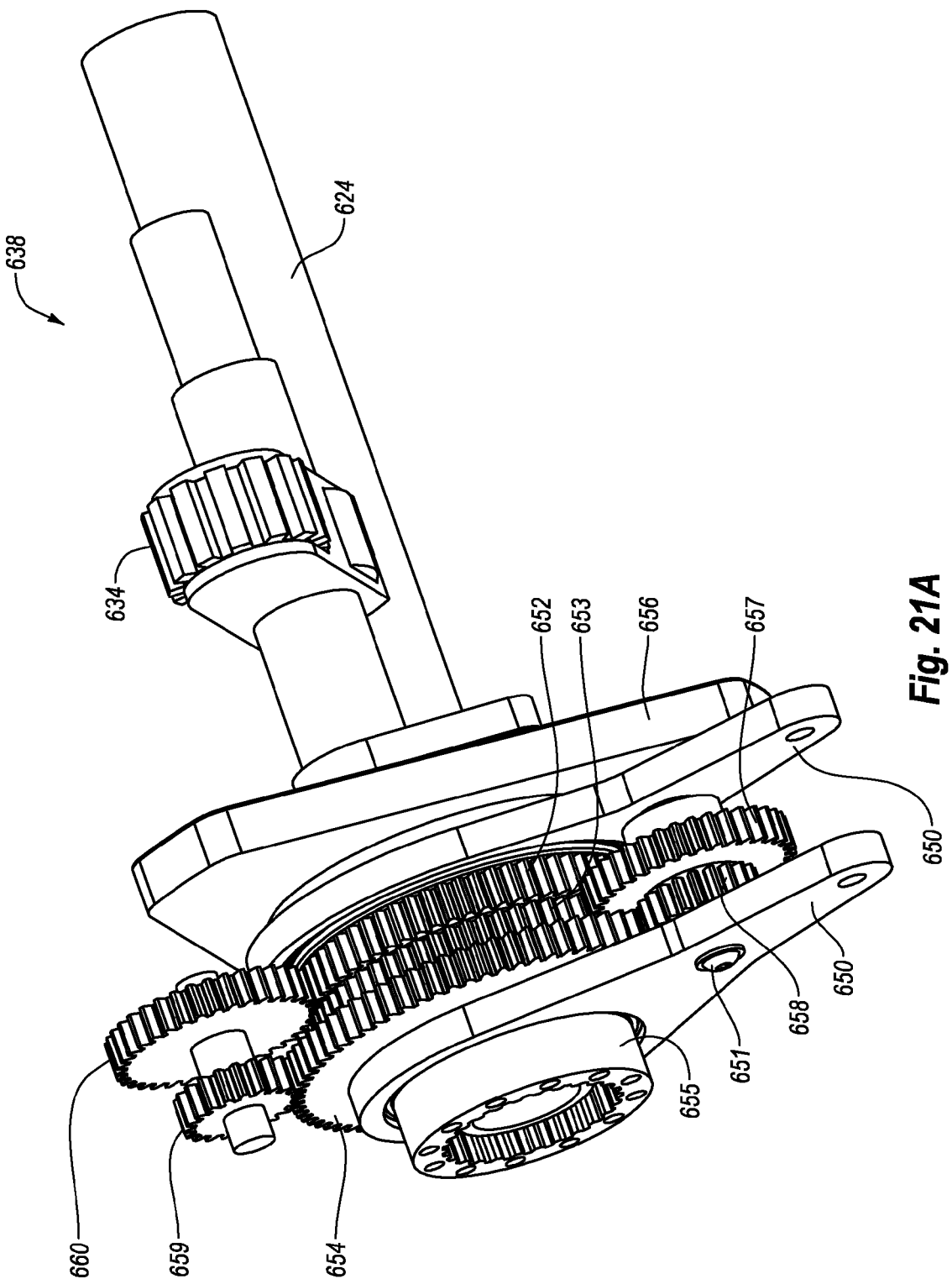
FIG. 21A illustrates a rear perspective view of a synchronization system of the transmission of FIG. 20.

FIG. 21A illustrates a side perspective view of the synchronization system 638 of FIG. 20. To simplify the discussion herein, only a single moon drive gear 634 is illustrated in FIG. 21A, although it will be appreciated that the discussion herein applies equally to each of multiple moon drive gears 634 that operate within the synchronization system 638.

The synchronization system 638 in FIG. 21A is configured to adjust the radial position of the moon drive gears 634 in a controlled, predictable, and selectable manner. Moreover, according to one embodiment, the synchronization system 638 may rotate at least partially independent of the input system 618 (FIG. 20) of the transmission. For instance, the synchronization system 638 may be non-co-axial with the sheaves of the transmission, or may be co-axial, but may be on a bearing or other surface such that at least a portion of the synchronization system 638 does not rotate with the sheaves and/or drive shaft.

In the illustrated embodiment, the synchronization system includes two shifting arms 650. The shifting arms 650 are, in this embodiment, axially offset along a longitudinal axis of the synchronization system 238, and are coupled to each other. For instance, in FIG. 21A, the shifting arms 650 are connected using a mechanical fastener 651, such that the shifting arms 650 collectively move. For instance, a bolt, rivet, cotter pin, or other mechanical fastener may be used. In still other embodiments, a weld, adhesive, solder, or other mechanism may be used to join the shifting arms 650, or a single shifting arm 650 may be used.

As shown in FIG. 21A, the shifting arms 650 are seated upon the drive shaft 624 or are co-axial relative to the drive shaft 624. More particularly, in the illustrated embodiment, the shifting arms 650 are seated upon a collar 655, although such an embodiment is merely exemplary. Additionally, as noted herein, it is not necessary that the shifting arms 650 rotate with the drive shaft 624. For instance, in one embodiment, the shifting arms 650 may ride on bearings that allow an internal shaft to rotate without causing a corresponding rotation in the shifting arms 650. In other embodiments, the shifting arms 650 may co-rotate with the drive shaft 624 and/or the collar 655.

As further illustrated in FIG. 21A, three intermediate gears 652-654 are positioned between the shifting arms 650, and generally co-axial with the drive shaft 624 and the collar 655. Each of the intermediate gears 652-654 of the illustrated embodiment may be separately formed relative to each other. For instance, the first intermediate gear 652 is, in accordance with one embodiment, integrally formed with a cam plate 656. The cam plate 656 and the first intermediate gear 652 may be seated on the collar 655. In one embodiment, the collar 655 is coupled to the drive shaft 624. For instance, a spline connection, gear or belt drive, or other connection, or a combination thereof, may be used to cause the collar 655 to rotate as the drive shaft 624 rotates. As the cam plate 656 is seated on the collar 655, the cam plate 656 may also rotate; however, in other embodiments, the cam plate 656 is seated on a bearing so that the collar 655 can rotate without directly causing the cam plate 656 to rotate.

The second intermediate gear 653 is, in this embodiment, positioned adjacent the first intermediate gear 652. The second intermediate gear 653 may be formed in any suitable manner. According to one example embodiment, the second intermediate gear 653 is integrally connected to the collar 655, or is otherwise secured thereto. Accordingly, in at least one embodiment, the second intermediate gear 653 rotates as the drive shaft 624 rotates. The third intermediate gear 654 is positioned adjacent the second intermediate gear 653 and opposing the first intermediate gear 652. The third intermediate gear 654 may be formed separately from the first and second intermediate gears 652, 653. For instance, in one embodiment, the third intermediate gear 654 is a single gear that is seated on the collar 655. The third intermediate gear 654 may also be coupled to the collar 655 to co-rotate therewith, or may be on a bearing or other similar surface that allows the collar 655 and the second intermediate gear 653 to rotate without causing the third intermediate gear to rotate.

In FIG. 21A, the mechanical fastener 651 may have a longitudinal axis about which two cam drive gears 657, 658 are seated. The cam drive gears 657 may be separate, integrally formed, or permanently connected. In the illustrated embodiment, for instance, the cam drive gears 657, 658 may be integrally connected. The cam drive gears 657, 658 also engage the second and third intermediate gears 653, 654.

As noted previously, the second intermediate gear 653 may rotate with the drive shaft 624. Accordingly, as the second intermediate gear 653 engages the cam drive gear 657, the cam drive gear 657 may rotate. In the illustrated embodiment, in which the cam drive gears 657, 658 are integrally formed, the second cam drive gear 658 may in turn engage and cause the third intermediate gear 654 to rotate. Optionally, the cam drive gears 657, 658 are on a bearing to facilitate rotation thereof.

A second set of cam drive gears 659, 660 are also connected to the intermediate gears 652, 654. As shown in FIG. 21A, a first cam drive gear 659 may engage the third intermediate gear 654 and be rotated thereby. A second cam drive gear 660, which is illustrated as being co-axial with the first cam drive gear 659, can engage the first intermediate gear 652. Thus, as the third intermediate gear 654 rotates, the cam drive gears 659, 660 optionally cause the first intermediate gear 652 and the cam plate 656 to rotate.

In accordance with at least one embodiment, the cam plate 656 rotates at a speed that corresponds generally to the speed of the drive shaft 624. As a result, the moon drive gears 634 and the cam plate 656 may be rotating around the drive shaft 624 at the same speed. In contrast, the shifting arms 650 may not rotate with the drive shaft 624, but may have an independent rotation mechanism. For instance, the shifting arms 650 may be manually rotated, or coupled to an actuator that causes them to rotate at least partially around the collar 655. As the shifting arms 650 rotate, the shifting arms 650 cause the first set of cam drive gears 657, 658 to also orbit around the intermediate gears 653, 654. Such movement can introduce an additional rotational component that adds to, or subtracts from, the rotation of the drive shaft 624. The added rotation from the shifting arms 650 may also cause the cam drive gears 657, 658 to rotate, thereby changing the rotations of the intermediate gears 653, 654 and the second set of cam drive gears 659, 660. Ultimately, the rotation or change in rotation speed is transferred from the cam drive gear 660 to the cam plate 656, which also rotates. More particularly, while the shifting arms 650 are moving, the introduction of additional rotation from the shifting arms 650 can cause the cam plate 656 to rotate at a speed that is different relative to a rotational speed of the drive shaft 624.

Figure 21B:
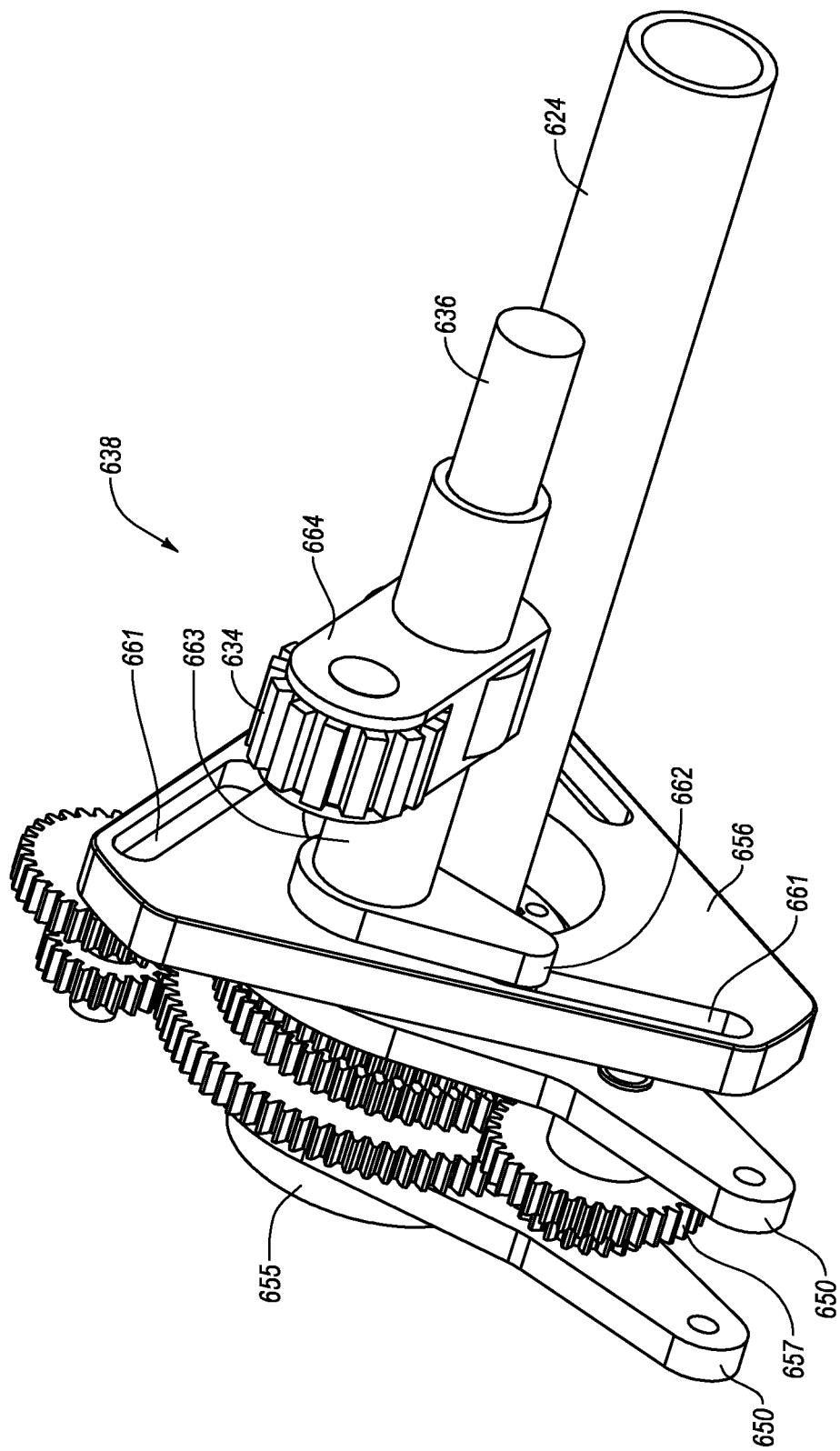
FIG. 21B illustrates a frontal perspective view of the synchronization system of the transmission of FIG. 20.

A reverse perspective view of the cam plate 656 is illustrated in FIG. 21B. As shown in the illustrated embodiment, the cam plate 656 may include a set of cam tracks 661 formed therein. In the illustrated embodiment, the cam tracks 661 are linear, but the cam tracks 661 may take other shapes or forms. As the cam plate 656 rotates (or rotates at a different speed relative to the drive shaft 624), a cam follower 662 within the cam tracks 661 can change position. In particular, the cam follower 662 may be coupled to the moon drive gear 634 and orbit around the drive shaft 624 at the same rotational speed as the drive shaft 624. Thus, as a difference in relative rotational speed between the cam follower 662 and the cam plate 656 occurs, the cam follower 662 can move within the cam track 661. The cam follower 662 may further be coupled to a shaft 663. The shaft 663 can, in turn, be coupled to an arm 664 in which the moon drive gear 634 is positioned.

As noted previously, when the cam plate 656 rotates at a different rotational speed relative to the drive shaft 624 and/or the moon drive gears 634, the cam follower 662 can shift its position within the track 661. The cam plate 656 has, in at least some embodiments, a generally triangular shape, with the cam tracks 661 aligned along respective sides of the triangle. When the cam plate 656 rotates, the cam follower 662 moves in the track 661, and due to the change in position the cam follower 662 rotates relative to a central axis of the shaft 663. Consequently, the shaft 663 and arm 664 rotate around a center of the shaft 663. Inasmuch as the moon drive gear 634 is coupled to the arm 664, the moon drive gear 634 also rotates relative to the axis of the shaft 663 and can follow an arcuate path which varies the radial position of the moon drive gear 634 relative to the drive shaft 624. Moreover, inasmuch as the cam follower 662 may slide within the cam track 661, the radial position of the moon drive gears 634 can be varied continuously in very small, and possibly infinitely small, increments.

Accordingly, it should be appreciated in view of the disclosure herein, that the exemplary embodiment of a synchronization system 638 is merely one example embodiment for adjusting a radial position of the moon drive gear 634, and that alternative or additional methods and systems may be employed. Furthermore, while the cam track 661 has defined ends, this is also not necessary. The defined ends may, for instance, limit the degree to which the shifting arms 650 can rotate. In other embodiments, the track 661 may be continuous. In still other embodiments, the cam plate 656 may have other configurations. For instance, the cam plate 656 may be circular, square, diamond-shaped, or have any other construction, size, or shape.

Locking System

Briefly returning to FIG. 20, an exemplary embodiment of a transmission 600 according to at least some embodiments includes a locking system 642. The components of the locking system 642, as well as the collective locking system 642, are examples of means for locking rotation of the moon drive gears 634 in at least one direction. The locking system 642 may include various components and provide a number of different functions. In at least one embodiment, the locking system 642 stops or slows rotation of the moon drive gears 634 about their central axes. Such a mechanism may be used to, for instance, reduce or eliminate slip of a wrapping member relative to a sheave 626. To simplify the discussion of the locking system 642, only a single moon drive gear 634 is illustrated, although more or fewer moon drive gears 634 may also be included.

Figure 22A:
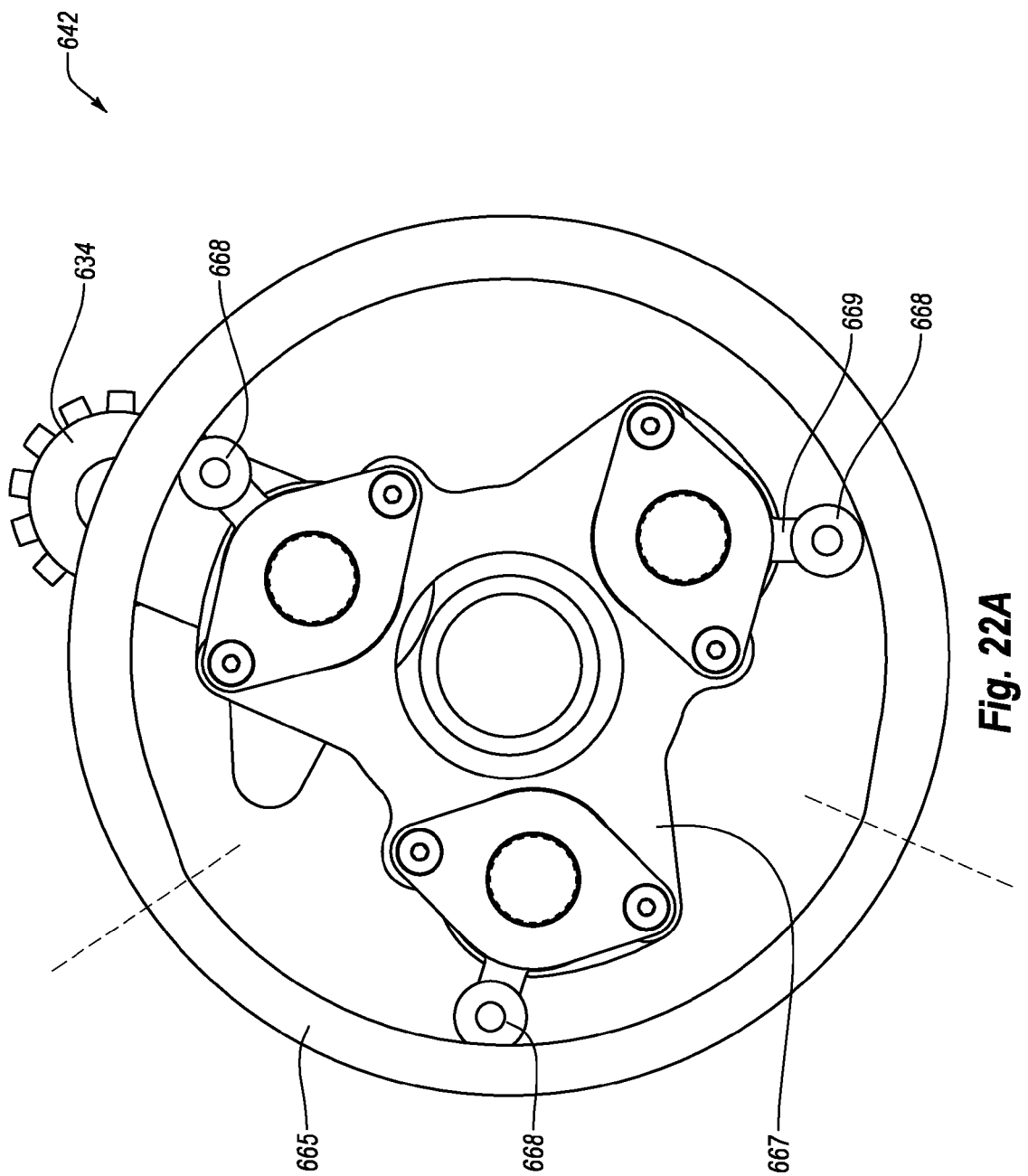
FIG. 22A illustrates a frontal view of a locking system of the transmission of FIG. 20.
Figure 22B:
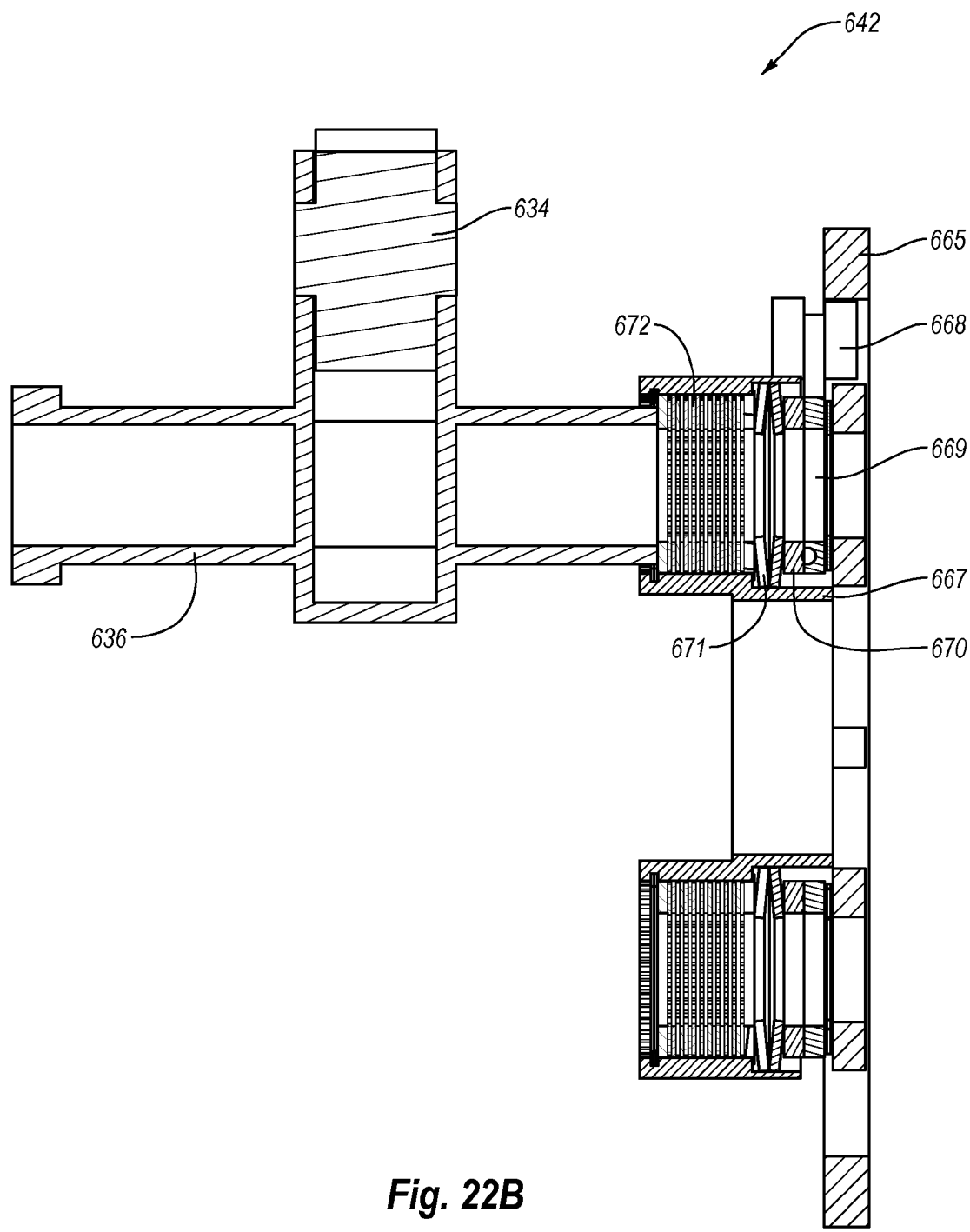
FIG. 22B illustrates a side cross-sectional view of the locking system of the transmission of FIG. 20.

With reference now to FIGS. 22A and 22B, the locking system 642 of FIG. 20 is illustrated in greater detail. In the illustrated embodiment, the locking system 642 includes a cam ring 665, a rotating carrier 667, and a set of rollers 668. For instance, in one embodiment, the cam ring 665 may be fixed to the housing, or otherwise configured to have a static position relative to the drive shaft 624 (FIG. 20). As the drive shaft 624 rotates, the moon drive gears 634 may also orbit around the drive shaft 624. As best illustrated in FIG. 22B, the moon drive gears 634 may be coupled to a drive moon shaft 636.

The drive moon shafts 636 may each be coupled to the carrier 667. Within the illustrated carrier 667 are a set of pivoting arms 669, each of which couple to a respective roller 668. The rollers 668 and arms 669 each rotate with the carrier 667, and the rollers 668 engage an inner profile of the cam ring 665. As particularly visible in FIG. 22A, the cam ring 665 may have a variable profile. For instance, in the illustrated embodiment, the cam ring 665 has a first thickness over about two-hundred forty degrees and a second thickness over about one-hundred twenty degrees. As the rollers 668 pass along the cam ring 665, the arms 669 can pivot to maintain engagement with the variable cam profile.

Pivoting of the arms 669 may, in some embodiments, cause the moon drive gears 634 to be locked toward internal rotation. For instance, FIG. 22B illustrates a cross-sectional view of portions of the locking system 642 and illustrates the arm 669 which extends around the drive moon shaft 636. The arm 669 may cooperate with an adjacent plate 670 to cause rotational motion of the arm 669 to be translated into an axial motion. For instance a ball bearing in the arm 669 may be positioned within a ramped pocket in the plate 670. As the arm 669 rotates, the ball may exit the pocket, or may move along the ramp, and exert a force moving the plate 670 in an axial direction away from the arm 669. The plate 670 may also be positioned adjacent a spring 671. Movement of the plate 670 in an axial direction away from the arm 669 and towards the spring 671 may compress the spring 671, which in turn may press on a set of clutch disks 672. As the clutch disks 672 are compressed, they may grip the moon drive shaft 636, thereby preventing or impeding rotation thereof. Accordingly, the clutch disks 672 can effectively apply a break or lock that stops or limits the rotational motion of the moon drive gears 634 by locking rotation of a moon drive shaft 636 which rotates as the moon drive gears 634 rotate.

It should be appreciated in view of the disclosure herein that the illustrated locking system 642 is merely one example of a locking mechanism that may be used. For instance, while the illustrated spring 671 may in some embodiments be a Bellville spring, any other suitable biasing mechanism may be used. Furthermore, the locking mechanism 642 could operate in reverse to the manner described. By way of illustration, a ball may be located on the plate 670 and a ramped pocket in the arm 669. In another embodiment, compressing the clutch disks 672 may cause a lock to be released rather than engaged. In still other embodiments, other types of mechanisms may be used. For instance the plate 670 and/or the arm 669 may have angled adjoining surfaces, or have one or more wedges along the surfaces. As the arm 669 rotates relative to the plate 670, the wedges or angled surfaces can cause the distance between the centers of the plate 670 and the arm 669 to increase. One skilled in the art will appreciate that any number of different mechanisms may be used to convert the rotational motion of the arm 669 to an axial displacement, or convert the rotation of the roller 668 along a cam path to an axial movement or other movement that applies a lock or brake, may be used.

Furthermore, while the illustrated locking system 642 is described and illustrated with regard to a cam ring 665 having a one-hundred twenty degree interval over which the moon drive gear 634 remains in a locked position, such embodiment is merely exemplary. In particular, the duration during which a lock is applied can vary. According to one embodiment, there may be three moon drive gears 634. By applying a lock over one-hundred twenty degree intervals, one of the three evenly spaced moon gears 634 can be in a locked position at any given time. Nevertheless, more or fewer moon drive gears 634 may be used, and/or more than one gear may be locked at any particular instant.

Correction System

The transmission 600 of FIG. 20 may further include, in at least some embodiments, a correction system 640. Elements of the correction system 640, and the correction system 640, are examples of means for selectively correcting a tooth position of a moon drive gear 634. The correction system 640, both collectively and with regard to the illustrated and described components thereof, are further example means for selectively rotating a moon drive gear 634.

According to one aspect, the correction system 640 may be used to selectively rotate a moon drive gear 634 such that teeth of the moon drive gear 634 are positioned at a location corresponding to a receiving portion of a chain. In at least some embodiments, the correction system 640 corrects driving moon gears 634 when the driving moon gears 634 orbit along an orbital path that is a non-integer path. The effective size of such a non-integer path, if divided by the pitch of the gear teeth on the driving moon gears and/or pitch of the chain, corresponds to a size having a partial tooth. The correction system 640 may thus be used to correct gear teeth positions at partial tooth positions of the wrapping member.

Figure 23:
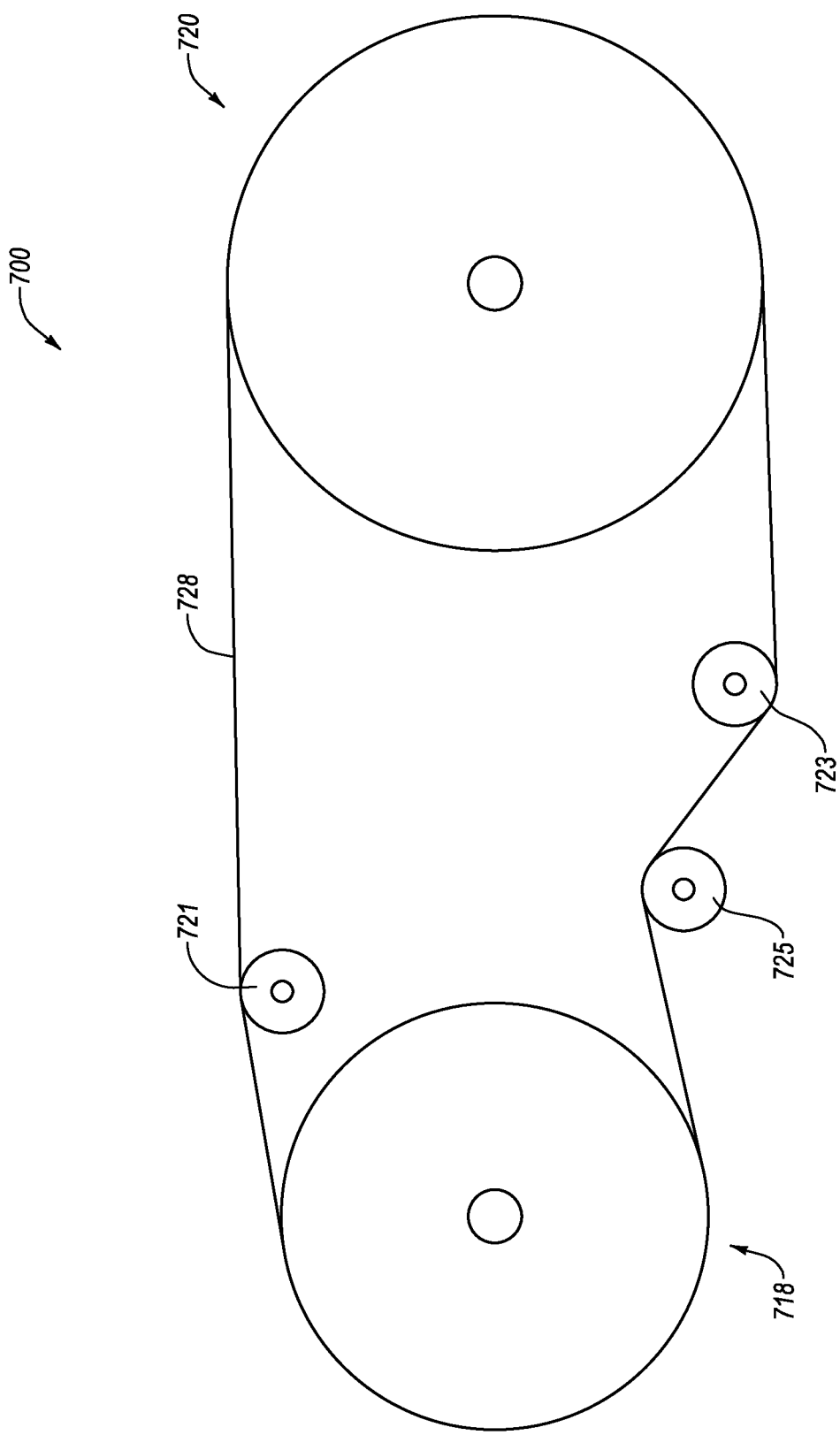
FIG. 23 schematically illustrates a transmission according to an embodiment of the present disclosure.

With reference to FIG. 23, a schematic illustration of an exemplary transmission system 700 is illustrated. In the illustrated embodiment, the transmission system 700 includes an input system 718 and an output system 720. By way of illustration, the input system 718 and/or the output system 720 may include a sheave, sprocket, gear, wheel, or other mechanism that may be used to transfer power to, or receive power transferred from, a wrapping member 728. For instance, the wrapping member 728 may be a belt or chain.

In FIG. 23, in addition to such components of the drive and driven system, a set of one or more additional structures may also engage a chain, belt, or other wrapping member that extends between the drive and driven systems 718, 720. For instance, in this embodiment, three structures 721, 723, 725 may be used. According to one embodiment, two of the structures (e.g., structures 721, 723) may have a fixed position. A third structure (e.g., structure 725) may be moveable. In such an embodiment, the third structure 725 may act in some embodiments as a tensioner that can be used to adjust the tension in the wrapping member 728. For instance, the third structure 725 may be moved to adjust the position of the wrapping member 728 and take up, or release, portions of the wrapping member 728 to maintain a desired tension in the wrapping member 728. In one embodiment, tension may be adjusted to remain constant while changes in gear ratios occur, or the tension may vary as desired. Further, while only a single tensioner 725 is illustrated, multiple tensioners may be used, or may even be eliminated according to some embodiments as discussed herein.

The other two structures 721, 723 may be used in any suitable manner. According to one embodiment one or both of the structures 721, 723 operate as reference components. For instance, as discussed herein, one aspect of an infinitely variable transmission is that such a transmission may operate at non-integer ratios. In a transmission using gears that move radially, the size of a sheave and/or the position of the gear teeth may correspond to a circle that is not wholly divisible by the pitch of the gear teeth and/or the pitch of a chain, so as to result in an integer number of teeth were the full circle covered in teeth or chain links. As a result, some correction in gear teeth may be performed. As discussed, such correction may be performed by, for instance, using one or both of the structures 721, 723 that are static relative to the wrapping member 728. By way of illustration, the structure 721 can act as a set reference for a chain inasmuch as regardless of the chain's position on a set of sheaves, sprockets, or the like, the position of the structure 721 when engaged by the wrapping member is known or can be determined. In one embodiment, the structure 721 may be a gear that remains in constant contact with the wrapping member 728, such that a tooth position of the gear can be determined and used to correct gears of the input and/or output system 718, 720 to correspond with an expected position of the chain at a point of engagement.

In one embodiment, a sensor, angular encoder, or other device determines a position of the sheave, chain, sprocket, and/or other components, and adjusts the position of a sprocket to correspond to a proper pocket location in a chain. According to another embodiment, a sensor, angular encoder, or other device determines a position of the structure 721, including one or more gear teeth thereon, if any, to identify a desired position of a chain tooth at a point of engagement between the wrapping member 728 and the input system 718 or output system 720. In still another embodiment, a mechanical, electrical, or other system, or a combination of the foregoing may be used to monitor the structures 721, 723. For instance, a mechanical intelligence system may provided automated intelligence identifying the angular position of the chain and/or the structures 721, 723. In some embodiments, monitoring the structures 721, 723 may be desirable to avoid accumulating errors. For instance, components of the system, including the wrapping member 728 and the sheave may wear over time. If an angular position of a sheave is measured, the wear of the sheave may influence the sensor output, while wear of the wrapping member 728 may cause additional deviations. However, by monitoring one or both of the structures 721, 723 directly, the errors that accumulate with the sheave can be reduced or eliminated as the output is a direct correlation to the position of the wrapping member. Thus, by monitoring or otherwise knowing the position of such a fixed structure 721, 723, the location and position of a wrapping member can be determined, as well as the required position of a sprocket, gear, or other engaging member.

Returning briefly to FIG. 20, the exemplary transmission 600 generally corresponds to a portion of the schematically illustrated transmission system 700 of FIG. 23. In the transmission system 600 of FIG. 20, a single side of a transmission 600 is illustrated (e.g., an input system), although it will be appreciated that other exemplary embodiments may include the illustrated system as an output, or in both drive and driven systems.

According to the embodiment in FIG. 20, a sheave 626 cooperates with one or more moon drive gears 634 to engage a chain, belt, cable, or other wrapping member. A follower gear 621 may also be included. The follower gear 621 may correspond, for example, to the static structure 721 illustrated in FIG. 23.

In the illustrated embodiment, the position of the wrapping member on the follower gear 621, and the deviation from an expected position for a whole integer reference circle, are at least partially measured and quantified using a gear train 673 that is coupled to the follower gear 621. In effect, the gear train 673 acts as a separate transmission that relates position information from the follower gear 621 to the input system 618. The gear train 673 may take any suitable form. In the illustrated embodiment, for instance, the follower gear 621 rotates on a same shaft as a first coupling gear 674. The first coupling gear engages a second coupling gear 675 at a desired ratio. A sheave 676 may rotate on the same shaft as the second coupling gear 675, and can be connected to a second sheave 677 via a belt, chain, cable, or other wrapping member. The second sheave 677 is, in this embodiment, co-axial with a third coupling gear 678 which engages a drive ring 679. Thus, through the gear train 673, the rotation of the follower gear 621 can be transferred to the drive ring 679. Optionally, the drive ring 679 is seated such that the drive ring is centered on the drive shaft 624.

It should be appreciated in view of the disclosure herein that the gear train 673 is merely exemplary and that other types of gear trains or mechanisms may be used. For instance, as discussed herein, an angular encoder may be used to detect the position of the follower gear 621, such that the gear train 673 can be removed. In other embodiments, different numbers and sizes of gears, belts, sheaves, and the like may be used to produce the gear train 673. According to one embodiment, the gear train can provide usable information relative position of the follower gear 621 regardless of the ratio increase or reduction between the follower gear 621 and the drive ring 679.

Figure 24A:
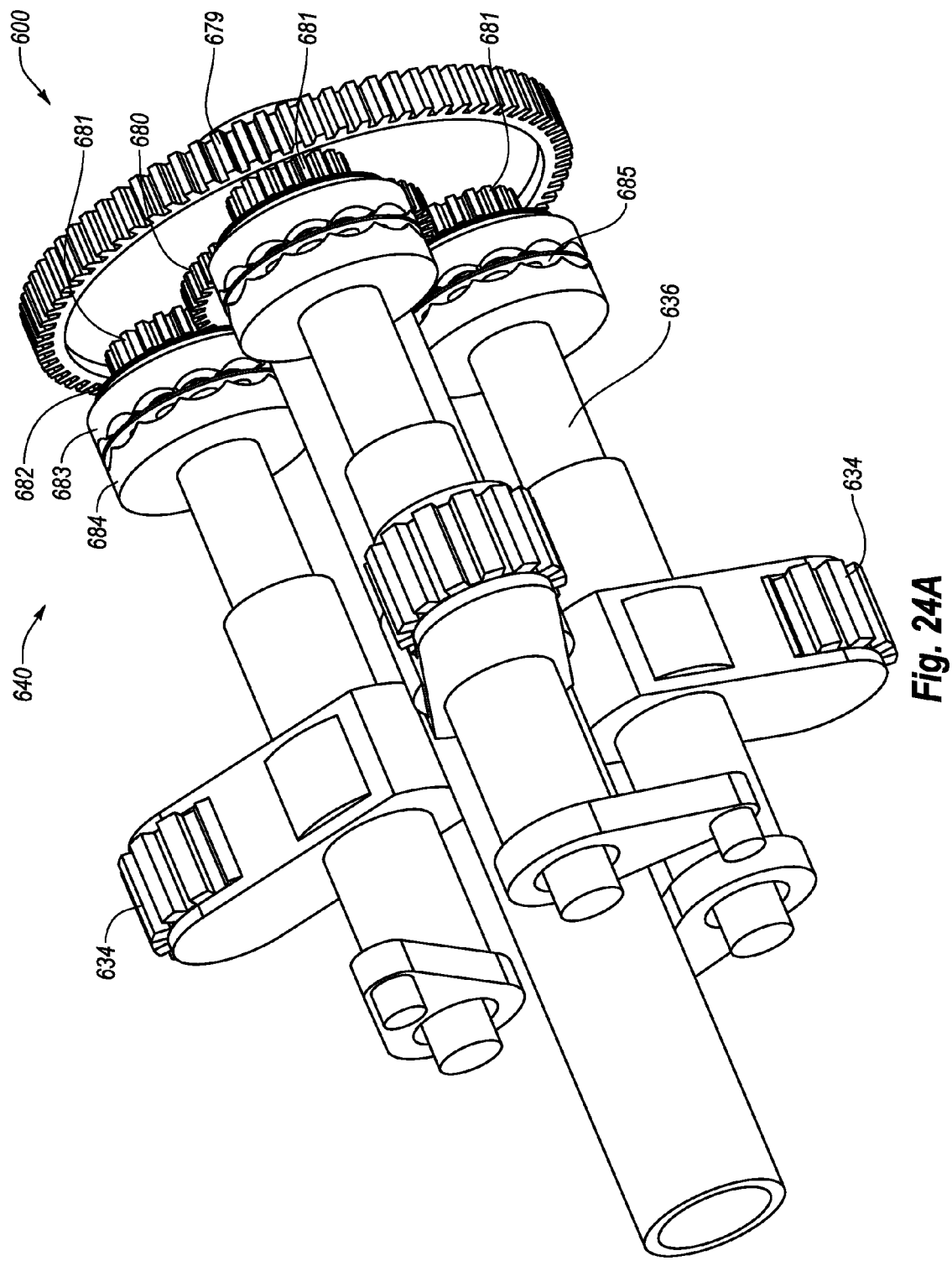
FIG. 24A illustrates a rear perspective view of a correction system of the transmission of FIG. 20.

Turning now to FIG. 24, a partial view of the transmission 600 is illustrated to specifically illustrate aspects of the correction system 640. As shown in FIG. 24, the rotation of the drive ring 679 can be tied to rotation of the moon drive gears 634. For instance, in this particular embodiment, a sun gear 680 is coupled to the drive ring 679. For instance, the sun gear 680 and the drive ring 679 may be integrally formed, coupled together, or coupled to a same shaft. As a result, the sun gear 680 and the drive ring 679 can have the same rotational speed. The sun gear 680 engages three correction gears 681 in the embodiment in FIG. 24. The sun gear 680 may, for instance, be on a shaft (not shown) on which a spring 682 and reference wheel 683 are seated.

In one embodiment, the reference wheel 683 is positioned to correspond with a mating correction wheel 684. For instance, as shown in FIG. 24, the reference wheel 683 and correction wheel 684 may include a plurality of pockets formed in the mating surfaces thereof. The pockets defined by the reference and correction wheels 683, 684 may, for instance, be generally semicircular so that a set of balls 685 may be placed therein. The balls 685 can be packed together and reside within the pockets in each of the reference and correction wheels 683, 684.

The size of the pockets in the reference and correction wheels 683, 684 may be varied as desired for a particular application. According to one exemplary embodiment, the pockets are sized to correspond to the pitch of the teeth in the moon drive gears 634 and the pitch of chain links in a corresponding wrapping member. In some cases, the reference and correction wheels 683, 684 are spring loaded. In one embodiment, for instance, as the correction gears 681 rotate, the shafts (not shown) attached to the correction gears 681 may rotate, thereby causing the reference wheels 683 to rotate, and as the reference wheels 683 rotate, the springs 682 are compressed.

The shaft of the correction gear 681 may, in some embodiments, not couple directly to the moon drive shaft 636. In such an embodiment, rotation of the reference wheel 683 may cause the pockets of the reference and correction wheels 683, 684 to become misaligned. Because the balls 685 may be configured to fit within the pockets, shifting the position of the pockets may cause the correction wheel 684 to rotate and try to correct alignment of the pockets with respect to the balls 685. Such alignment may, for instance, correspond to a correction amount for the moon drive gears 634. In at least some embodiments, if the reference wheel 683 rotates a full pitch relative to the correction wheel 684, the pockets may realign. In such a case, the reference and correction wheels 683, 684 may snap back to an aligned position and the load in the spring 682 is optionally released.

It should be appreciated in view of the disclosure herein that the illustrated embodiment, and the description related thereto, are merely exemplary of the types of correction systems that may be implemented in accordance with aspects of the present disclosure. In other embodiments, alternative or additional correction systems, assemblies, and/or components may be used. For instance, in one embodiment, the spring 683 may include a Bellville spring, although other types of springs may be used. In another embodiment, the correction wheel 684 may be spring loaded in addition to, or as an alternative to, the spring loading of the reference wheel 683. In another embodiment, the sun gear 680 may be removed. For instance, the drive ring 679 may have an interior tooth profile such that the correction gears 681 directly engage the drive ring 679. In still other embodiments, other types of correction systems described herein or as may be learned by a review of the present disclosure may be used.

6. Transmission with Wedge Locking System

Figure 25A:
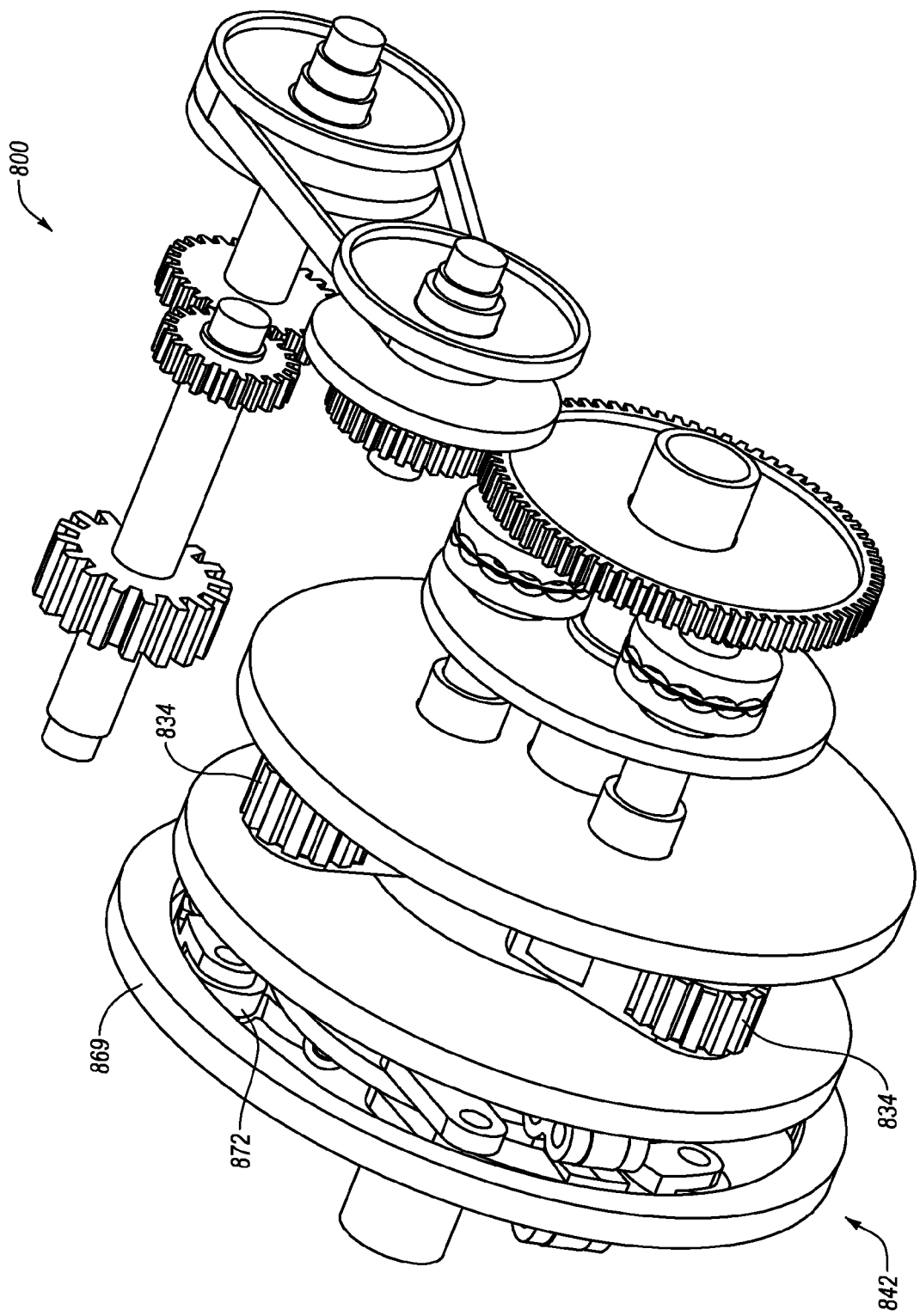
FIG. 25A illustrates a perspective view of a transmission according to another embodiment of the present disclosure.
Figure 25B:
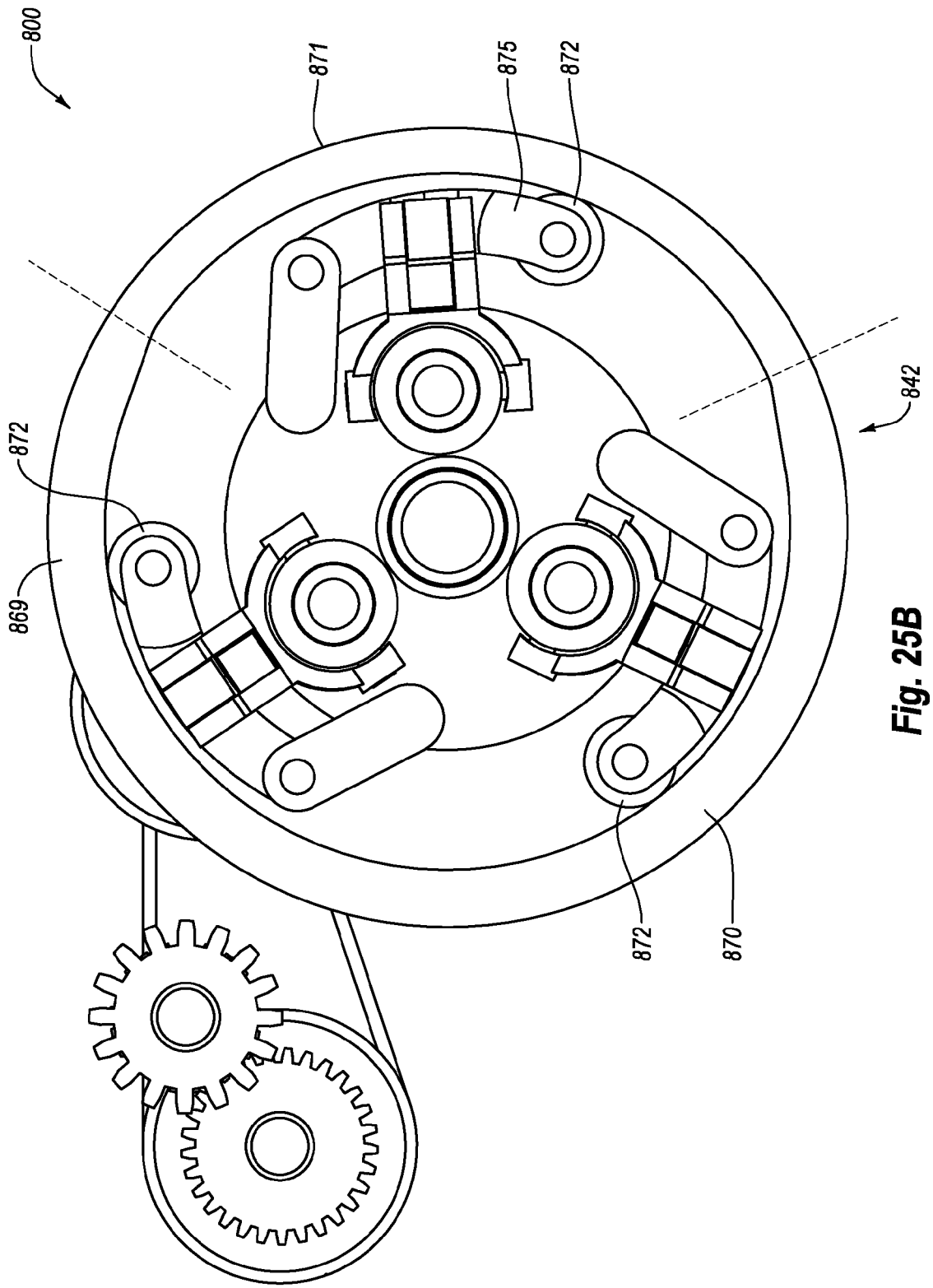
FIG. 25B illustrates a rear view of a locking system of the transmission of FIG. 25A.
Figure 25C:
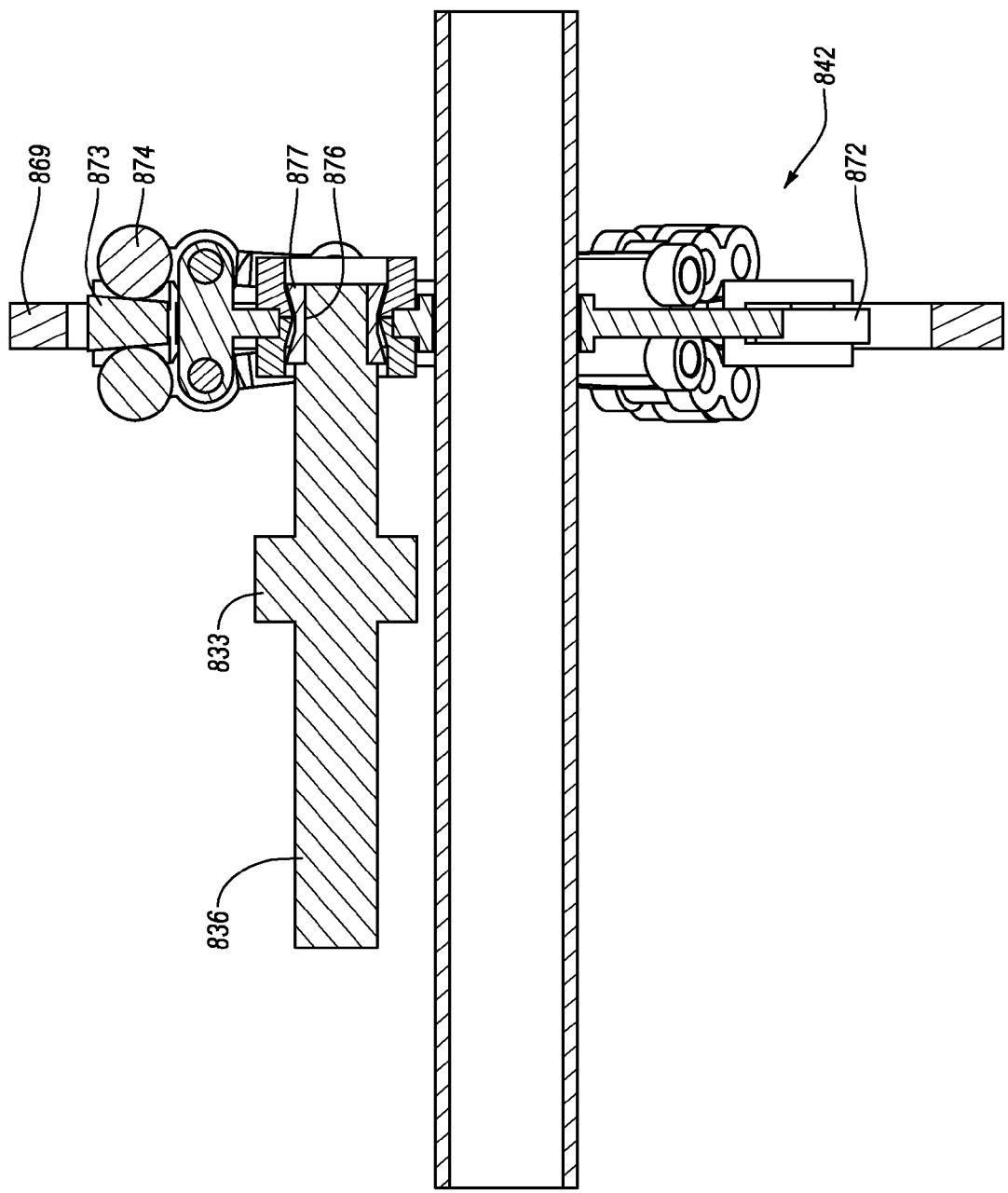
FIG. 25C illustrates a side cross-sectional view of the transmission of FIG. 25A.

Turning now to FIGS. 25A-25C, another example embodiment of a transmission 800 is contemplated within the scope of the present disclosure. As will be appreciated, the transmission 800 includes various components, assemblies and systems that may operate in a manner similar to components, assemblies, and systems described elsewhere herein. Accordingly, to simplify the discussion relating to the transmission 800, a discussion of the operation of the similar components will not be repeated. Thus, the transmission 800 is intended to incorporate the discussion herein related to other systems, including at least disclosed input, output differential, synchronization, and correction systems.

With regard to the transmission 800 a particular reference is made to transmission 600 of FIG. 20. More particularly, the transmission 800 of the present embodiment is similar in various regards to the transmission 600. One notable departure is, however, with respect to the locking system 842 of the transmission 800.

The locking system 842 is best illustrated in FIGS. 25B and 25C. In particular, FIG. 25B illustrates a rear view of the transmission 800 and of the locking system 842. FIG. 25C illustrates a cross-sectional view of components of the locking system 842 of FIGS. 25A and 25B. In this particular embodiment, the locking system 842 is configured to operate in connection with the drive gears 834, each of which may be used to drive or be driven by a chain or other wrapping member. More particularly, in the illustrated embodiment, the locking system 842 couples to the drive gear shafts 836 to selectively stop or limit rotation of the drive gear shafts 826. On the drive gear shafts 826 are one or more linking gears 833 that engage the drive gears 834 and, when rotated, cause the drive gears 834 to rotate.

More specifically, a ring 869 may be attached to the transmission 800. In one embodiment, the ring 869 is fixed relative to the transmission 800. For instance, the ring 869 may be fixed to, or incorporated within, the transmission housing. In other embodiments, however, the ring 869 may be selectively or otherwise movable. The ring 869 is illustrated as including a cam profile. Specifically, the illustrated ring 869 has at least two different sections, and the widths of such sections vary. A first section 870 extends around approximately two-hundred forty degrees of the ring 869, while the second section 871 extends over about one-hundred twenty degrees. Such degrees are, however, merely exemplary and may vary. For instance, in one embodiment, a portion may extend around about ninety degrees of the ring 869, while another portion may extend less than ninety degrees or even more than two-hundred forty degrees. According to at least one embodiment, the first section 870, or a section over which the ring 869 is configured to lock the drive gears 834 is defined by a Vernier factor. In effect, the Vernier factor locks drive gears 834 over an interval defined by the equation $V_F = 360/N \pm 10\%$, wherein $V_F$ is the Vernier factor and N is the number of drive gears 834. Accordingly, for the transmission 800 that includes three drive gears 834, the Vernier factor defines a locking interval ranging between about one-hundred eight degrees and about one-hundred thirty-two degrees.

The locking system 842 further includes, in this embodiment, a set of cam followers 872. The cam followers 872 can include, for instance, a roller or other structure adapted to follow along the cam profile of the ring 869. In accordance with one aspect of the present disclosure, the cam followers 872 can be used to, for instance, lock a drive gear shaft 836 and cause the drive gear shaft 836 and/or drive gears 834 to lock at a fixed position, or lock the drive gears to reduce a chance or extent of backward motion. Accordingly, the locking system 842 can facilitate avoiding or reducing rotation that may cause slippage between a chain and sheave.

As best illustrated in FIG. 25C, the cam follower 872 may be used in connection with a wedge 873 and/or a yoke 874. More particularly, the cam profile of the ring 869 includes changes as to the width of the ring 869. As the width changes, the can follower 872 may move radially. For instance, as the cam follower 872 enters a thinner portion 871, the cam follower 872 may extend radially outward. In contrast, as the cam follower 872 enters a thicker portion 870, the cam follower 872 may move radially inward. As the cam profile changes, a linkage 875 may move the wedge 873 radially inward or outward. As the wedge 873 moves radially inward, for instance, the wedge 873 may cause greater separation between two halves of the yoke 874. In contrast, as the wedge 873 moves radially outward, the wedge 873 may cause lesser separation between the two halves of the yoke 874.

Changes in positioning of the yoke 874 can enable locking of the drive gear shaft 836. For instance, in FIG. 25C, the drive shaft 836 may include one or more structures 876 therein. For instance, exemplary structures include cut-outs, tabs, detents, other structures, or combinations thereof. The yoke 874 may include, or be attached to, a lock element 877. The lock element 877 can be moved into engagement with the structures of the drive gear shaft 836. By way of illustration, the lock element 877 may include an angle, plate, clutching mechanism, other structure, or a combination thereof that will lock against the structures 876 of the drive gear shaft 836 to prevent or restrict rotation of the drive gear shaft 836. Such action may lock the drive gear shaft 836 in place to prevent or limit back rotation of the linking gear 833, which in turn locks or restricts rotation of the drive gear 834 that may engage a chain.

7. Additional Embodiments

It should be appreciated in view of the disclosure herein that a number of different transmissions and transmission components, systems, and assemblies are contemplated within the scope of the present disclosure. For simplicity, various different features have been disclosed particularly in combination with other features. Such disclosure has been merely for convenience, however, and in no way is intended to limit the scope of the present disclosure. Indeed, as noted herein, the various components, systems, and assembles are largely considered interchangeable and workable in combination with any number of other features or components, in addition to those combinations specifically illustrated.

Transmission Design Method

Figure 26:
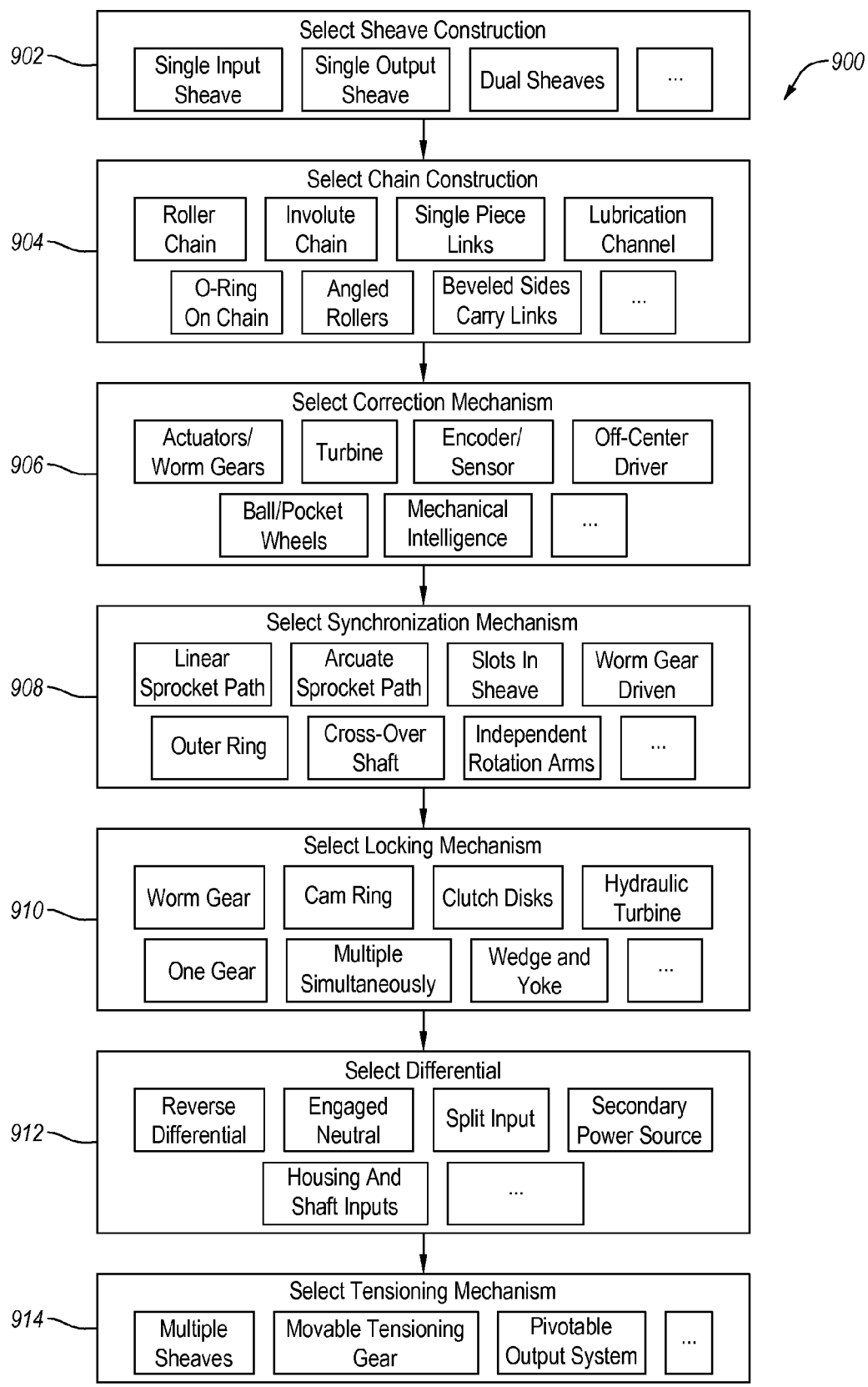
FIG. 26 illustrates an exemplary method of designing a transmission according to the principles disclosed herein, with components and system being interchangeable.

Accordingly, according to one aspect of the present disclosure, FIG. 26 illustrates an exemplary method 900 of designing a transmission is disclosed. The acts of the method 900 need not be performed in the order shown in FIG. 26, but may be performed in any other suitable order. In one embodiment, various elements of a transmission may be selected and interchangeably combined. In accordance with at least some embodiments, a sheave construction is selected (act 901). For instance, a single sheave may be selected for an input or output s system, or dual sheaves may be selected. In still other embodiments, more than two sheaves may be used (e.g., for multiple wrapping members). Sheaves may also be selected based at least in part on sheave actuation mechanisms. For instance, a sheave may be selected based on a hydraulic, pneumatic, mechanical, electrical, or other actuator used to move the sheave in an axial direction.

In addition, the exemplary method 900 may include selection of a chain construction (act 902). As disclosed herein numerous types of chains may be used, including roller chain, involute chain, single piece links, and chains with integral lubrication channels. An O-ring may be used on a chain. Angled rollers or beveled sides carrying chain link portions may also be used. In some embodiments, multiple chain types may be combined. For instance, an O-ring may be combined with a single piece link.

The method 900 may further include selecting a correction mechanism (act 903). Multiple types of correction mechanisms may be used in accordance with the present disclosure, each of which is interchangeable with other listed features. For instance, correction mechanisms making use of actuators, worm gears, turbine disks, encoders, sensors, off-center drivers, ball and pocket wheels, mechanical intelligence, and other correction mechanisms may be used. In some embodiments, multiple correction mechanisms may be combined.

According to another embodiment, the illustrated method 900 may further include selecting a synchronization mechanism (act 904). For instance, synchronization mechanisms that are independently selectable include linear sprocket paths, arcuate sprocket paths, slots in sheaves, worm gear driven mechanisms, outer ring mechanisms, cross-over shafts, independent rotation arms, and other suitable mechanisms. For instance, a spring loaded or floating mechanism may be used in accordance with some embodiments herein.

A locking mechanism may also be selected (act 905) in accordance with still another embodiment of the present disclosure. Exemplary locking mechanisms may employ any number of suitable features, including worm gears, cam rings, clutch disks, hydraulic turbines, or wedge and yoke constructions. Multiple features may also be combined together, such as a cam ring with a wedge and yoke and/or clutch disk. In still other embodiments, a single gear may be locked at any time, or multiple gears may be selected.

In still another aspect, the method 900 may include selecting a differential to include in the transmission (act 906). For instance, a differential may be a reverse differential and/or provide an engaged neutral. In still another embodiment, an input may be split and directed to two inputs of the differential. A second input may come from a secondary power source and/or inputs may be directed to an input shaft and a housing.

Additionally, a tensioning mechanism is configurable. For instance, in one embodiment, the method 900 includes selecting a tensioning mechanism (act 907). Exemplary tensioning members that may be selected include, but are not limited to, use of multiple sheaves, or a moving tensioning gear such as an idler gear. An output or input system may also pivot to tension a chain or other wrapping member.

The method 900 may be implemented in any number of manners. For instance, upon selecting one or more components, the transmission may be built into a physical model conforming with the selected features. In another embodiment, a computing device is encoded with instructions related to criteria, qualifications, features, and the like for various components and options. A computing system may make use of an expert system to, for instance, automate selection of the criteria for the transmission in accordance with the method 900.

Moon Gear Assembly

Referring generally now to FIGS. 27-42, details are provided concerning an example of a moon gear assembly such as may be employed in connection with the embodiments disclosed herein. As disclosed herein, it may be desirable in some circumstances to adjust the location of various teeth of one or more driving moon gears, so as to avoid, or at least reduce, what is sometimes referred to as the "partial tooth" problem. In some instances, the location of one or more teeth of a driving moon gear may be changed by selectively re-orienting the driving moon gear, relative to a driven member, during a time period that said the driving moon gear is disengaged from the driven member. This reorientation may involve a physical relocation of the driving moon gear and/or a rotation of the driving moon gear about its axis. Particularly, a chain, belt, gear or other driven element(s), and the driving moon gears can move so as to implement a variety of different gear ratios. As part of the process of changing a gear ratio, a rotational position of the teeth of the driving moon gears can be adjusted as necessary so that proper alignment is maintained between the driving moon gears and the chain, or other driven element(s), at both integer and non-integer positions of the chain, or other driven element(s). The following discussion briefly illustrates some possible advantages that may be presented by the embodiments disclosed in FIGS. 27-42.

Consider, for example, an arrangement where a drive train between a moon drive motor and driving moon gear has a relatively high mass and, thus, a relatively high polar moment of inertia. At relatively high orbital speeds of the driving moon gear, the moon drive motor in this example needs relatively more power to rotate the driving moon gear so as to adjust the position of the driving moon tooth. However, because the drive motor has a defined maximum output power, the moment of inertia of the drive train effectively limits the quickness with which the driving moon tooth position can be adjusted. Because higher orbital speeds of the driving moon gear means that there is relatively less time to adjust a driving moon gear tooth position, the maximum orbital speed of the driving moon gears is accordingly limited.

With these points in mind, it can be seen that the example embodiments disclosed in FIGS. 27-42 may help to avoid, or reduce the occurrence of, such circumstances. For example, by positioning a motor in the moon arm assembly, the mass and polar moment of inertia of the drive train for positioning the driving moon gear tooth can be reduced. Thus, for a motor of given output, the moon arm assembly can operate at relatively higher orbital speeds. As well, the direct engagement between the drive motor and worm gear, and between the worm gear and driving moon gear, may result in more efficient use of the drive motor output.

With more particular reference now to the figures, the components of the device disclosed in FIGS. 27-42 can be made of any suitable material(s). Examples include metals, ceramics, plastics, composite materials, and combinations of any of the foregoing. Some example metals include carbides, steel, titanium, copper, aluminum, chromium, manganese, iron, nickel, vanadium, molybdenum, zinc, and combinations and alloys of any of the foregoing. Depending upon the material(s) employed, such components can be manufactured using a variety of processes including, forging, welding, brazing, die-casting, machining, molding processes such as injection molding, casting, and combinations of any of the foregoing.

Figure 27:
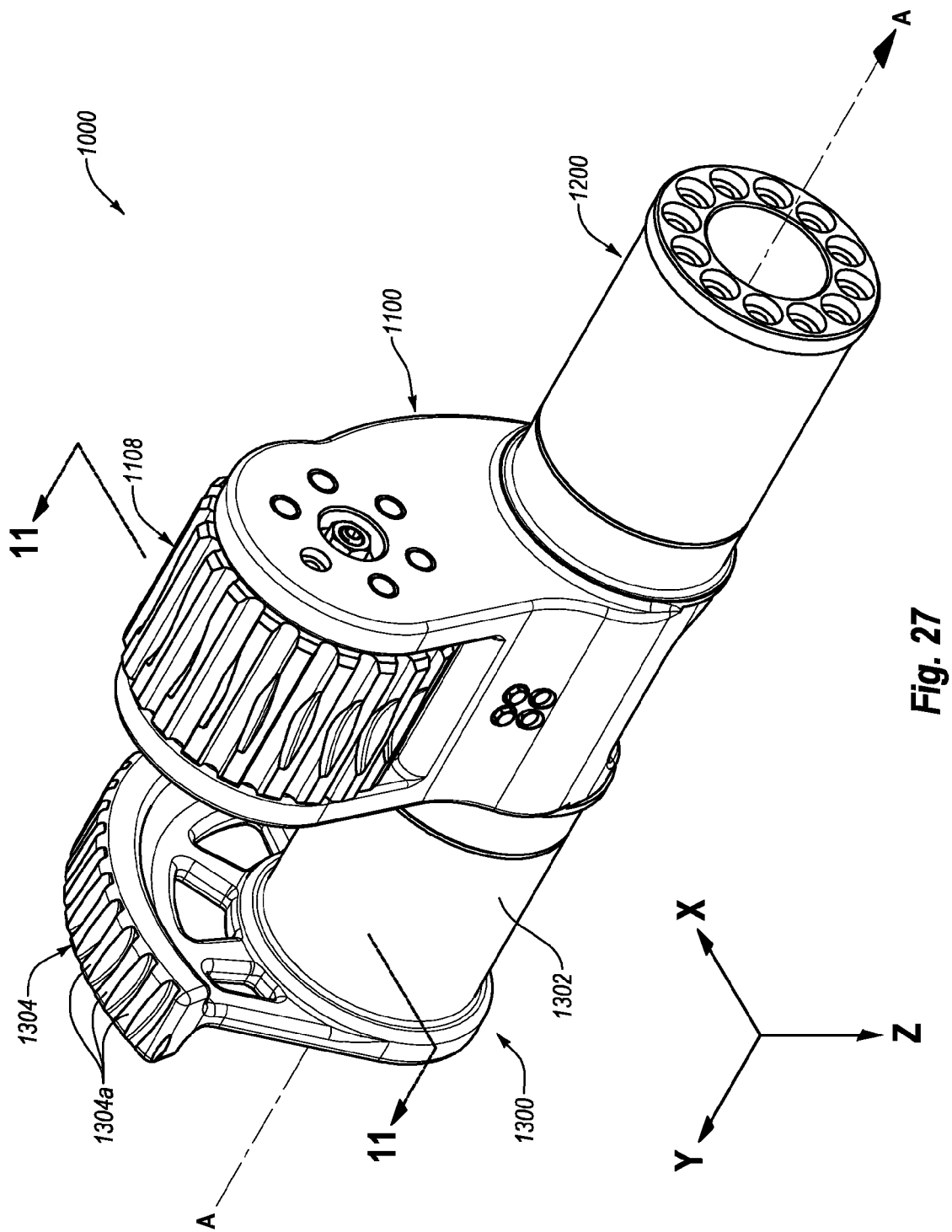
FIG. 27 is a perspective view of an example of a moon gear assembly.

Referring specifically to FIG. 27, a moon gear assembly 1000 may include a moon arm assembly 1100, pivot pin 1200 and adjustment arm 1300. These elements may be connected together in a variety of ways depending upon considerations such as their size, and the application in which the moon gear assembly 1000 is employed. Thus, the moon arm assembly 1100, pivot pin 1200 and adjustment arm 1300 can be welded or brazed together, or assembled together with fasteners such as bolts, pins, machine screws, or any other elements of comparable functionality. In at least some embodiments, the use of fasteners may enable the moon arm assembly 1100, pivot pin 1200 and adjustment arm 1300 to be removably attached to each other. As another example, one or more of the moon arm assembly 1100, pivot pin 1200 and adjustment arm 1300 may include threads complementary with those of another of the components so that the threaded components can be readily attached to, and detached from, each other. Any of the aforementioned attachment devices and mechanisms, and combinations thereof, can be employed in any particular embodiment.

In general, and with continued reference to FIG. 27, the moon gear assembly 1000 is configured for rotation about an axis AA such that the position of the moon arm assembly 1100 can be adjusted as necessary. More particularly, a plurality of moon gears may be employed to collectively define a driving member whose effective diameter can be changed by way of adjustments to the radial position of the moon gears relative to a central axis such as may be defined by a shaft. The moon gear assembly 1000 is further configured so that the moon gear itself can also be rotated on its axis as necessary to avoid, or reduce, the occurrence of the partial tooth problem. In at least some circumstances, the rotation of the moon arm assembly about the axis AA, and rotation of the moon gear on its axis, may occur at substantially the same time.

With the foregoing in view, attention is now directed to FIGS. 28-31 where an example of a sheave 1400 is disclosed that includes three moon gear assemblies 1000. It should be understood however, that more or fewer moon gear assemblies may be employed in other embodiments. As indicated, the moon gear assemblies 1000 are arranged so that each of the pivot pins 1200 extends through a corresponding opening (not shown) defined in a first sheave half 1402 of the sheave 1400. Similarly, a shank 1302 of each adjustment arm 1300 is attached to a sector gear 1304 and extends through a corresponding opening (not shown) in a second sheave half 1404 of the sheave 1400. As a result of this configuration, the moon gear assemblies 1000 collectively rotate in unison with the sheave 1400 about an axis BB defined by the mainshaft 1500. As further indicated in the Figures, and discussed in detail below, each of the moon gear assemblies 1000 is configured and arranged to interface with an adjustment arm drive assembly 1600 that is operable to rotate the moon gear assembly 1000 about axis AA. In the illustrated example, the adjustment arm drive assemblies 1600 are mounted to the second sheave half 1404.

Turning now to FIGS. 32-38, further details are provided concerning an example embodiment of a moon arm assembly 1100. As indicated, the moon arm assembly 1100 includes a housing 1102 having a body 1104 that includes a pair of arms 1106. In at least one embodiment, the housing 1102 is constructed of a single piece of material although in other embodiments, the housing 1102 may comprise a plurality of parts that have been attached together. Some of the parts may be removably attached to each other. The arms 1106 are configured and arranged to support a driving moon gear 1108. Bearings 1111, or other devices of comparable functionality, may be provided on or in the arms 1106 to rotatably support the driving moon gear 1108 so that the driving moon gear 1108 is able to rotate about axis CC defined by the housing 1102. The arms 1106 may be configured so that axis CC is offset, in the positive or negative 'X' direction (see reference axes in FIG. XX), from the axis AA. In this and other embodiments where such an offset is employed, the offset may such that the arms 1106 extend generally toward, or away from, the direction of rotation of an associated sheave. Considered another way, the arms 1106 may generally extend in the same, or opposite, direction of tension in driven member such as a belt or chain. In other embodiments, the arms 1106 may be configured so that axis CC is substantially aligned with axis AA in the 'X' direction. Finally, as indicated in the Figures, and discussed in more detail below, a portion of the driving moon gear 1108 is exposed so as to be able to engage a chain, belt, gear or other element(s) to be driven by the driving moon gear 1108.

With continued attention to the housing 1102, the housing 1102 defines a chamber 1102a having an opening 1102b located proximate the arms 1106. In the example disclosed in the Figures, the chamber 1102a may be substantially cylindrical in shape and defines an axis DD that may be substantially transverse to the axis CC defined by the arms 1106. As indicated in the Figures, the chamber 1102a is configured and arranged to receive a worm gear 1110, a motor 1112, and a shaft 1114 about which the worm gear 1110 and motor 1112 are positioned. The worm gear 1110 can be single or double enveloping, depending upon the constraints of the application in which the worm gear 1110 is to be employed. For example, a double enveloping worm gear may be able to handle relatively higher thrust loads than a single enveloping worm gear.

Returning to the arrangement of the components, the worm gear 1110 and motor 1112 are coupled to each other such that operation of the motor 1112, which may be an electrical motor, causes the worm gear 1110 to rotate about the shaft 1114. Bearings (not shown) disposed in the chamber 1102a may provide radial and/or axial support for the worm gear 1110. In one embodiment, the bearings are tapered roller bearings, but any other device(s) of comparable functionality may alternatively be employed. Atop the shaft 1114 is a cap 1116 configured to be secured to the body 1104 so as to confine the shaft 1114, motor 1112 and worm gear 1110 within the chamber 1102a. In at least some embodiments, the cap 1116 is configured to be removably secured to the body 1104, such as by bolts 1116a or screws for example, so as to enable removal and replacement of the components in the chamber 1102a. Additionally, or alternatively, the cap 1116 may be threaded so as to engage corresponding threads of the body 1104 and thereby secure the various components in the chamber 1102a.

As is evident from the figures, the worm gear 1110 may be positioned in the chamber 1102a so that the worm of the worm gear 1110 is able, by way of the opening 1102b, to operably engage the teeth of the driving moon gear 1108. Thus configured and arranged, rotation of the worm gear 1110 by the motor 1112 causes a corresponding rotation, which may be clockwise and/or counterclockwise, of the driving moon gear 1108 and, thus, a repositioning of the teeth 1108a of the driving moon gear 1108. As well, control components and systems may be employed to cause the motor 1112 to operate automatically to turn the worm gear 1110 and, thus, the driving moon gear 1108 in response to various conditions and inputs. In some embodiments, the worm gear 1110, motor 1112, and/or driving moon gear 1108 may be configured and employed so that the range of motion of the driving moon gear 1108 may be constrained. For example, a worm engagement may be employed to make the driving moon gear 1108 self-locking when the driving moon gear 1108 has more than a particular number of teeth. In one specific example, the worm engagement may be employed when the driving moon gear 1108 has more than about 40 teeth.

The fact that the worm gear 1110 may be continuously engaged with the driving moon gear 1108 can help to ensure that the driving moon gear 1108 is retained in the desired position until such time as it is desired to rotate the driving moon gear 1108. This maintenance of the position of the driving moon gear 1108 may help to avoid slippage between the driving moon gear 1108 and the driven member(s) and thereby enhance the operational efficiency and service life of the system in which the moon gear assembly 1000 is employed.

Because the driving moon gear 1108 is required to interface both with the worm gear 1110 and one or more driven elements, such as gears and/or chains for example, at least some embodiments of the driving moon gear 1108 may implement a specialized tooth configuration that includes two or more different types of interface elements. Particularly, and with reference now to FIG. 38, some embodiments of a driving moon gear 1108 may include one or more teeth 1108a that include a first interface element in the form of a thrust face 1108b that is configured and arranged to interface with corresponding elements of a driven member, such as a chain, belt or gear for example. Additionally, some or all of the teeth 1108a may also include a second interface element in the form of worm face 1108c that is configured and arranged to interface with the worm of the worm gear 1110. In the example disclosed in FIG. 38, each worm face 1108c is cut partway into the side and top of a corresponding tooth 1108a. However, one or more of the size, configuration, location and orientation of one or more of the interface elements may be different in other embodiments. In some instances at least, one or more aspects of the interface elements may depend upon the physical configuration of the driven element(s) with which the driving moon gear 1108 is intended to interface.

Because the sheave 1400 to which the driving moon gear 1108 is mounted has an associated primary torque direction, the worm face 1108c is biased to one thrust side of the tooth 1108a. As a result of this configuration, the driving moon gear 1108 may be relatively narrower than if the worm face 1108c were implemented in a worm gear separate from the driving moon gear 1108. A possible related advantage is that the driven member, such as a chain or belt for example, can be relatively narrower than would otherwise be the case. A relatively narrower driven member may correspond to weight and cost savings. As well, a relatively narrower driving moon gear 1108 may allow the sheave halves 1402 and 1404 to be positioned relatively closer to each other over their range of motion, such that the overall length of the mainshaft 1500 may be reduced. Again, this result may produce both cost and weight savings.

As discussed above, a moon gear assembly is disclosed that, among other things, enables a driving moon gear to be rotated to the extent necessary to ensure that when the driving moon gear reengages with a driven member, the teeth of the driving moon gear are positioned for proper engagement with the driven member. Among other things, this functionality may help to partially, or completely, alleviate the partial tooth problem. This rotation of the driving moon gear may be synchronized with movement of the sheave halves toward and/or away from each other such that, for example, during a gear ratio change, the driving moon gear is rotated to a new tooth position that corresponds with the new configuration of the sheave, namely, a configuration where the sheave halves are closer together, or farther apart, than they were prior to the gear ratio change.

In connection with the implementation of a change in gear ratio, the effective or operating diameter of the drive gear collectively defined by a grouping of driving moon gears may be changed by changing the radial position of the driving moon gears relative to an axis of rotation of the sheave. That is, by moving the driving moon gears closer to, or further from, that axis of rotation, the effective diameter collectively defined by the driving moon gears can be changed.

Figure 28:
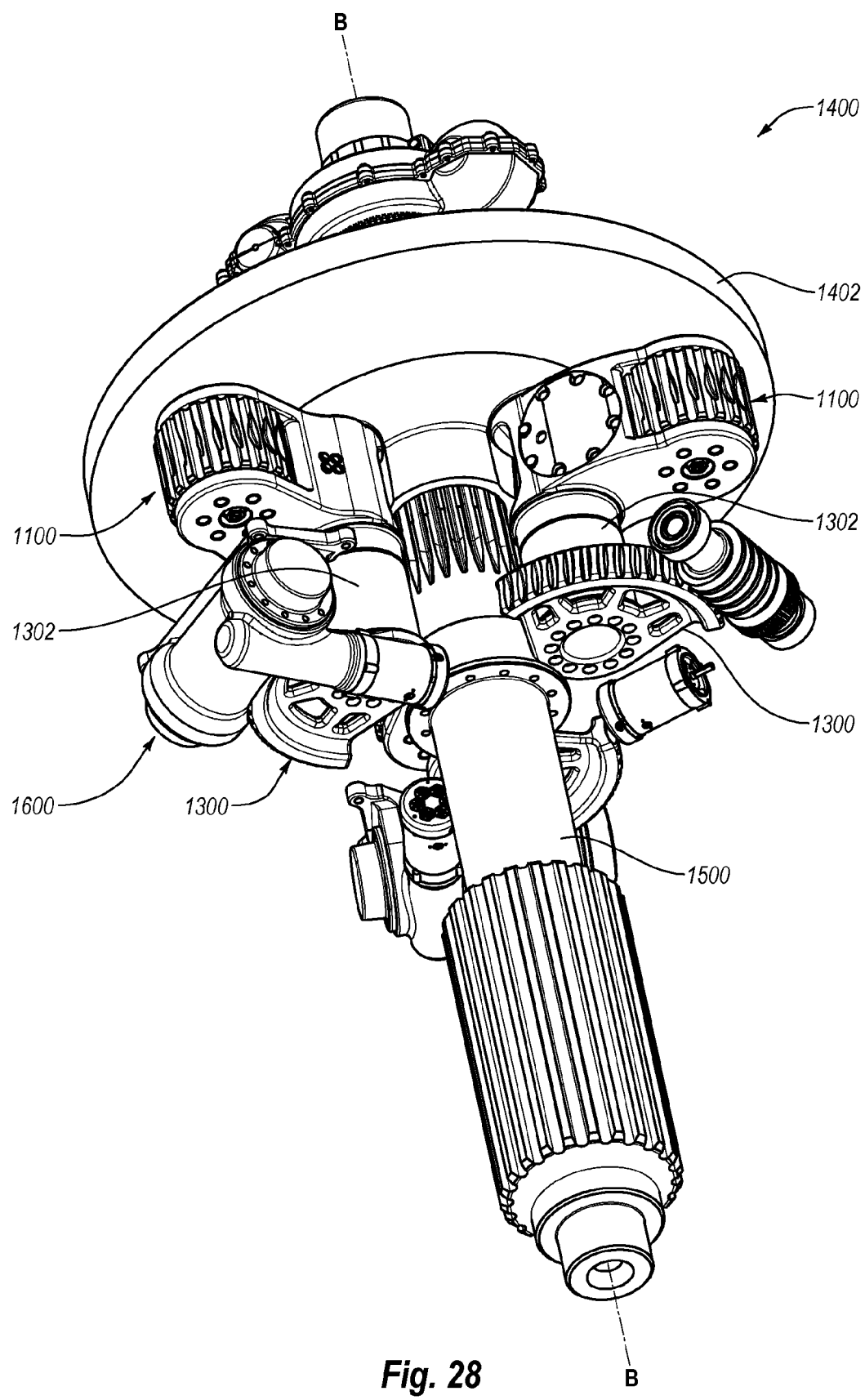
FIG. 28 is a perspective view of an example of a sheave half and associated moon gear assemblies.
Figure 29:
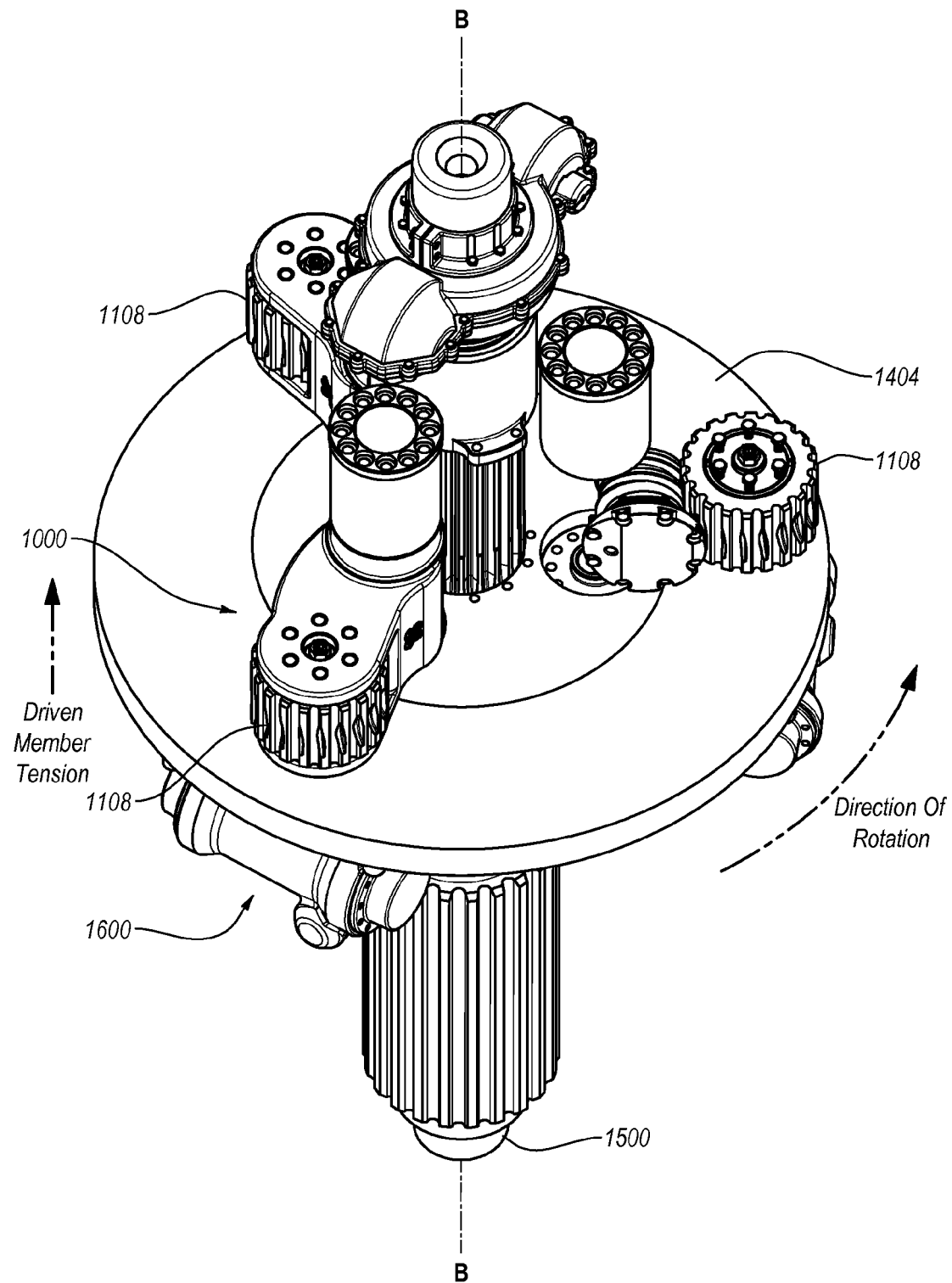
FIG. 29 is a perspective view of an example of a sheave half and associated moon gear assemblies.

With attention now to FIGS. 40-43 and continuing attention to FIGS. 27-28, further details are provided concerning the configuration and operation of an embodiment of a mechanism configured to change the radial position of the driving moon gears. In this example embodiment, the adjustment arm 1300 and adjustment arm drive assembly 1600 cooperate to implement radial motion of the driving moon gear 1108.

More particularly, the adjustment arm 1300 includes a sector gear 1304 positioned at, or near, the end of shank 1302. In the disclosed example, the sector gear 1304 has an included arc of about ninety degrees, although sector gears of larger or smaller included arcs may be employed in other embodiments. More generally, the arc described by the sector gear can correspond to the intended range of motion for the moon gear assembly 1000 about the axis BB. The sector gear 1304 can be positioned along axis AA at any radial position relative to the moon arm assembly 1100. Thus, the relative radial positions of the sector gear 1304 and moon arm assembly 1100 disclosed in the Figures are solely for the purpose of illustration. In some embodiments, one or both of the sector gear 1304 and moon arm assembly 1100 are configured so that their radial positions relative to each other can be adjusted.

The sector gear 1304 includes teeth 1304a configured and arranged to interface with a corresponding gear of the adjustment arm drive assembly, discussed below. In this particular example, the teeth 1304a are configured and arranged to interface with a worm gear, although in alternative embodiments, the teeth 1304a may assume any other type of configuration that enables the sector gear 1304 to operably engage a corresponding element of the adjustment arm drive assembly 1600, as discussed below.

Figure 30:
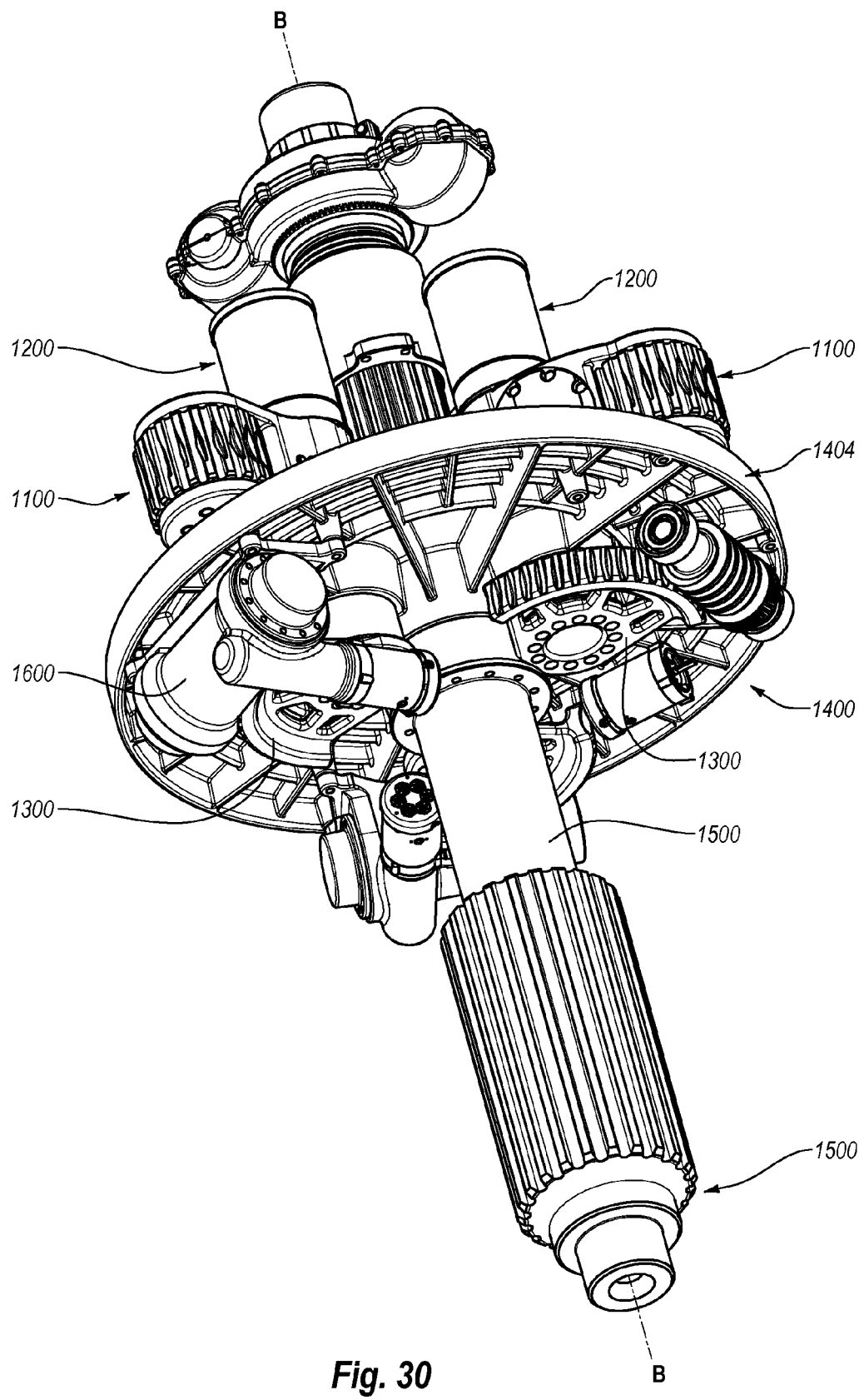
FIG. 30 is a perspective view of an example of a sheave half and associated moon gear assemblies.
Figure 31:
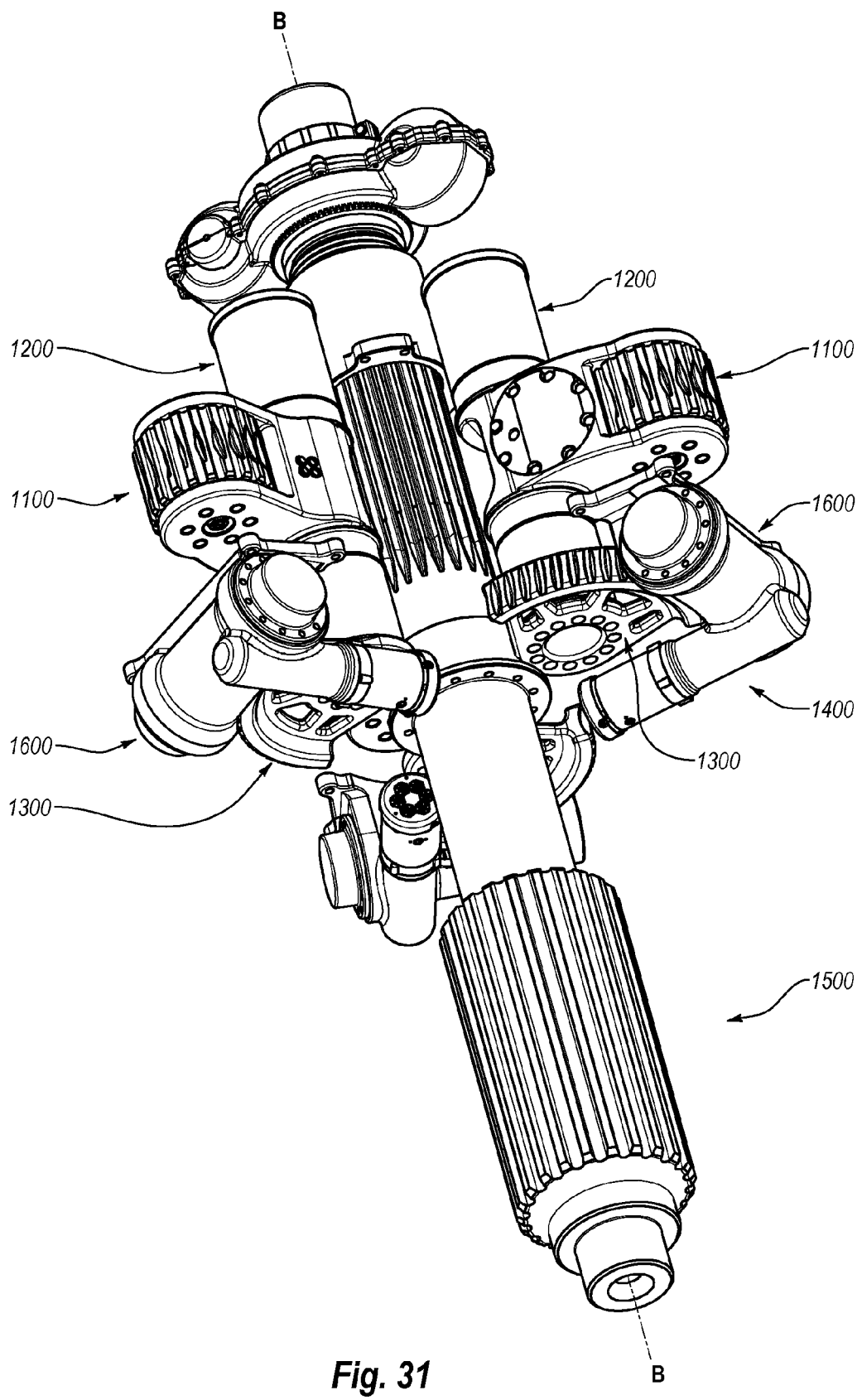
FIG. 31 is a perspective view of examples of moon gear assemblies, adjustment arm drive assemblies, and an associated main shaft.
Figure 32:
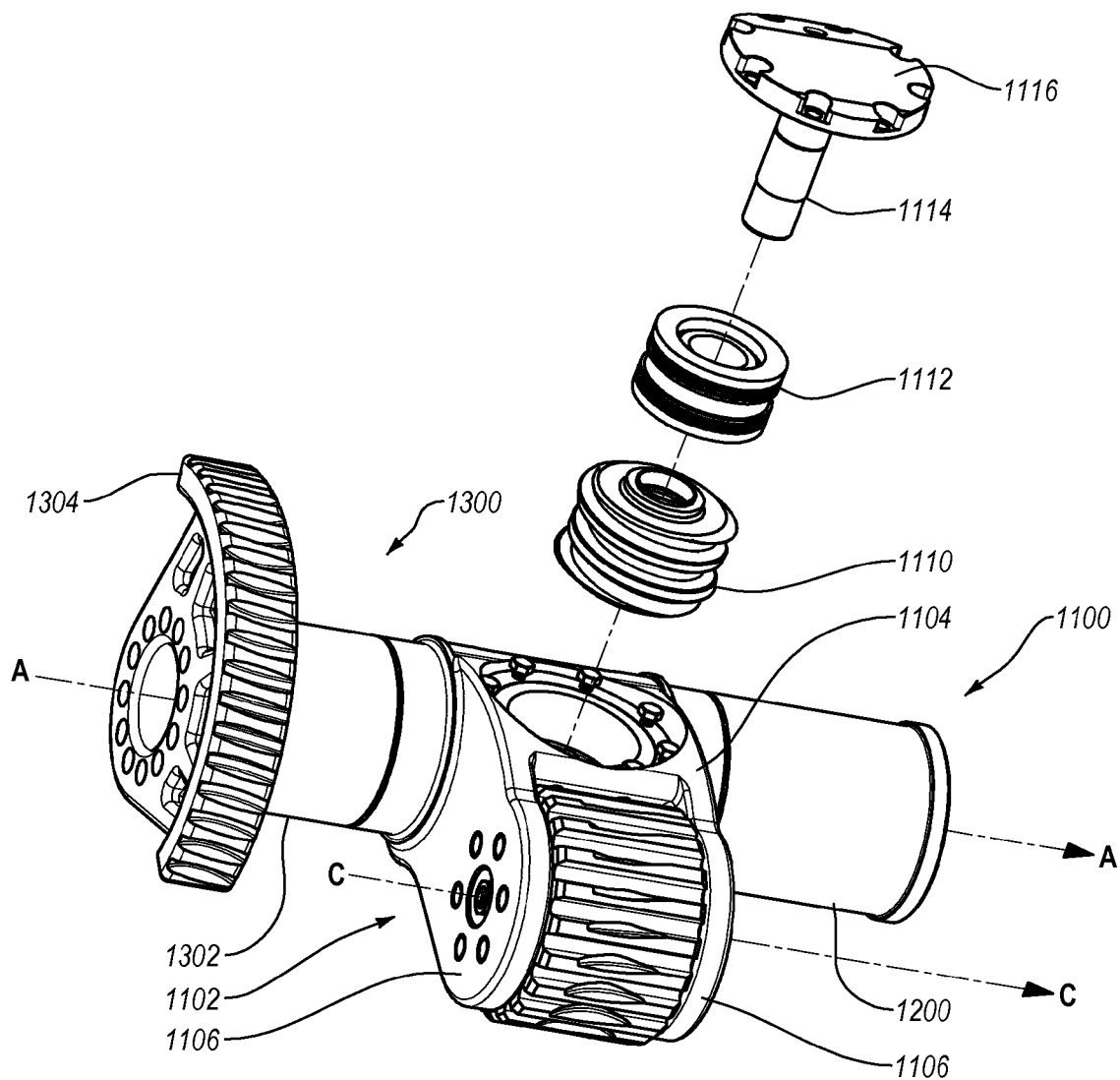
FIG. 32 is an exploded perspective view of an example of a moon gear assembly.
Figure 33:
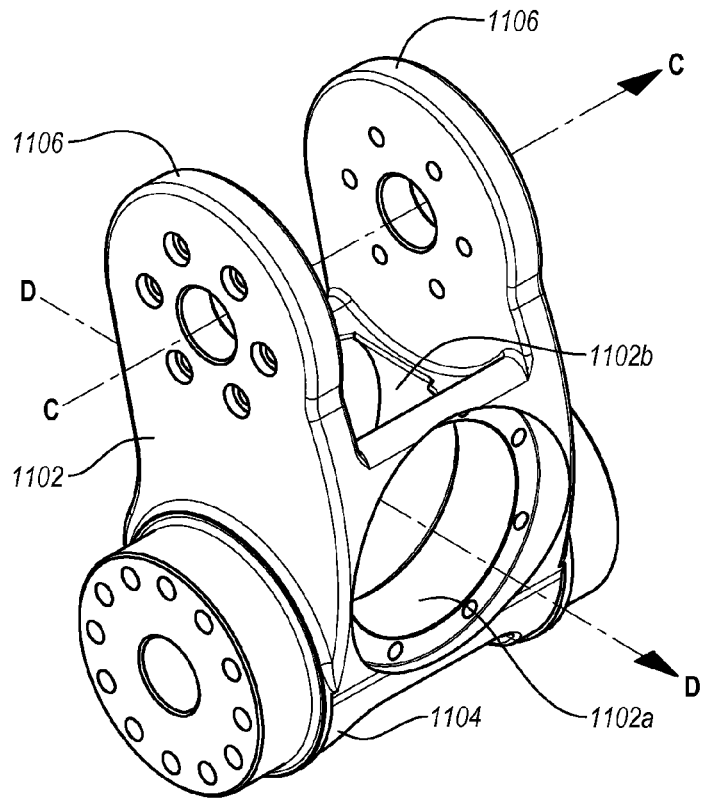
FIG. 33 is a perspective view of an example of a body of a moon gear assembly.
Figure 34:
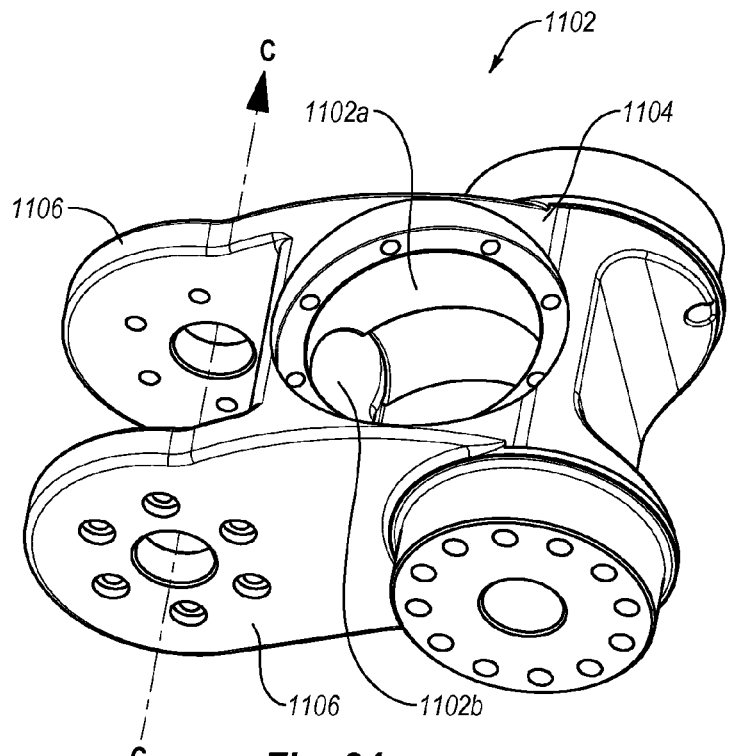
FIG. 34 is a perspective view of an example of a body of a moon gear assembly.
Figure 35:
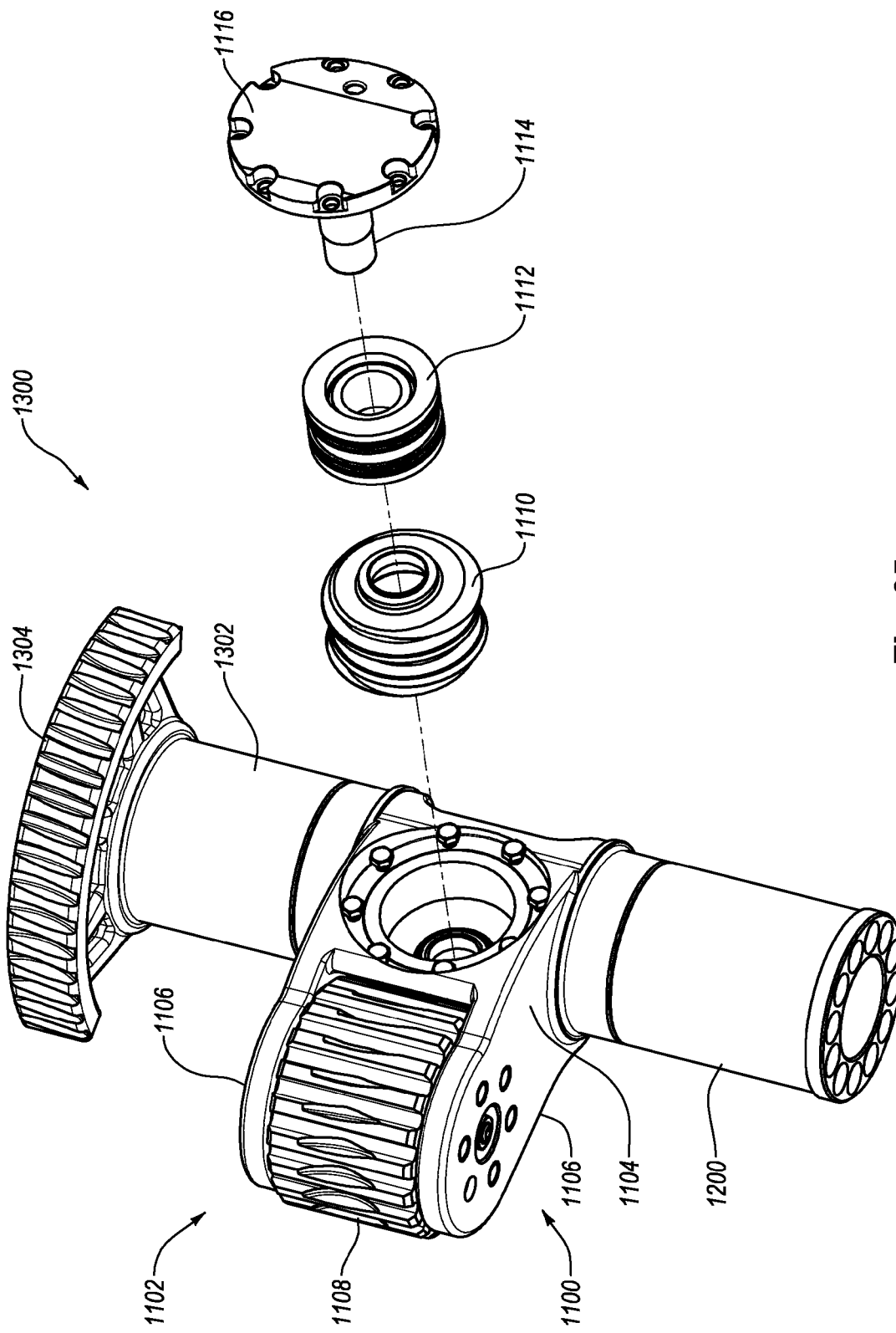
FIG. 35 is an exploded perspective view of an example of a moon gear assembly.
Figure 36:
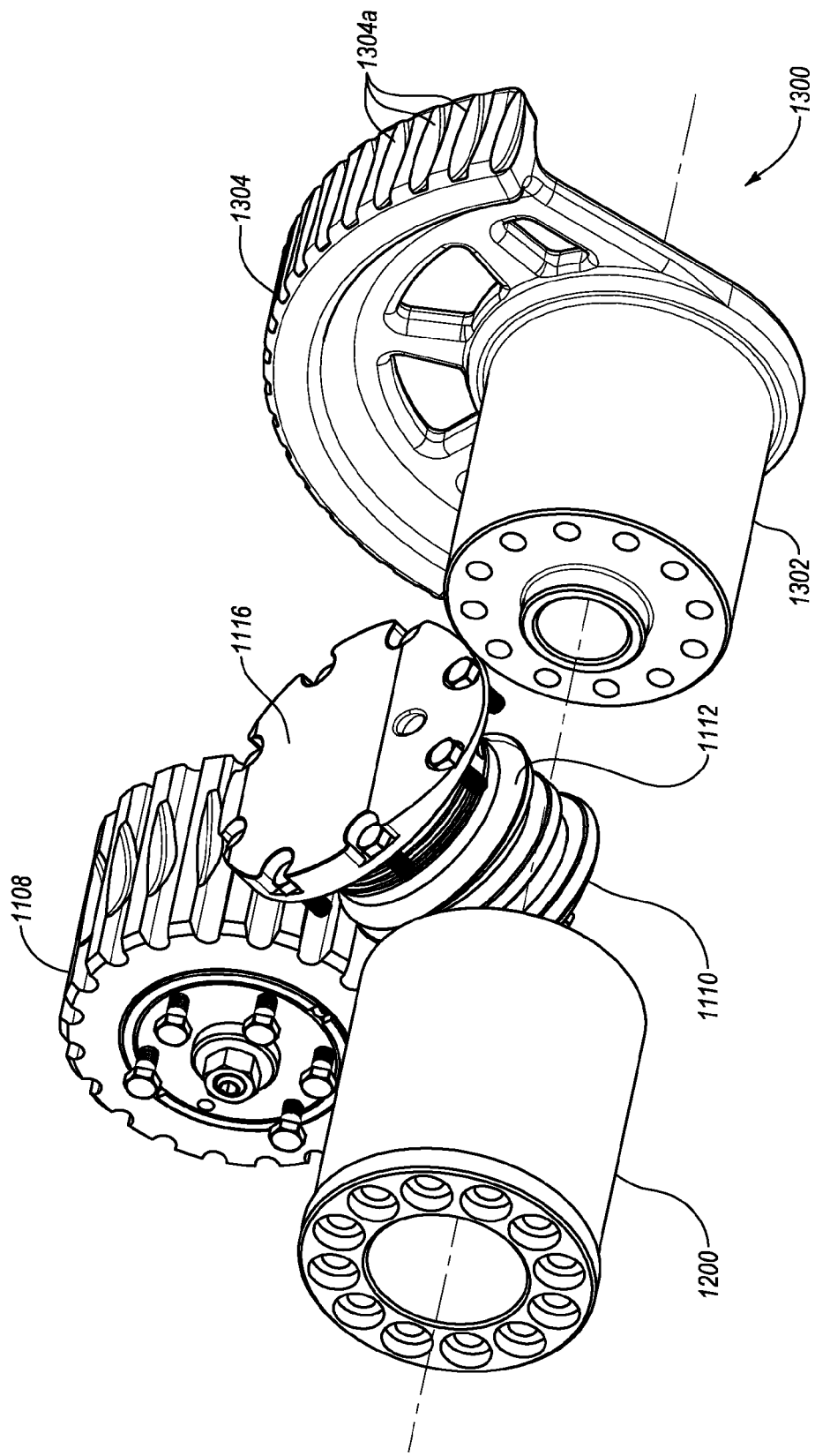
FIG. 36 is a perspective view of an example of a moon gear assembly with the housing removed.
Figure 39:
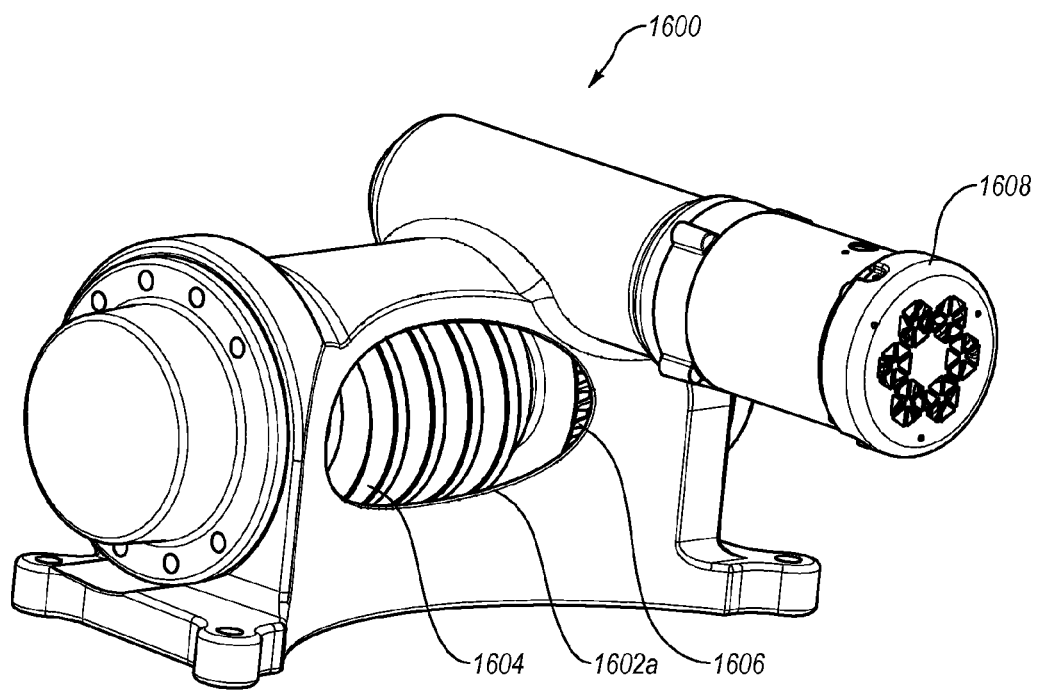
FIG. 39 is a perspective view of an example of an adjustment arm drive assembly.
Figure 40:
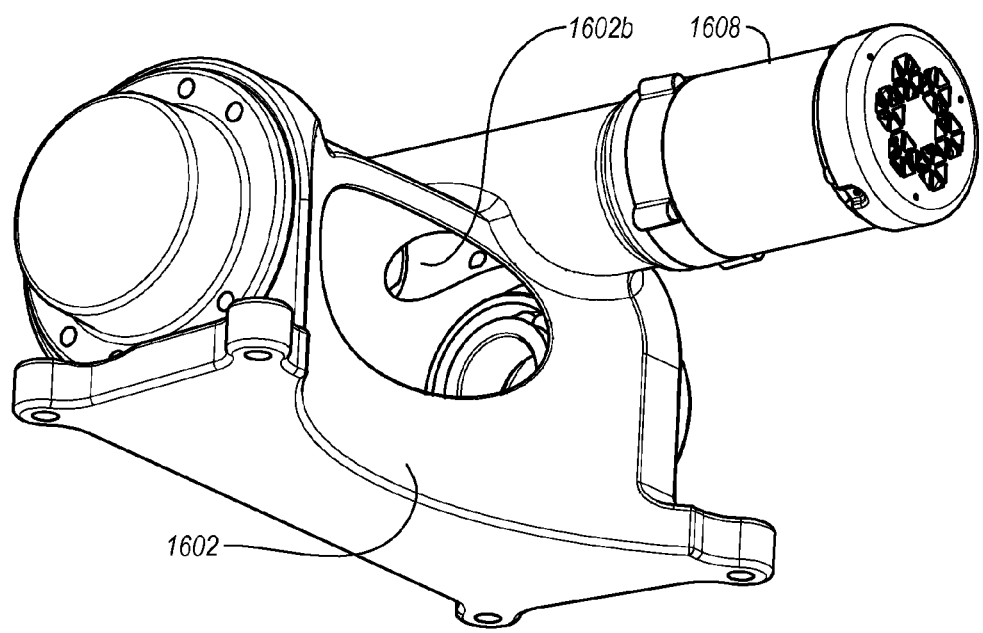
FIG. 40 is a perspective view of an example of an adjustment arm drive assembly with the worm gear removed.
Figure 41:
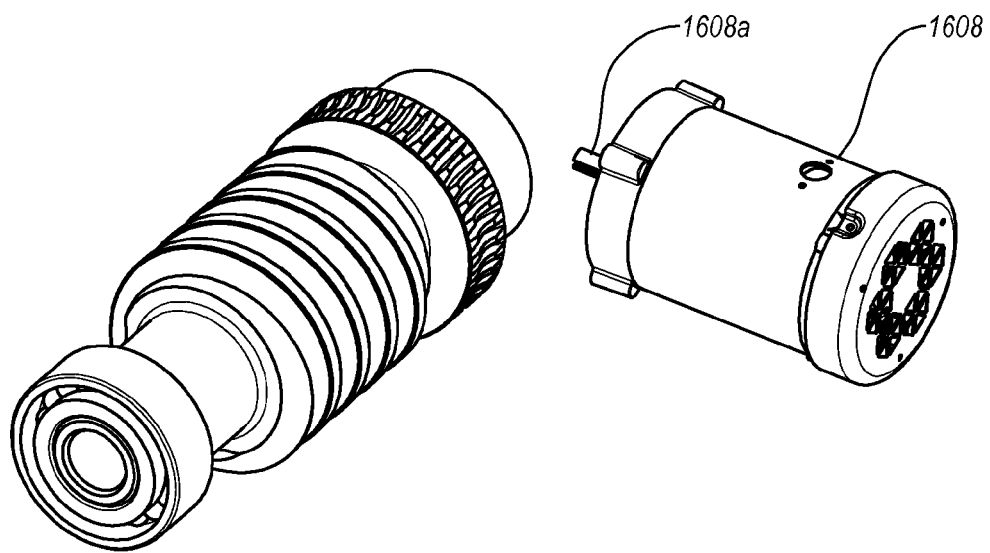
FIG. 41 is a perspective view of an example of an adjustment arm drive assembly with the housing removed.
Figure 42:
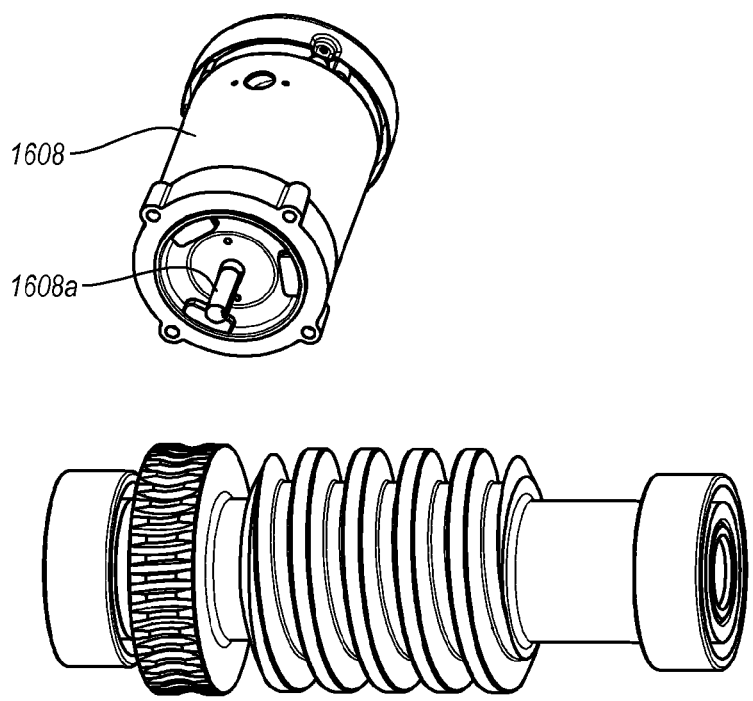
FIG. 42 is a perspective view of an example of an adjustment arm drive assembly with the worm gear removed.
Figure 26:
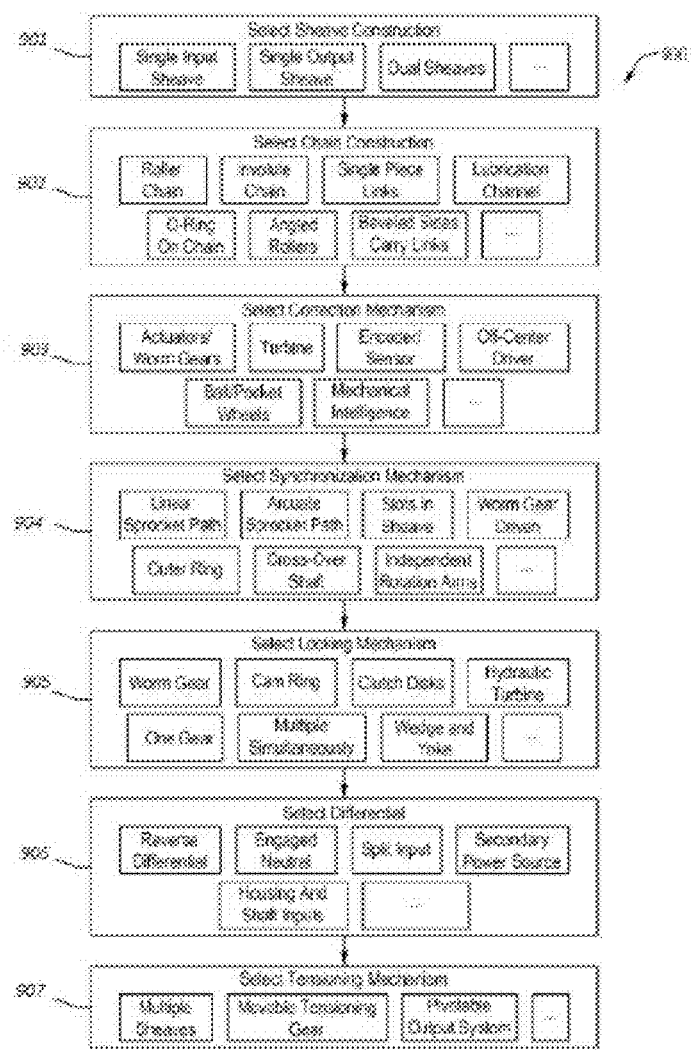

As indicated in FIGS. 39-42, the example adjustment arm drive assembly 1600 includes a housing 1602 configured to be mounted to sheave half 1404 (see, e.g., FIG. 30). The housing 1602 may be configured to be partially or completely disassembled so that components can be disposed within the housing 1602, and removed from the housing 1602. Disposed within the housing 1602, and rotatably and/or axially supported by bearings or comparable components (not shown), is a worm gear 1604. A portion of the worm gear 1604 is exposed by way of an opening 1602a defined by the housing 1602. The worm gear 1604 and an actuation gear 1606 are mounted to a shaft (not shown) so that rotation of the actuation gear 1606 results in corresponding rotation of the worm gear 1604. A drive motor 1608 includes a shaft 1608a to which a worm gear (not shown) is mounted. Thus positioned, the worm gear engages the actuation gear 1606 by way of opening 1602b, and rotation of the shaft 1608a causes the worm gear to rotate the engaged actuation gear 1606 which, in turn, results in the rotation of worm gear 1604. Because worm gear 1604 is engaged with the sector gear 1304, the motor 1608 and, more generally, the adjustment arm drive assembly 1600, is able to effect changes to the radial position of the moon gear assembly 1000.

Thus, the adjustment arm drive assembly 1600 is an example structural implementation of a means for adjusting a radial position of a driving moon gear. As well, the worm gear 1110, motor 1112 and shaft 1114 collectively form an example structural implementation of a means for adjusting a tooth position of a driving moon gear. Finally, the moon gear assembly 1000 is an example structural implementation of a means for adjusting a radial position, and a tooth position, of a driving moon gear.

Embodiments of the present disclosure may be embodied in other specific forms without departing from its spirit or essential characteristics. The described embodiments are to be considered in all respects only as illustrative and not restrictive. The scope of this disclosure is, therefore, indicated by the appended and later added or amended claims rather than by the foregoing description. All changes which come within the meaning and range of equivalency of the claims are to be embraced within their scope.

What is claimed is:

1. A moon gear assembly, comprising:
   a moon arm assembly comprising:
      a driving moon gear rotatable about a first axis;
      a body that supports the driving moon gear and defines a chamber; and a worm gear disposed in the chamber and engaged with the driving moon gear;
a pivot pin connected to the moon arm assembly; and
an adjustment arm connected to the moon arm assembly, the adjustment arm comprising:
a shank connected to the moon arm assembly; and
a sector gear attached to the shank,
wherein the shank and pivot pin are axially aligned with each other along a second axis that is offset from the first axis.

2. The moon gear assembly as recited in claim 1, wherein the moon arm assembly further comprises:
a motor disposed in the chamber and coupled to the worm gear.

3. A transmission that includes the moon gear assembly as recited in claim 1, wherein the transmission includes one of a belt or a chain engaged with the driving moon gear.

4. The moon gear assembly as recited in claim 1, wherein the driving moon gear is configured to orbit about the second axis.

5. The moon gear assembly as recited in claim 4, wherein the moon gear assembly is configured to rotate about the second axis.

6. The moon gear assembly as recited in claim 1, wherein one or more teeth of the driving moon gear include a first interface element and a second interface element, the second interface element being different from the first interface element.

7. The moon gear assembly as recited in claim 6, wherein the first interface element comprises a thrust face, and the second interface element comprises a worm face.

8. A transmission, comprising:
a plurality of moon gear assemblies, each moon gear assembly comprising:
a moon arm assembly comprising:
a driving moon gear rotatable about a first axis;
a body that supports the driving moon gear and defines a chamber; and
a worm gear disposed in the chamber and engaged with the driving moon gear;
a pivot pin connected to the moon arm assembly; and
an adjustment arm connected to the moon arm assembly, the adjustment arm comprising:
a shank connected to the moon arm assembly; and
a sector gear attached to the shank,
wherein the shank and pivot pin are axially aligned with each other along a second axis that is offset from the first axis;
a sheave having two sheave halves, wherein one of the sheave halves is movable in an axial direction relative to the other sheave half, and the plurality of moon gear assemblies are coupled to the sheave; and
a driven member at least partly positioned between the sheave halves and engaged with one or more of the driving moon gears.

9. The transmission recited in claim 8, wherein the driving moon gears are collectively coupled to orbit around a central axis of the sheave.

10. The transmission as recited in claim 9, wherein a radial position of a driving moon gear of a first one of the moon gear assemblies is adjustable relative to the central axis of the sheave.

11. The transmission as recited in claim 10, wherein a rotation of the sector gear of the first moon gear assembly causes a corresponding change in radial position of the driving moon gear of the first moon gear assembly.

12. The transmission as recited in claim 8, wherein the driving moon gears collectively define a driving element that is coupled to the driven member, and whose diameter can be varied.

13. The transmission as recited in claim 8, wherein the driven member comprises a chain or a belt.

14. The transmission as recited in claim 8, further comprising an adjustment arm drive assembly operably coupled to the adjustment arm of one of the moon gear assemblies and operable to rotate the moon gear assembly to which the adjustment drive arm assembly is operably coupled.

15. The transmission as recited in claim 8, wherein one of the moon arm assemblies comprises
a motor disposed in the chamber and coupled to the worm gear.

16. The transmission as recited in claim 8, further comprising a shaft to which the sheave is mounted.

17. A vehicle including the transmission as recited in claim 8, and further comprising:
a prime mover coupled to the transmission; and
a drive train coupled to the transmission.

* * * * *

UNITED STATES PATENT AND TRADEMARK OFFICE
CERTIFICATE OF CORRECTION

| | |
|---|---|
| PATENT NO. | : 9,188,205 B2 |
| APPLICATION NO. | : 13/182374 |
| DATED | : November 17, 2015 |
| INVENTOR(S) | : Lee et al. |

It is certified that error appears in the above-identified patent and that said Letters Patent is hereby corrected as shown below:

In the Drawings

Sheet 38 of 50, delete Fig. 26 and replace with the attached Fig. 26.

In the Specification

Column 5
Line 26, change "other" to --another--

Column 8
Line 35, change "19A" to --19B--

Column 12
Line 5, change "an" to --and--

Column 16
Line 17, remove --are--

Column 18
Line 37, remove --a--

Column 25
Line 60, change "meshes" to --mesh--

Column 39
Line 20, change "269" to --234-- (First Occurrence)
Line 62, change "4047b" to --244b--

Signed and Sealed this
Twenty-first Day of June, 2016

Michelle K. Lee
*Director of the United States Patent and Trademark Office*

Column 43
Line 3, change "as" to --a--

Column 46
Line 47, change "928" to --229--
Line 63, change "to the lubricate" to --to lubricate--

Column 49
Line 60, change "use an" to --use of an--

Column 50
Line 11, change "can tied" to --can be tied--

Column 52
Line 12, remove --shows--

Column 54
Line 62, change "plane" to --planet--

Column 55
Line 12, change "thus determined" to --thus be determined--

Column 57
Line 33, change "describe" to --described--

Column 62
Line 30, change "were" to --where--
Line 30-31, change "circle covered" to --circle is covered--

Column 66
Line 31, change "assembles" to --assemblies--

Column 71
Line 52, change "40-43" to --40-42--